(12) United States Patent
Takaoka et al.

(10) Patent No.: US 7,020,584 B2
(45) Date of Patent: Mar. 28, 2006

(54) VEHICLE INFORMATION PROVIDING APPARATUS, VEHICLE INFORMATION PROVIDING SYSTEM, VEHICLE INFORMATION PROVIDING METHOD, COMPUTER PROGRAM, AND COMPUTER READABLE STORAGE MEDIUM

(75) Inventors: Hiroki Takaoka, Hiroshima-ken (JP); Satoshi Karasugo, Hiroshima-ken (JP); Kouji Ikeda, Hiroshima-ken (JP); Makoto Goto, Hiroshima-ken (JP); Yoshiteru Ueda, Hiroshima-ken (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/045,664

(22) Filed: Jan. 15, 2002

(65) Prior Publication Data

US 2003/0120369 A1   Jun. 26, 2003

(30) Foreign Application Priority Data

Jan. 23, 2001 (JP) ............................. 2001-014544
Nov. 1, 2001 (JP) ............................. 2001-336873

(51) Int. Cl.
*G06F 17/60* (2006.01)
(52) U.S. Cl. ...................... 702/188; 702/182; 702/186; 702/189
(58) Field of Classification Search ................ 702/122, 702/123, 180, 183, 188, 182, 186, 189, 177; 709/251; 705/54, 8, 7, 10; 370/406; 712/234; 382/117

See application file for complete search history.

(56) References Cited

U.S. PATENT DOCUMENTS

| | | | |
|---|---|---|---|
| 6,363,488 B1 * | 3/2002 | Ginter et al. | 713/201 |
| 6,607,136 B1 * | 8/2003 | Atsmon et al. | 235/492 |
| 6,851,610 B1 * | 2/2005 | Knowles et al. | 235/462.01 |
| 2002/0082893 A1 * | 6/2002 | Barts et al. | 705/8 |
| 2003/0080878 A1 * | 5/2003 | Kirmuss | 340/936 |

FOREIGN PATENT DOCUMENTS

| | | |
|---|---|---|
| EP | 0467 584 A2 | 1/1992 |
| EP | 1 139 264 A2 | 10/2001 |
| JP | 5-274326 | 10/1993 |
| JP | 7-199820 | 8/1995 |
| WO | WO 98/50834 | 11/1998 |

OTHER PUBLICATIONS

Tsuchiya Hideo, Patent Abstracts of Japan, Production Line Monitor System, vol. 1999, No. 11, Sep. 30, 1999 (Publication No.: 11 161322, Jun. 18, 1999).

* cited by examiner

*Primary Examiner*—Marc S. Hoff
*Assistant Examiner*—Felix Suarez

(57) ABSTRACT

Upon providing on-line vehicle information using an information providing apparatus that belongs to a vehicle manufacturer, and a user terminal possessed by a user, information (e.g., including photographed images during assembly, position information during transportation, and the like) associated with the progress status of a specific vehicle corresponding to identification information which is received from the terminal and specifies the user is acquired from information associated with the progress status of a plurality of vehicles before shipping, which information is stored in a progress management DB, and the acquired information is provided to the user terminal from which the identification information was output.

16 Claims, 44 Drawing Sheets

| MANUFACTURER'S SUGGESTED RETAIL PRICE | * * * * *YEN |

MANUFACTURER EQUIPMENT TOTAL     * * * * * * *YEN
  BASE MODELL                    * * * * * * *YEN
  ENGINE & TRANSMISSION
     1. 6L (125PS) & 4AT ABS     +* * * * * * *YEN
  SUSPENSION / TIRE & WHEEL
     185 / 60R14 & alloy wheel   +* * * * *YEN
  EXTERIOR (PAINT COLOR)    +* * * * *YEN
     FOG LAMP
     POWER MIRROR                +* * * * *YEN

FIG. 28

| CUSTOM VEHICLE ESTIMATION / ORDERING SYSTEM |

SALES PRICE ESTIMATION DEMAND & QUICK EVALUATION APPLICATION
FILL ALL REQUIRED FIELDS, AND THEN CLICK NEXT BUTTON.

- IF YOU HAVE ALREADY ACQUIRED ID / PASSWORD OF THIS SERVICE, ENTER YOUR ID / PASSWORD, AND THEN CLICK DISPLAY BUTTON. YOU CAN SKIP SOME INPUTS.

ID [          ]

PASSWORD [          ]    [ DISPLAY ]

(CUSTOMER INFORMATION)

- NAME [          ] [          ]

- PHONETIC SYMBOLS [          ] [          ]

- APPLY FOR QUICK EVALUATION ?
  ○ YES      ○ NO
              ↓

[ BACK ]  [ NEXT ]

FIG. 29

CUSTOM VEHICLE ESTIMATION / ORDERING SYSTEM

QUICK EVALUATION APPLICATION FORM

- FILL ALL ITEMS.
- WE EVALUATE YOUR CAR FOR FREE, AND SEND YOU REPLY RESULT VIA E-MAIL.
- REPLIED PRICE IS BASED ON YOUR APPLICATION CONTENTS IF YOUR VEHICLE MAINTAINS NORMAL CONDITION, AND HAS SOME RANGE AS REFERENCE VALUE.
- WE DO NOT GUARANTEE TRADE-IN AT THAT PRICE.
- FORMALLY, WE WILL EVALUATE YOUR VEHICLE IN DETAIL UPON PURCHASE CONTRACT OF NEW CAR.

- ● MANUFACTURER NAME
- ● VEHICLE NAME
- ● BODY TYPE
- ● DISPLACEMENT
- ● GRADE
- ● TRANSMISSION TYPE    ○ MT  ○ AT  ○ OTHER
- ● FUEL    ○ GASOLINE  ○ DIESEL OIL  ○ OTHER
- ● DRIVE SYSTEM    ○ FF  ○ FR  ○ 4WD  ○ OTHER
- ● DOORS    ○ 2 DOORS  ○ 3 DOORS  ○ 4 DOORS  ○ 5 DOORS
- ● BODY COLOR
- ● FIRST REGISTERED YEAR    [ ▽ ] YEAR  [3 ▽] MONTH
- ● NEXT CAR SAFETY CHECK    [ ▽ ] YEAR  [3 ▽] MONTH
- ● TOTAL KILOMETRAGE    [         ] km
- ● ACCIDENT HISTORY    ○ YES    ○ NO

BACK    NEXT

FIG. 30

| CUSTOM VEHICLE ESTIMATION / ORDERING SYSTEM |

ENTER YOUR MEMBER ID AND PASSWORD,
AND THEN CLICK SUBMIT BUTTON

MEMBER ID [          ]

PASSWORD [          ]

[ SUBMIT ]

FIG. 31

CUSTOM VEHICLE ESTIMATION / ORDERING SYSTEM

[○○○○'S PURCHASE REVIEW LIST]

TO REVIEW DETAILS, CLICK INDIVIDUAL INFORMATION. YOU CAN APPLY FOR NEGOTIATION BY "NEGOTIATION APPLICATION" BUTTON ON ESTIMATION DETAIL WINDOW DISPLAYED WHEN YOU CLICK DESIRED ESTIMATION

ESTIMATION LIST

| ESTIMATION ID | ESTIMATION REPLY DATE | VEHICLE NAME | ENGINE / TRANSMISSION | BODY COLOR | INTERIOR | ESTIMATION DEALER |
|---|---|---|---|---|---|---|
| E0031 | 2001. 2. 10 | VEHICLE TYPE A (SPORT TYPE) | 1800 / 6MT | WHITE | TAN | ○○○○ |
| E00157 | 2001. 2. 15 | VEHICLE TYPE A (SPORT TYPE) | 1800 / 6MT | GREEN | TAN | ○○○○○ |
| E00382 | 2001. 2. 23 | VEHICLE TYPE A (SPORT TYPE) | 1600 / 5MT | GREEN | TAN | ○○○○ |

TRADE-IN QUICK EVALUATION LIST

| EVALUATION ID | EVALUATION REPLY DATE | MANUFACTURER NAME | VEHICLE NAME | ENGINE / TRANSMISSION | DRIVE SYSTEM | BODY COLOR | EVALUATION DEALER |
|---|---|---|---|---|---|---|---|
| T00032 | 2001. 2. 10 | ○○ | □ | 1600 / MT | MR | RED | ○○○○ |
| T00055 | 2001. 2. 10 | △△ | ◇ | 1500 / AT | FF | WHITE | ○○○○○ |

CREDIT SCREENING LIST SCREENING : ○○○ COMPANY

| SCREENING ID | SCREENING REPLY DATE | TOTAL AMOUNT | DOWN PAYMENT (INCLUDING TRADE-IN) | PAYMENT TERMS | SCREENING RESULT |
|---|---|---|---|---|---|
| C00035 | 2001. 2. 10 | ****YEN | ****YEN | 36 | OK |
| C00035 | 2001. 2. 10 | ****YEN | ****YEN | 24 | NG |

BACK   NEXT

FIG. 32

| CUSTOM VEHICLE ESTIMATION / ORDERING SYSTEM |

DETAILS OF ○○○○ DEALER ESTIMATION RESULT

| NEGOTIATION APPLICATION | CREDIT EXAMINATION | ESTIMATED SPECIFICATION IMAGE CONFIRMATION |

ESTIMATION NO. 1234567
ESTIMATION REPLY DATE : 2000. 3. 5
ESTIMATION VALID DATE : 2000. 4. 5
ESTIMATION DEALER : KANTO △△△ SETAGAYA EIGYOSHO

- ● ESTIMATION TOTAL AMOUNT  \*\*\*\*\*\*\*YEN
  - ■ VEHICLE PRICE   \*\*\*\*\*\*\*YEN
    - BASE MODEL   \*\*\*\*\*\*\*YEN
    - 185/60R14 & allow wheel   +¥\*\*\*\*\*\*YEN
    - FOG LAMP   +¥\*\*\*\*\*\*YEN
    - POWER MIRROR   +¥\*\*\*\*\*\*YEN
    - Red suede synthetic & Nardi leather   +¥\*\*\*\*\*\*YEN
    - POWER DOOR LOCK   +¥\*\*\*\*\*\*YEN
  - ■ OPTION TOTAL AMOUNT   \*\*\*\*\*YEN
    - SEAT MAT   ITEM NUMBER A010   +¥\*\*\*\*\*\*YEN
    - KEY HOLDER   ITEM NUMBER A020   +¥\*\*\*\*\*YEN
    - NUMBER PLATE   ITEM NUMBER A050   +¥\*\*\*\*\*\*YEN
- ■ VEHICLE TOTAL   \*\*\*\*\*\*\*YEN
- ■ WEIGHT TAX   \*\*\*\*\*YEN
- ■ ACQUISITION TAX   \*\*\*\*\*YEN
- ■ VEHICLE TAX (REGISTERED : FEBRUARY)   \*\*\*\*YEN
- ■ CONSUMPTION TAX
- ■ AUTOMOBILE LIABILITY INSURANCE (37 MONTHS)   \*\*\*\*\*YEN
- ■ OTHER CHARGES   \*\*\*\*\*YEN

TOTAL   \*\*\*\*\*\*\*YEN

| BACK TO PURCHASE REVIEW LIST |

FIG. 33

CUSTOM VEHICLE ESTIMATION / ORDERING SYSTEM

CREDIT CALCULATION

※IF CREDIT SCREENING RESULT IS OK,
SPECIAL LOW INTEREST RATE ○○% IS APPLIED TO YOUR VEHICLE.

- ☐ VEHICLE TOTAL
- PURCHASE TOTAL AMOUNT (YEN) [ **** ]
- ☐ INPUT DOWN PAYMENT (INCLUDING TRADE-IN EVALUATED PRICE) WITH REFERENCE TO QUICK EVALUATION RESULT, ETC.
- DOWN PAYMENT (INCLUDING TRADE-IN PRICE) (YEN) [        ]
- ☐ CREDIT BASE IS
- CREDIT BASE (YEN) [ **** ]
- ☐ SELECT PAYMENT TERMS
- PAYMENT TERMS [ 36 ▽ ]
- ☐ SELECT PAYMENT METHOD
- BONUS PAYMENT COMBINED  ○ YES   ○ NO
- BONUS PAYMENT MONTH   [ JUNE ▽ ]   [ DECEMBER ▽ ]
- ADDED AMOUNT OF BONUS MONTH (YEN) [        ] ×2 (PER YEAR)

[ CALCULATE ]   [ CLEAR ]

[ CREDIT CALCULATION ]

[ ESTIMATION DETAIL WINDOW ]

FIG. 34

CUSTOM VEHICLE ESTIMATION / ORDERING SYSTEM

CREDIT CALCULATION RESULT

| PAYMENT TERMS | |
|---|---|
| CREDIT BASE | YEN |
| FEE RATE (INTEREST) | % |
| INSTALLMENT FEE | YEN |
| CREDIT TOTAL AMOUNT OF PAYMENT | YEN |
| PAYMENT OF THE FIRST TIME | YEN |
| MONTHLY PAYMENT | YEN × TIMES |
| ADDED AMOUNT OF BONUS MONTH | YEN × TIMES |

★CREDIT CALCULATION RESULT IS REFERENCE PRICE. CONTACT YOUR DEALER FOR DETAILS.
★CREDIT USE IS ACCEPTED BY ○○○○. IN THIS CASE, CLICK CREDIT SCREENING APPLICATION BUTTON TO APPLY FOR CREDIT SCREENING.

[BACK]   [CREDIT SCREENING APPLICATION]

ESTIMATION DETAIL WINDOW

F I G. 35

CUSTOM VEHICLE ESTIMATION / ORDERING SYSTEM

NEGOTIATION APPLICATION
※ ENTER ALL FIELDS BELOW AND CLICK "NEGOTIATION APPLICATION" BUTTON AFTER YOU CONFIRM VEHICLE TYPE YOU WANT TO NEGOTIATE AND CUSTOMER INFORMATION.

● PLEASE ANSWER
☐ TRADE-IN?
○ YES   ○ NO
→ WE WILL EVALUATE YOUR VEHICLE UPON NEGOTIATION AT DEALER.
☐ USE SPECIAL LOW INTEREST RATE 2.9% CREDIT FOR PAYMENT ?
○ YES   ○ NO (CASH)
☐ DESIRED NEGOTIATION DATE
  ▽
  *PLEASE SELECT DAY FROM SIX TO 14 DAYS AFTER TODAY

● VEHICLE TYPE YOU WANT TO NEGOTIATE IS AS FOLLOWS.

DETAILS OF CUSTOM VEHICLE

NEGOTIATION APPLICATION

BACK

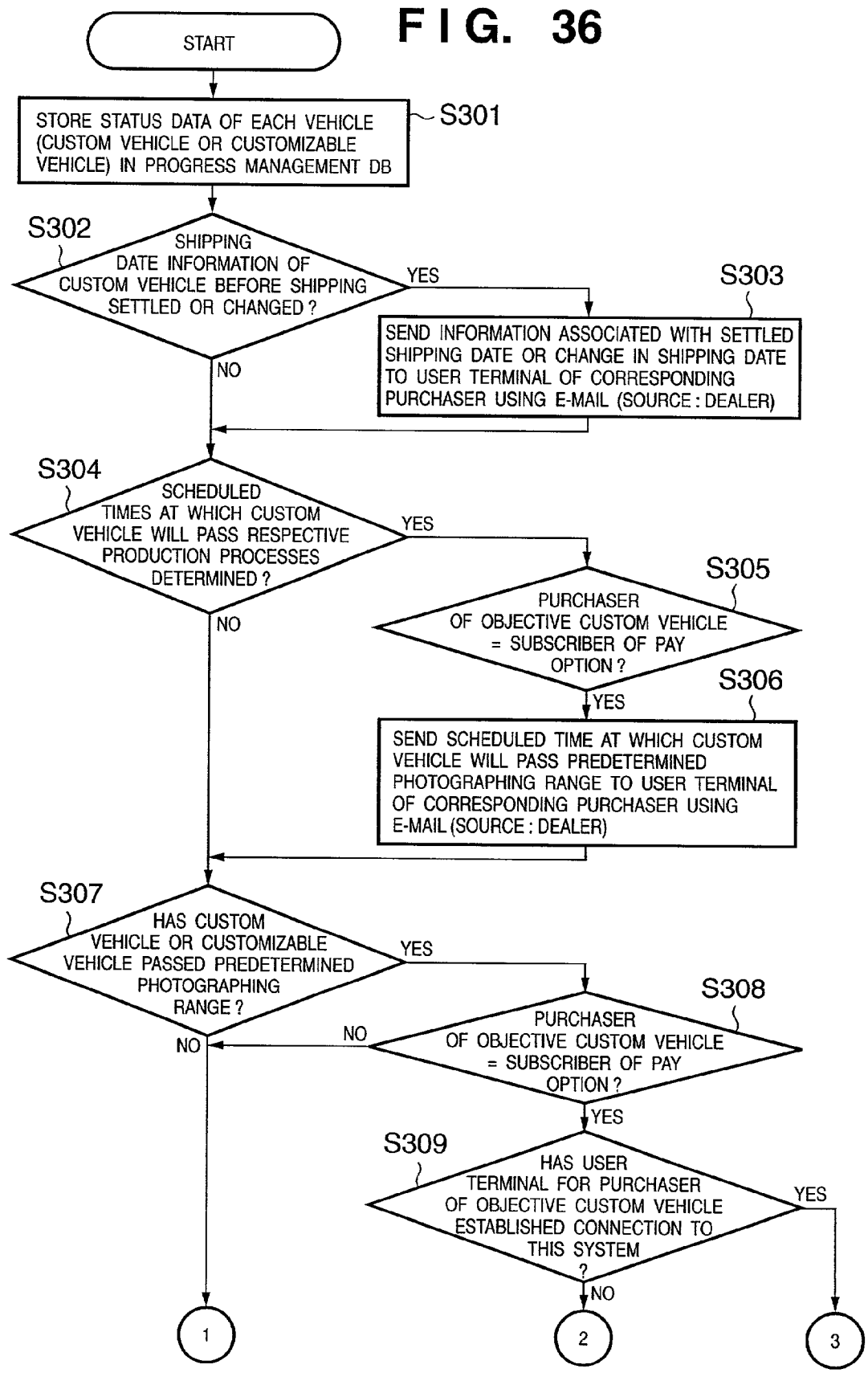

F I G. 42
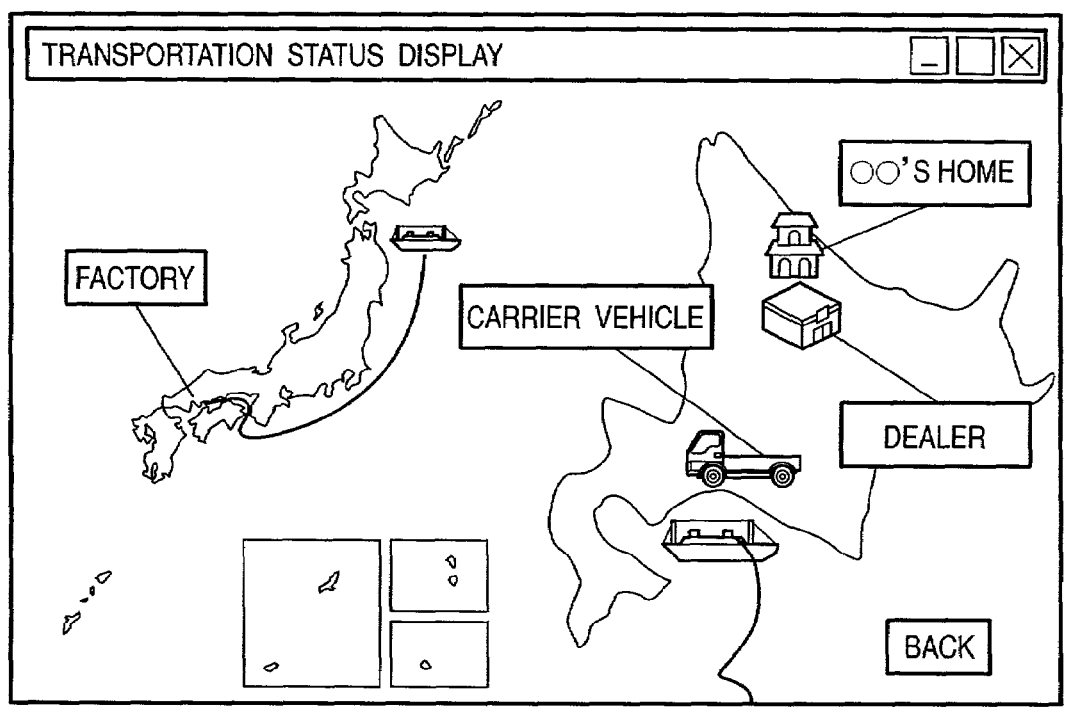

US 7,020,584 B2

VEHICLE INFORMATION PROVIDING APPARATUS, VEHICLE INFORMATION PROVIDING SYSTEM, VEHICLE INFORMATION PROVIDING METHOD, COMPUTER PROGRAM, AND COMPUTER READABLE STORAGE MEDIUM

FIELD OF THE INVENTION

The present invention relates to the field of a vehicle information providing apparatus that provides on-line information associated with a vehicle to a user's information terminal via a communication line.

BACKGROUND OF THE INVENTION

As a conventional information providing apparatus that provides price information associated with an article to the user, the following apparatus is known. That is, as disclosed in Japanese Patent Laid-Open No. 5-274326, catalog information of articles as objects for sale is stored in a database in the form of multimedia information, and information associated with a given article specified on a computer system is read out from the database to allow external output, estimation, shipping inquiry, order reception process, and the like.

In the field of automobiles as a representative vehicle, a technique for providing on-line information associated with a vehicle to a user's information terminal via a communication line has been proposed. As an example of such technique, Japanese Patent Laid-Open No. 7-199820 proposes a technique for making on-line virtual exhibition of automobiles.

According to the technique of Japanese Patent Laid-Open No. 7-199820, a customer who wants to purchase an automobile not only can collect article catalogues but also can browse information associated with a plurality of types of automobiles without visiting many dealers. Hence, such technique is convenient for the customer and allows dealers to make efficient business activities.

However, the technique of Japanese Patent Laid-Open No. 7-199820 makes only on-line virtual exhibition of automobiles. It does not disclose about providing on-line status information, from when the virtual exhibition is made until the automobile is delivered, to the user.

Also, Japanese Patent Laid-Open No. 5-274326 can make external output, estimation, shipping inquiry, order reception process, and the like of a special article using information stored in a database. However, it does not disclose about providing on-line status information, from when the order reception process and the like is made until the automobile is delivered, to the user.

A purchasing process itself, i.e., from selection until actual order of an article to be purchased, is fun for general customers. However, the above prior arts or other conventional systems cannot satisfy customer's (user's) expectation upon purchasing an automobile from when the customer has made purchase contract until the automobile is actually delivered, and a new scheme (entertainability) that can satisfy the customer's expectation is demanded.

SUMMARY OF THE INVENTION

The present invention has been proposed to solve the conventional problems, and has as its object to provide a vehicle information providing apparatus, vehicle information providing system, vehicle information providing method, a computer program, and a computer readable storage medium which provide to the user progress status, with entertainability, of a specific vehicle until shipping.

In order to achieve the above object, a vehicle information providing apparatus according to the present invention is characterized by the following arrangement.

That is, a vehicle information providing apparatus comprises information acquisition means (information acquisition function: M7, FIGS. 36 to 38) for accessing a storage device (32) and acquiring information associated with progress status of a plurality of vehicles before shipping, which information is stored in the storage device; and information providing means (information providing function: M7, FIGS. 36 to 38) for, by controlling the information acquisition means to refer to the storage device by using an identification information as a key, acquiring information associated with progress status of a specific vehicle corresponding to the identification information, the identification information which is acquired from an information terminal (5) that is connected via a communication line to allow two-way communications and specifies a user of the information terminal or a vehicle, and for providing the acquired information to the information terminal from which the identification information was output.

With the above apparatus arrangement, a vehicle information providing apparatus with entertainability, which provides the progress status of a specific vehicle until shipping can be realized. That is, the user can recognize respective stages until shipping of the ordered specific vehicle on his or her information terminal such as a computer or the like, and expectation of the user who is looking forward to delivery can be satisfied.

In a preferred embodiment, the information associated with progress status of the vehicle contains an image (FIGS. 22, 43, 44) that represents situations in a plurality of stages until the specific vehicle is shipped, a photographed image (e.g., a still or video image: FIG. 39) of the specific vehicle under assembly in an assembly line of a vehicle manufacturer, or an image (FIGS. 41, 42) or coordinate position information which indicates a transportation route and/or a current position upon transportation of the specific vehicle which has undergone assembly in a vehicle manufacturer. In this case, the user can easily recognize respective stages until shipping of the ordered specific vehicle by means of photographed images under assembly, and images that contain the transportation route and/or the current position upon transportation, and expectation to shipping and entertainment until shipping can be improved.

In each of the above apparatus arrangements, preferably, the information providing means provides the information associated with progress status of the vehicle to the information terminal, from which the identification information was output, in response to acquisition of the identification information or at a predetermined timing. In this way, the user's convenience can be improved.

For example, the information associated with progress status of the vehicle contains a scheduled assembly time of the specific vehicle in an assembly line of a vehicle manufacturer, and the information providing means informs a user, who waits for delivery of the specific vehicle, of the scheduled assembly time of the specific vehicle prior to that scheduled assembly time, and provides a photographed image (FIGS. 43, 44) of the specific vehicle under assembly in the assembly line to the information terminal from which the identification information was output when the scheduled assembly time has been reached. In this manner, the user can visually recognize the actual assembly process of the specific vehicle that he or she ordered, thus improving expectation to shipping and entertainment until shipping.

In a preferred embodiment, when the information acquisition means recognizes that the information associated with progress status of the plurality of vehicles, which information is stored in the storage device, has been updated by information associated with a change in shipping date, the information providing means specifies a specific vehicle, the shipping date of which has been changed, in accordance with the identification information, and informs an information terminal specified by the identification information of the change in shipping date of the specific vehicle. With this arrangement, for example, the user can be efficiently informed of the settled shipping date or a change in shipping date (e.g., a delay of shipping date) via, e.g., an e-mail message.

In case that the communication line includes an Internet, the information providing means preferably provides information (more specifically, update history information or the like) associated with progress status of the specific vehicle to the information terminal as a data file of a Web page described in a predetermined data format. In this way, respective stages until shipping of the specific vehicle that the user ordered can be easily informed using the Internet, which is prevalent today.

In a preferred embodiment, the information associated with progress status of the vehicle, which is acquired by the information acquisition means contains photographed images of at least all vehicles which are under assembly in the assembly line of the vehicle manufacturer and are customizable as the specific vehicle, or time information upon completion of assembly of the specific vehicle in the assembly line of the vehicle manufacturer (see the lower right portion of FIG. 43).

For example, the information acquisition means preferably composites a name of a purchaser of the specific vehicle to the photographed image (see the lower left portion of FIG. 43).

More specifically, when the progress status of each stage until shipping of the specific vehicle is provided to a purchaser (user of the information terminal) using photographed images, the assembly states of that specific vehicle must be photographed in turn in the assembly line, while another vehicle which is under assembly in the assembly line and is customizable as the specific vehicle may be assigned (reserved) as the specific vehicle according to the order so as to assure a short shipping term. In this case, photographed images of that vehicle before it was ordered as the specific vehicle are often not available. However, according to the above apparatus arrangement, since photographed images of all vehicles that are customizable as the specific vehicle are prepared as information which pertains to the progress status of a vehicle, photographed images before assignment corresponding to the ordered specific vehicle are acquired from those of the vehicles, thus providing the photographed images of respective stages from the beginning of assembly to finishing to the purchaser of the ordered specific vehicle, and allowing that purchaser to enjoy the processes themselves until shipping. Since the purchaser of the specific vehicle can recognize the time of completion of assembly of the ordered specific vehicle, his or her expectation to shipping can be enhanced. Since the name of the purchaser of the specific vehicle is composited on the photographed images, expectation to shipping of that purchaser can be enhanced.

Preferably, when the information which contains an image of the specific vehicle and is associated with progress status of the vehicle is provided as a pay service to a purchaser of the specific vehicle, production of the specific vehicle starts after a purchaser has subscribed to the pay service.

More specifically, in case that a vehicle which is under assembly and is customizable as the specific vehicle is assigned to the specific vehicle according to the order, photographed images of that vehicle before it was ordered as the specific vehicle are often not available. By contrast, according to the above apparatus arrangement, photographed images of respective stages from the initial stage of assembly (an unpainted stage before principal components which form a body are assembled) until finishing (e.g., shipping) can be provided to a purchaser who subscribed to a pay service, and expectation to shipping of that purchaser can be enhanced. In this case, an additional job for adjusting the production plan of the assembly line is generated for the vehicle manufacturer to provide photographed images in respective stages of production in nearly real time, but the value received for that job is provided by additional cost received from the purchaser as a pay service, and it is a reasonable business option.

Preferably, the information which contains an image of the specific vehicle and is associated with progress status of the vehicle contains names and/or photos of operators who participate in a plurality of stages until the specific vehicle is shipped. In this way, since the purchaser of the specific vehicle can recognize operators who are concerned in a plurality of stages until the ordered specific vehicle is shipped by means of their names and/or photos, the sense of responsibility on jobs can be enhanced on the part of these operators. Also, on the part of the purchaser, expectation to shipping, and confidence and attachment to the delivered specific vehicle can be enhanced.

In a preferred embodiment, when the apparatus further comprises assembly schedule adjustment means for, when the specific vehicle is assembled in an assembly line of a vehicle manufacturer, adjusting a schedule of the assembly line or requesting an external device that manages the assembly line to adjust a schedule, so as to allow the user to participate in a predetermined assembly process, the information providing means informs the user of a schedule that allows the user to participate in the predetermined assembly process as the adjustment result by the schedule adjustment means.

Preferably, when the schedule adjustment means has adjusted the schedule, as described above, the information providing means provides a man-machine interface (FIG. 39), which allows the user to make the predetermined assembly process by remote control while observing a display image obtained by photographing a state of the assembly process, to the information terminal connected via the communication line to allow two-way communications.

That is, according to the above apparatus arrangement, since the purchaser of the specific vehicle can make predetermined assembly operation by himself or herself by remote control using the provided man-machine interface, he or she can enjoy the processes themselves until shipping, and expectation to shipping, and attachment to the delivered specific vehicle can be enhanced.

Preferably, when a special situation falling outside a plurality of predetermined stages until the specific vehicle is shipped has occurred (e.g., air transportation of principal components), the information providing means provides information associated with the special situation to the information terminal. For example, if a principal component such as an engine or the like is transported by air, the purchaser of the specific vehicle can recognize such situation by the window, as shown in, e.g., FIG. 41, he or she can enjoy the processes themselves until shipping, and expectation to shipping, and attachment to the delivered specific vehicle can be enhanced.

Preferably, the information providing means provides gathering situation of components required to build the specific vehicle to a vehicle manufacturer with the user being able to recognize the gathering status on a map displayed on the information terminal in nearly real time. In this way, since the purchaser of the specific vehicle can recognize the gathering state of components required to build the ordered specific vehicle to the vehicle manufacturer by the map displayed using the window shown in, e.g., FIG. 41 on the information terminal, he or she can enjoy the processes themselves until shipping, and expectation to shipping can be enhanced.

In a preferred embodiment, when a plurality of photographing devices (14) are arranged in the assembly line of the vehicle manufacturer to photograph a vehicle in a plurality of stages in assembly, the information providing means provides a man-machine interface (FIG. 39) which can select a desired one of the plurality of photographing devices to the information terminal of a purchaser of the specific vehicle, which is connected via the communication line to allow two-way communications. In this case, preferably, the man-machine interface can adjust a photographing state of the selected photographing device by remote control from the information terminal.

That is, according to the above apparatus arrangement, since the purchaser of the specific vehicle can watch the assembly process of the specific vehicle he or she ordered in a desired photographing state corresponding to his or her remote control using the information terminal, he or she can enjoy the processes themselves until shipping, and expectation to shipping can be enhanced.

Note that the above object can also be achieved by a program code that makes a computer implement the information providing apparatus, a computer readable storage medium which stores that program code, a vehicle information providing system which comprises the information providing apparatus and an information terminal, and a vehicle information providing method corresponding to that system.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 28 shows an example of an estimation demand top window in the embodiment of the present invention;

FIG. 29 shows an example of an evaluation application input window C-1 in the embodiment of the present invention;

FIG. 30 shows an example of an ID/password input window D-1 in the embodiment of the present invention;

FIG. 31 shows an example of a purchase review information list window D-2 in the embodiment of the present invention;

FIG. 32 shows an example of an estimation item confirm window D-3 in the embodiment of the present invention;

FIG. 33 shows an example of a loan condition input window E-1 in the embodiment of the present invention;

FIG. 34 shows an example of a payment plan display window E-2 in the embodiment of the present invention;

FIG. 35 shows an example of a negotiation application input window F-1 in the embodiment of the present invention;

FIG. 36 is a flow chart showing the progress status management process executed by the vehicle manufacturer server 1;

FIG. 42 shows an example of a transportation status display window of a custom vehicle;

DETAILED DESCRIPTION OF THE PREFERRED EMBODIMENTS

A preferred embodiment in which the present invention is applied to an estimation/ordering system of a custom vehicle (specific vehicle) of an automobile as a representative vehicle will be described in detail hereinafter with reference to the accompanying drawings.

In this embodiment, a custom vehicle is a vehicle for which the user (customer) himself or herself has desirably customized a plurality of predetermined items on the basis of a standard vehicle (base vehicle) that comprises predetermined specifications/equipment using the system of the present invention. That is, the system according to this embodiment is an automobile estimation/ordering system that allows the user (customer) himself or herself to desirably customize a plurality of items set in advance on the basis of a standard vehicle (base vehicle) that comprises predetermined specifications/equipment, and such customized vehicle will be referred to as a custom vehicle.

[Overall Hardware Arrangement]

Figure 1:
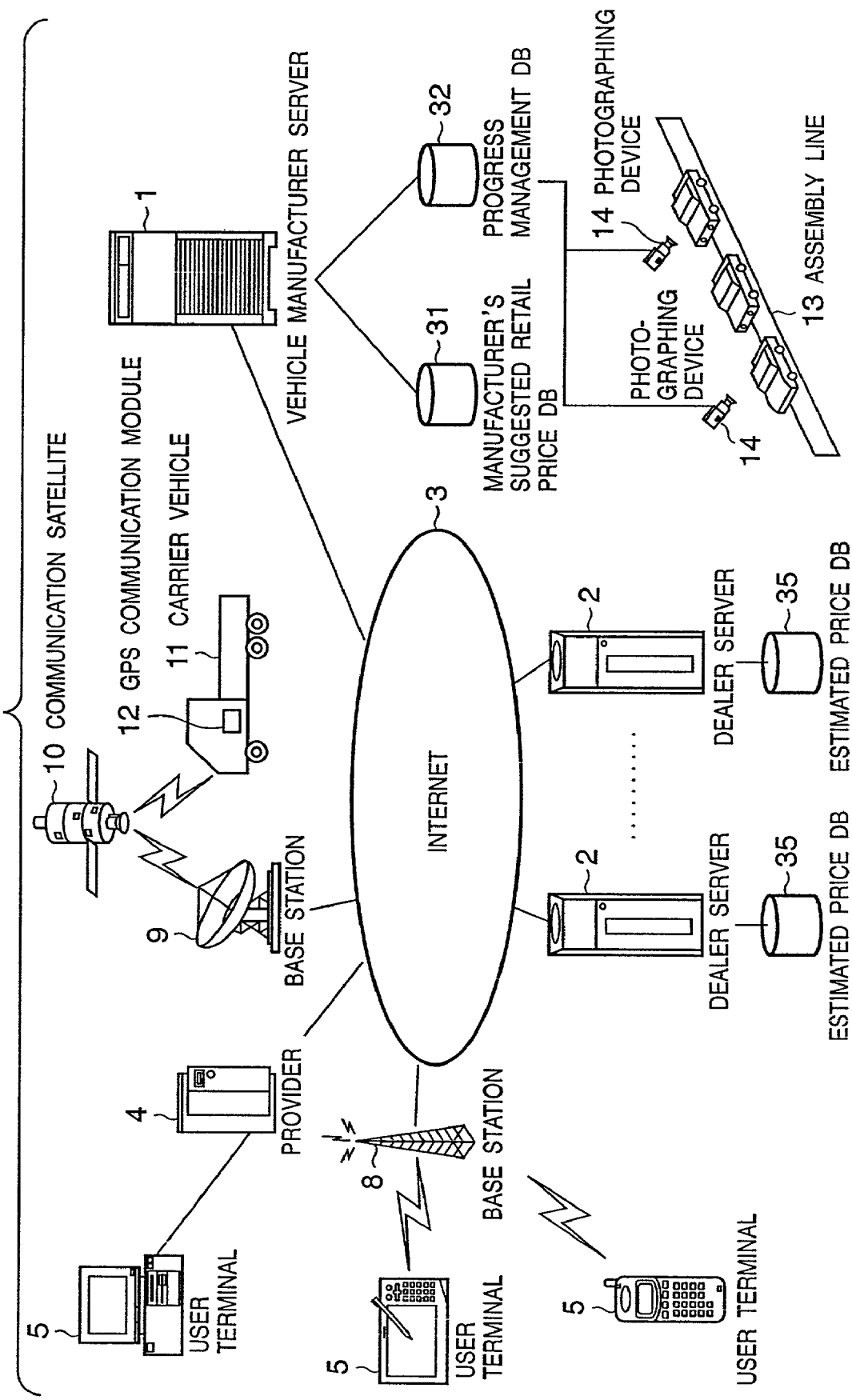
FIG. 1 is a schematic diagram showing the overall arrangement of a custom vehicle estimation/ordering system in an embodiment of the present invention.

FIG. 1 is a schematic diagram showing the overall arrangement of a custom vehicle estimation/ordering system in this embodiment.

Referring to FIG. 1, reference numeral 1 denotes a server computer for a vehicle manufacturer, which manufactures a custom vehicle, which is customized and ordered by the custom vehicle estimation/ordering system according to this embodiment. The server computer 1 mainly serves as an application server for a user terminal 5. This server computer may be equipped in the vehicle manufacturer or may be managed by a third party for that vehicle manufacturer (in this embodiment, this server computer will be referred to as a vehicle manufacturer server hereinafter).

The vehicle manufacturer server 1 can access a manufacturer's suggested retail price database (DB) 31 and a progress management DB 32 by a general scheme as needed during its operation. The manufacturer's suggested retail price DB 31 pre-stores retail prices suggested by the vehicle manufacturer (to be referred to as manufacturer's suggested retail prices hereinafter) for respective specification items as possible choices for a custom vehicle in this system in association with identification information that specifies each specification item (the progress management DB 32 will be described later).

Reference numeral 2 denotes a server computer which determines an estimated price of a given automobile, so as to actually sell that automobile, the specifications of which are determined using the custom vehicle estimation/ordering system according to this embodiment. The server computer 2 may be present in the vehicle manufacturer, may be present in a dealer which sells automobiles of the vehicle manufacturer, or may be managed by a third party for that vehicle manufacturer (in this embodiment, this server computer will be referred to as a dealer server hereinafter).

The dealer server 2 can access the manufacturer's suggested retail price DB 31 by a general scheme as needed during its operation, and can acquire manufacturer's suggested retail prices for respective specification items, which are pre-stored in the manufacturer's suggested retail price DB 31 together with identification information for each specification item, and store them in an estimated price DB 35.

The user of the dealer server 2 sets estimated prices of specification items, which are to be automatically presented to respective users when the dealer sells the specification items, with reference to the manufacturer's suggested retail prices for respective specification items stored in the estimated price DB 35. Note that the operation of the dealer server 2 will be described later with reference to FIG. 20.

Note that it is difficult for the user of the dealer server 2 to actually set estimated prices of a huge number of specification items set by the vehicle manufacturer in the server. Hence, in a preferred embodiment, when discounts (%) for manufacturer's suggested retail prices of a plurality of specification items selected by the user of the dealer server 2 are input, the discounted estimated prices of these specification items are automatically set.

In this embodiment, when a plurality of dealers are present, a given dealer can access the estimated price DB 35 managed by itself, and can refer to and change the registered contents. However, in order to guarantee the autonomy and independency of sales business operations by respective dealers, a given dealer cannot refer to or change the contents of an estimated price DB 35 managed by another dealer using a general security function.

In this embodiment, the vehicle manufacturer server 1 cannot refer to or change the estimated prices of respective specification items, which are set in the estimated price DB 35 equipped in the dealer, so as not to influence sales business operations and estimated prices of the dealer (i.e., to guarantee the independency of sales business operations of the dealer).

Even when the estimated price DB 35 is equipped in the vehicle manufacturer (e.g., in a storage device (database) connected to the vehicle manufacturer server 1), the vehicle manufacturer cannot refer to or change the estimated prices in the estimated price DB 35 so as to guarantee the independency of sales business operations by respective dealers. When the estimated price of a vehicle that has already been customized is calculated by the vehicle manufacturer server 1, the server 1 must be able to only refer to the contents of the estimated price DB 35.

More specifically, the dealer purchases articles from the vehicle manufacturer and brand manufacturers of various decoration parts, audio products, and the like, sets sales prices (so-called resale prices) of purchased articles, and sells them to customers. Upon selling, an act of interfering with the sales prices of articles by the manufacturer as a supplier constitutes violation of the principle of free competition on the market. Likewise, upon presenting the estimated price per custom vehicle to a customer, an act of interfering with that estimated price by the vehicle manufacturer and an act of interfering with estimated prices for respective specification items by the vehicle manufacturer, which are stored in the estimated price DB 35, based on which the estimated price per custom vehicle is calculated, constitute violation of the principle of free competition on the market.

Hence, in this embodiment, the estimated prices stored in the estimated price DB 35 (or storage area) prepared for each dealer can be referred to/updated by only the corresponding dealer server 2, and cannot be referred to (browsed)/changed by the vehicle manufacturer server 1 alone. Such arrangement of the estimated price DB 35 is satisfied irrespective of whether the estimated price DB 35 is present either inside or outside the vehicle manufacturer server 1.

When the aforementioned system arrangement is adopted, practice of the system of this embodiment can be started with minimum time and cost without preparing for special hardware and software on the dealer side, and system management after the beginning of operation is easy.

Reference numeral 3 denotes the Internet as a typical communication line. Reference numeral 5 denotes a user terminal such as a personal computer, portable information terminal, portable phone, or the like.

Reference numeral 11 denotes a carrier vehicle that carries custom vehicles delivered from the vehicle manufacturer. The carrier vehicle (including transportations such as ships, railways, and the like in this embodiment) 11 mounts a GPS communication module 12 which detects the current position of the carrier vehicle 11 and externally outputs the detected current position.

Reference numeral 13 denotes an assembly line (production line) in which at least a custom vehicle is manufactured in the vehicle manufacturer. The assembly state of the custom vehicle is photographed by a photographing device 14 such as a video camera, digital camera, or the like arranged near the assembly line 13, and the photographed video or still image is stored in the progress management DB 32 (to be described in detail later).

In the above arrangement, the user terminal 5, the vehicle manufacturer server 1, and the dealer server 2 can make two-way communications according to a general communication scheme via the Internet 3 so as to exchange information that pertains to estimation/ordering of a custom vehicle (to be described later). At this time, when the user terminal 5 is a personal computer, a telephone line or the like is used via a provider (Internet provider) 4. When the user terminal 5 is a portable information terminal or portable phone, a public wireless telephone line or the like is used via a base station 8. Such communication means themselves adopt conventional arrangements, and a detailed description thereof in this embodiment will be omitted.

The current position of the carrier vehicle 11 detected by the GPS communication module 12 is sent along the Internet 3 via a communication satellite 10 and the base station 9, and is then stored in the progress server DB 32 by the vehicle manufacturer server 1. In this case as well, such communication means themselves adopt conventional arrangements, and a detailed description thereof in this embodiment will be omitted.

Figure 2:
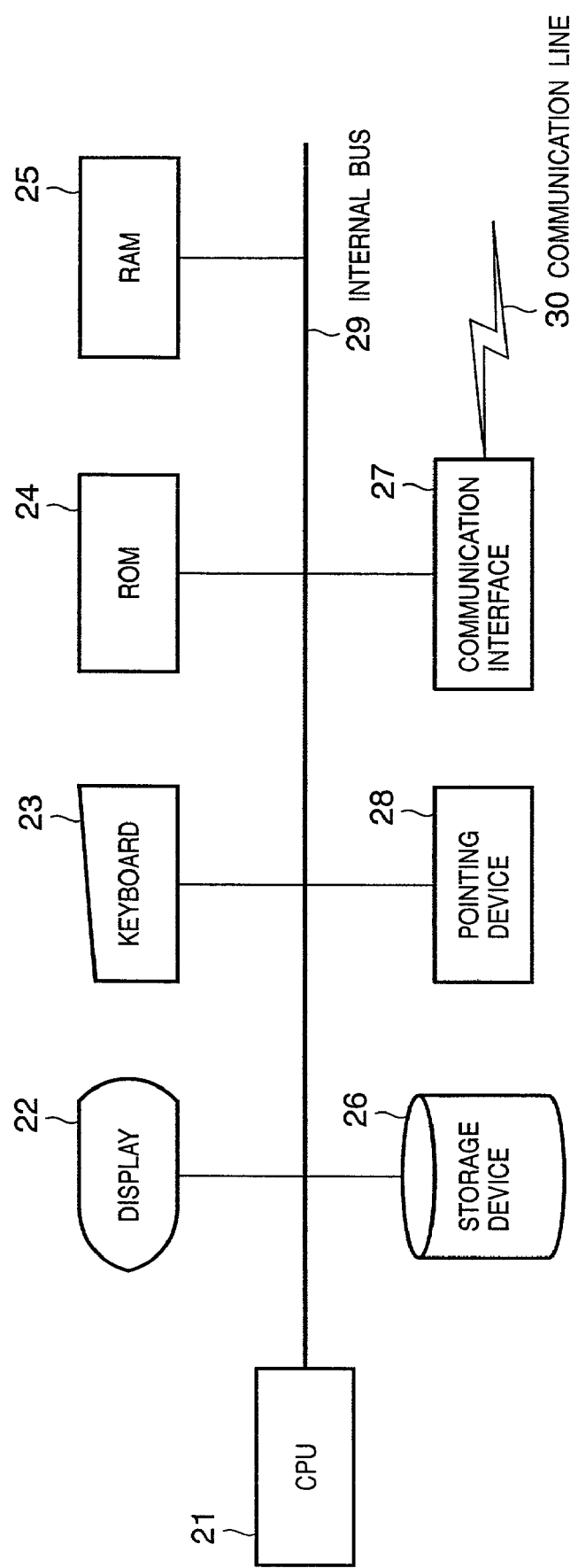
FIG. 2 is a block diagram showing an example of the internal arrangement of a vehicle manufacturer server 1, dealer server 2, and user terminal 5 in the embodiment of the present invention.

FIG. 2 is a block diagram showing an example of the internal arrangement of the vehicle manufacturer server 1, the dealer server 2, and the user terminal 5 in this embodiment.

Referring to FIG. 2, reference numeral 22 denotes a display such as a liquid crystal display or the like; and 23, a keyboard as input means. Reference numeral 24 denotes a ROM that stores a boot program and the like. Reference numeral 25 denotes a RAM that temporarily stores various processing results. Reference numeral 26 denotes a storage device such as a hard disk drive (HDD) for storing a program and the like. Reference numeral 27 denotes a communication interface, which is used to communicate with an external apparatus via a communication line 30 (the Internet 3 and the like in this embodiment), and comprises a modem or TA when the user terminal 5 is a computer or a wireless transceiver when the user terminal 5 is a portable information terminal or portable phone. Reference numeral 28 denotes a pointing device such as a mouse or the like. These building components are connected via an internal bus 29, and a CPU (central processing unit) 21 controls the overall apparatus in accordance with the program stored in the storage device 26. In this embodiment, the display 22, keyboard 23, and pointing device 28 provide to the user a so-called man-machine interface on each display window (to be described later).

In this embodiment, the vehicle manufacturer server 1, the dealer server 2, and the user terminal 5 have software (software program) of a general communication protocol, which can make Internet communications, an Internet browser function and mailer function that exchange data via the Internet 3 in accordance with that software, and general software that renders the browser.

When the CPU 21 executes such software as needed, the vehicle manufacturer server 1 and the user terminal 5 form a so-called server-client environment while the user terminal 5 establishes connection to (logs into) the vehicle manufacturer server 1 via the Internet 3.

[Functional System of Custom Vehicle Estimation/Ordering System]

Figure 3:
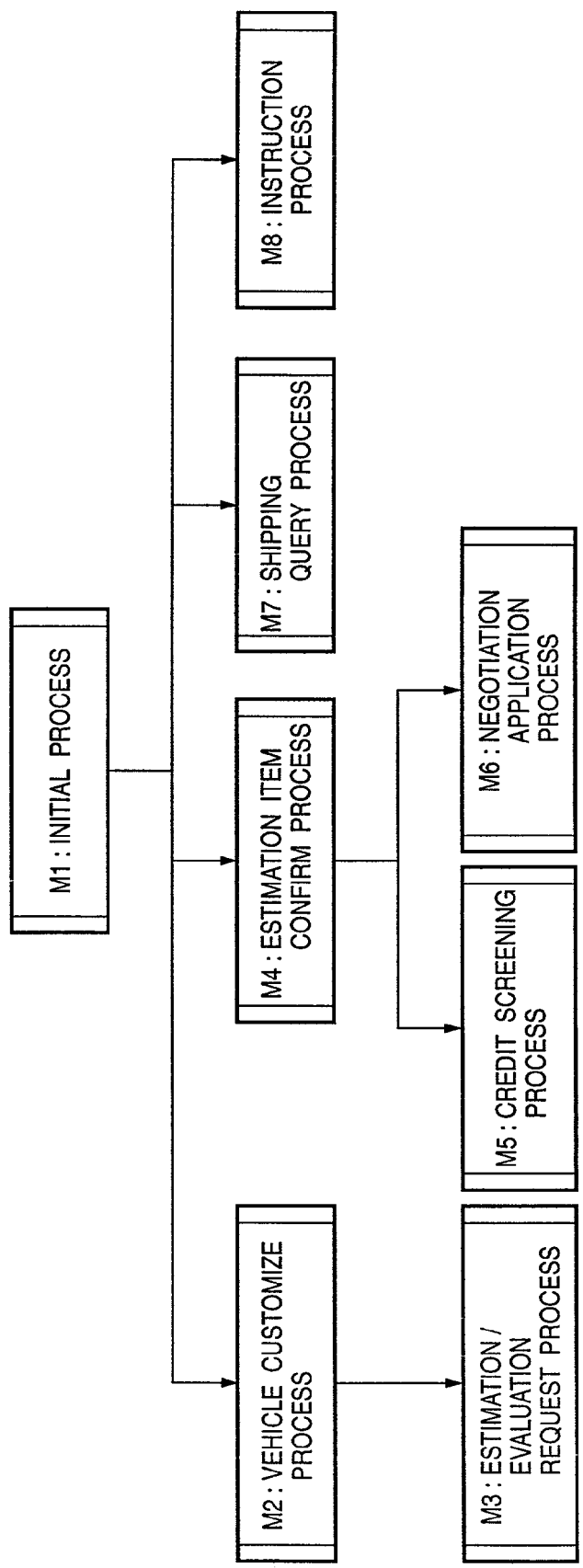
FIG. 3 is a block diagram showing a functional system of processing modules executed in the custom vehicle estimation/ordering system according to the embodiment of the present invention.

FIG. 3 shows the functional system of process modules executed in the custom vehicle estimation/ordering system according to this embodiment. Each block shown in FIG. 3 is one unit of software, which is executed by the CPU 21 of the vehicle manufacturer server 1 and is roughly classified into respective functions (to be described later). In this embodiment, such processing unit is called a processing module. These processing modules are pre-stored in the storage device 26 or the like of the vehicle manufacturer server 1.

The functions of the respective processing modules will be briefly explained below.

Initial process (M1): This module displays the top window (home page) of the custom vehicle estimation/ordering system on the user terminal, and allows jumps to other windows for customizing a custom vehicle, sending an estimation request, and so forth.

Vehicle customize process (Vehicle specifications selecting process) (M2): This module provides to the user terminal 5 an environment that can select a desired custom vehicle by repeating operations for selecting desired specifications from choices prepared in advance for a given vehicle type of automobile that the user (customer) of the user terminal 5 is seeing about purchasing. Furthermore, when the specifications of the custom vehicle are settled, this module allows jump to an estimation/evaluation request process (M3)

Estimation/evaluation request process (M3): This module provides an environment that allows the user who has settled the specifications of his or her custom vehicle to issue an estimation request of the sales price of that custom vehicle, and to issue an evaluation request of his or her vehicle as a trade-in to the dealer if he or she wants, and sends such request to the designated dealer.

Estimation item confirm process (M4): When the user of the user terminal 5 is a customer to whom the estimated price of the custom vehicle, the desired specifications of which were settled, has been presented, this module provides information such as the history of estimated prices presented so far, a specification list, and the like to that user, and allows jumps to other windows for credit screening when that user wants to purchase the custom vehicle on installment, for applying for a negotiation to actually order the vehicle, and so forth.

Credit screening process (M5): When the user (customer) wants to purchase the custom vehicle, the specifications of which have been settled, on installment, this module requests a credit company to make credit screening based on the condition input by the user.

Negotiation application process (M6): When the user (customer) wants to proceed with a negotiation for actual purchase of the custom vehicle, the specifications of which have been settled, this module sends that message to the dealer.

Shipping query process (M7): This module informs the user (customer) who ordered the custom vehicle of shipping status until that custom vehicle can be delivered in practice, and the shipping date.

Instruction process (M8): This module provides instructions about the use method and functions of the custom vehicle estimation/ordering system to the user (customer).

Figure 15:
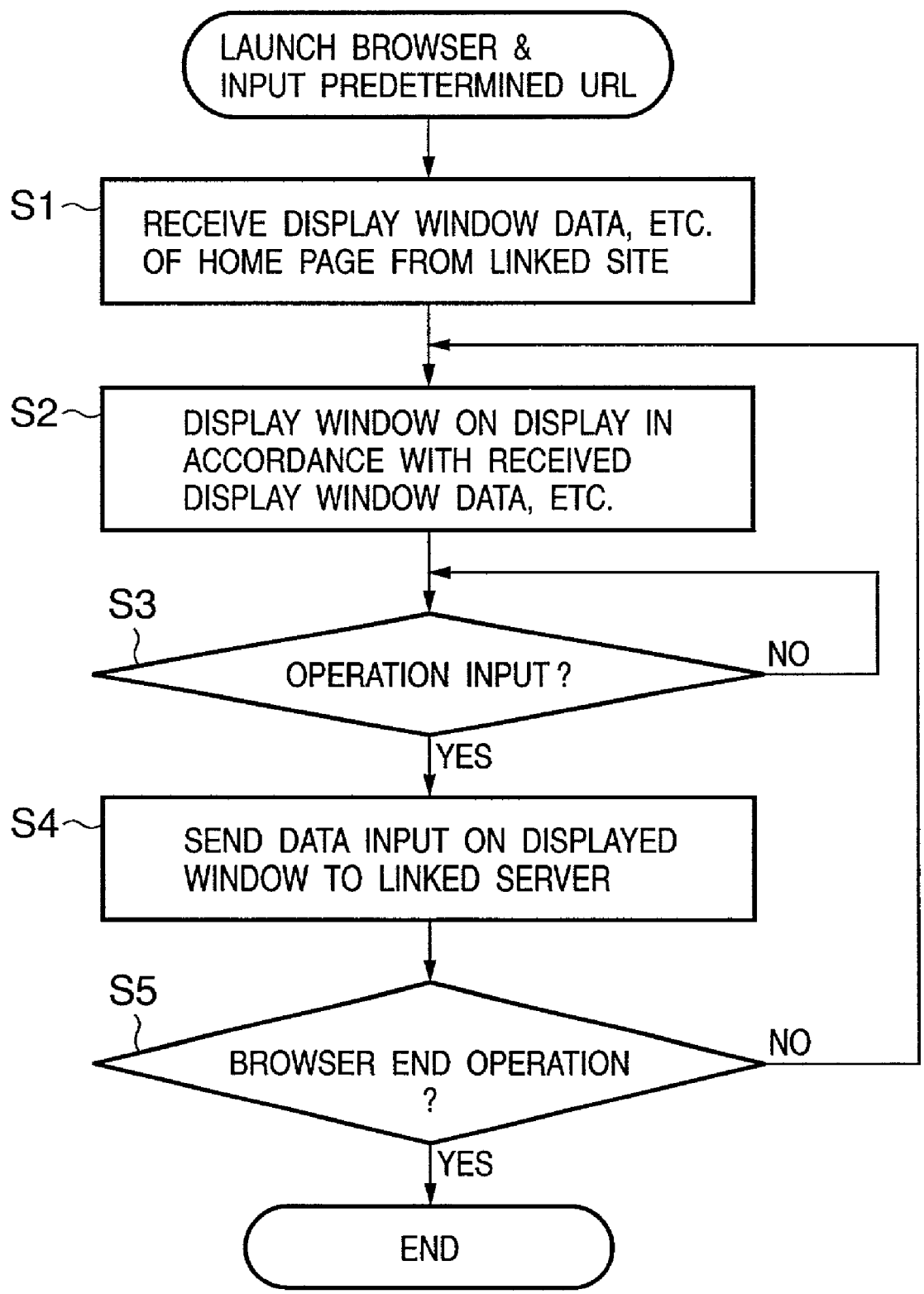
FIG. 15 is a flow chart of software executed by the user terminal 5 that receives services from the vehicle manufacturer server 1 in the embodiment of the present invention.

According to the custom vehicle estimation/ordering system described in this embodiment, the aforementioned processing modules (to be described later with reference to the flow charts shown in FIGS. 16 to 21) by the vehicle manufacturer server 1, and software of the flow chart shown in FIG. 15 is executed on the user terminal 5 as basic software for displaying various windows on the display 22 of the user terminal 5, thus providing a man-machine interface by means of display of various windows shown in FIGS. 4 to 8 (FIGS. 22 to 35) on the display 22 of the user terminal 5. Using such man-machine interface, the user (customer) of the user terminal 5 can make customization, estimation, ordering, and the like of a desired custom vehicle.

[Software Executed by User Terminal 5]

Software which is executed by the CPU 21 of the user terminal 5 to display various windows will be described below.

FIG. 15 is a flow chart of software executed by the user terminal 5 that receives services of the vehicle manufacturer server 1 in this embodiment.

The storage device 26 of the user terminal 5 pre-stores a browser program, as described above. The user launches the browser program in a predetermined procedure (i.e., loads the browser program in the storage device 26 onto the RAM 25 and executes the loaded program by the CPU 21) so as to link his or her terminal as a client with the custom vehicle estimation/ordering system that the CPU 21 of the vehicle manufacturer server 1 can execute, and inputs a predetermined URL in a predetermined area of the launched browser. After link to the custom vehicle estimation/ordering system is established via the Internet 3, the CPU 21 of the user terminal 5 starts processes in step S1 and subsequent steps.

Step S1 in FIG. 15: Display window data and the like of a home page (HP) are received from a link destination site (vehicle manufacturer server 1) to the RAM 25 via the communication interface 27. This embodiment adopts a general HTML (Hyper Text Markup Language) as an example of the Web page description language.

Step S2: A window is displayed on the display 22 in accordance with the display window data, data to be embedded in that display window, and the like, which are received from the vehicle manufacturer server 1.

Step S3: It is detected if key input of numerical values and the like from the keyboard 23 and/or pointing operation by the pointing device 28 are/is made.

Step S4: If YES (input operation is detected) in step S3, data of a predetermined input item and/or data according to the pointing operation with respect to the window displayed on the display 22 are/is sent to the vehicle manufacturer server 1 via the communication interface 27.

Step S5: It is checked if predetermined input operation indicating an end instruction of the browser is made. If NO (no end instruction is detected) in step S5, the flow returns to step S2. On the other hand, if YES (end instruction is detected) in step S5, the browser program is ended, and the area of the RAM 25 where that program resided is released.

[Software Executed by Vehicle Manufacturer Server 1]

Software to be executed by the CPU 21 of the vehicle manufacturer server 1 will be explained below. In the following description, a window display process common to the aforementioned processing modules will be explained first with reference to the flow chart shown in FIG. 16, and state transition among the respective processing modules will then be explained with reference to the flow chart shown in FIG. 17. Furthermore, transition of the display windows in the respective processing modules will be explained with reference to FIGS. 4 to 8.

(1) Window Display Process Common to Respective Processing Modules

Figure 16:
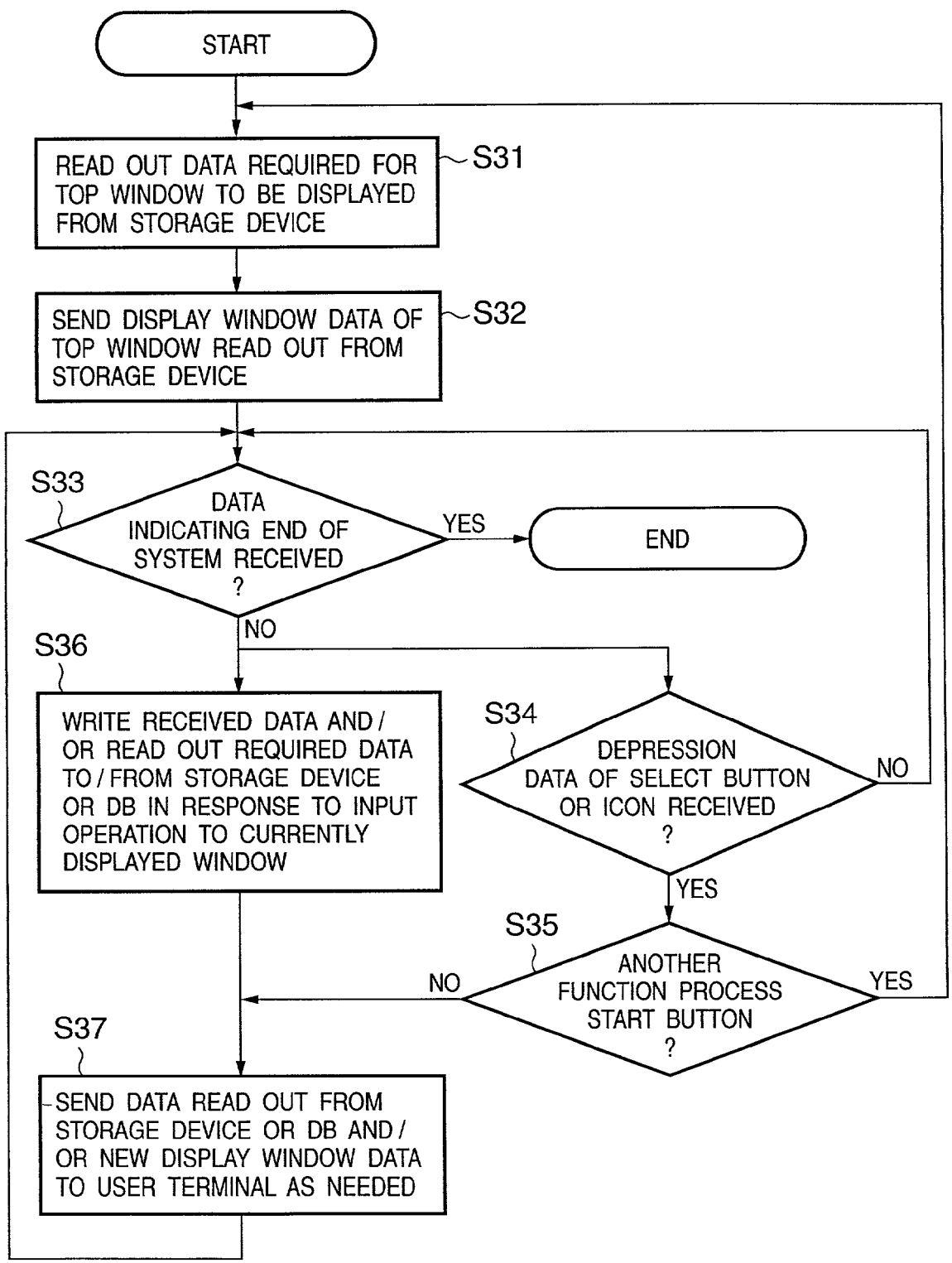
FIG. 16 is a flow chart showing a window display process common to respective processing modules executed by the vehicle manufacturer server 1 in the embodiment of the present invention.

FIG. 16 is a flow chart showing a window display process common to the respective processing modules executed by the vehicle manufacturer server 1 in this embodiment. This process is done to display a window according to user's input operation on the display 22 of the user terminal 5, which has logged into the vehicle manufacturer server 1. This process is started by the CPU 21 of the vehicle manufacturer server 1 in response to a change in function to be used by predetermined operation of the user at the user terminal 5 on each display window (to be described later).

Step S31 in FIG. 16: Data of items required for a top window (i.e., a top window corresponding to a function designated by predetermined operation) to be displayed on the user terminal 5 are read out from the storage device 26 of the vehicle manufacturer server 1.

Step S32: Display window data of the top window to be displayed and the data read out from the storage device 26 in step S31 are sent to the user terminal 5, which has logged into the server 1, via the Internet 3. At this time, the CPU 21 of the user terminal 5 which received these display window data and the like interprets the received display window data and the like by the currently running browser function, and displays the top window on the display 22 in accordance with the interpretation result.

Step S33: It is detected if data indicating the end of use of this system is received. If YES (received) in step S33, the processing is canceled.

Step S34: If NO (not received) in step S33, it is detected if data indicating that a software button (to be simply referred to as a button hereinafter) (including an icon) has been pressed (clicked) on the window currently displayed on the user terminal is received via the Internet 3. If NO (not received) in step S34, the flow returns to step S33.

Step S35: If YES (received) in step S34, it is checked if the clicked button is a one for selecting a function different from that available for the user on the currently displayed window. If YES (indicating a different function) in step S35, the flow returns to step S31. On the other hand, if NO (not a different function), the flow advances to step S357.

Step S36: If NO (not received) in step S33, data received via the Internet 3 is written in (also to update the stored data) and/or new data is read out from the storage device 26 or progress management DB 32 of the vehicle manufacturer server 1 in response to user's operation input on the window currently displayed on the user terminal 5.

Step S37: The data read out in step S36 and display window data indicating a window used to display that data are sent to the user terminal 5 that has logged in via the Internet 3 as needed, and the flow returns to step S33. At this time, the CPU 21 of the user terminal 5, which received these display window data and the like as in step S32, displays a window depending from the top window displayed so far, display a new window on a portion of the currently displayed window, and so forth.

(2) State Transition Among Respective Processing Modules

Figure 17:
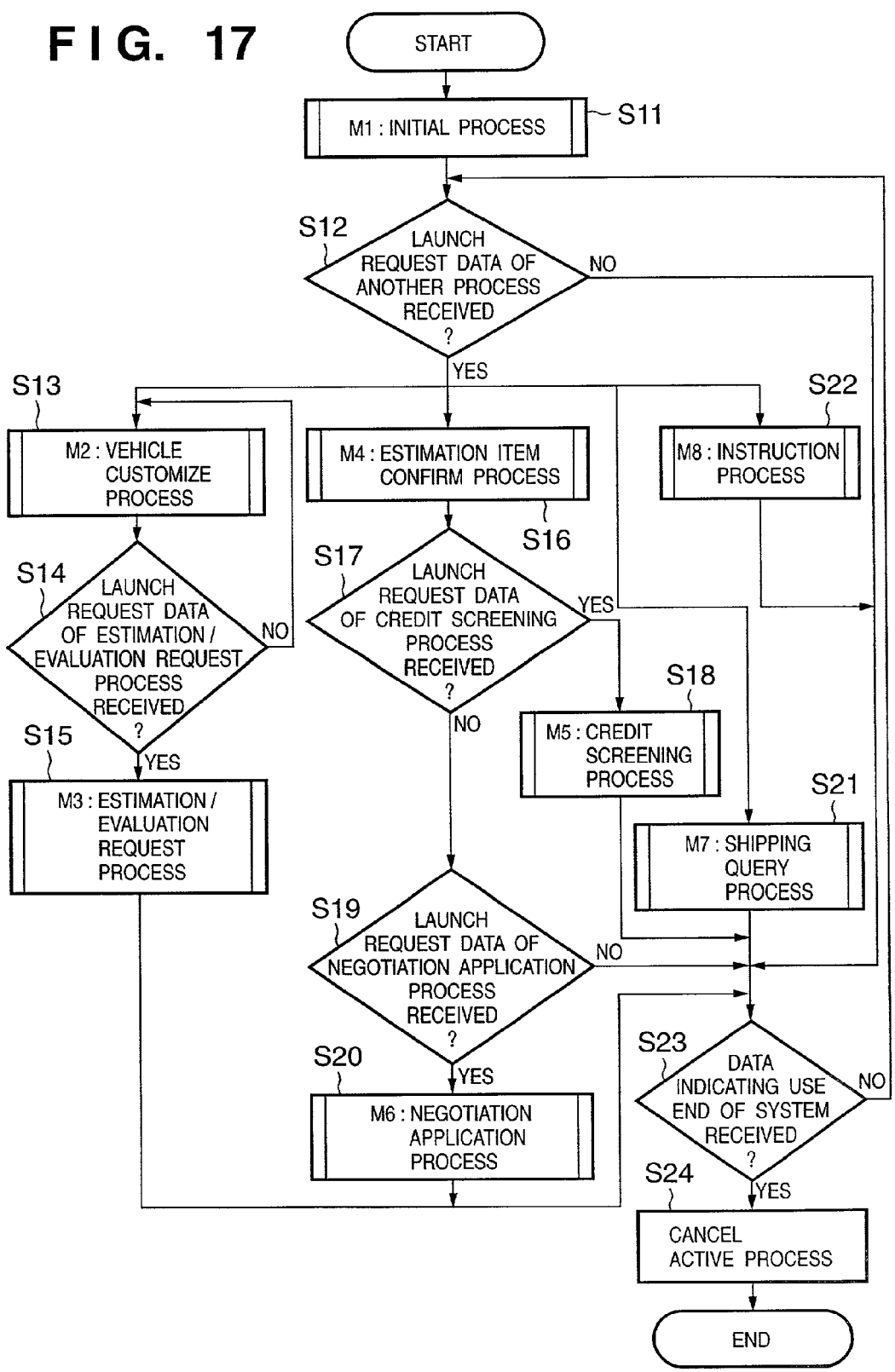
FIG. 17 is a flow chart showing an outline of the overall process executed by the vehicle manufacturer server 1 in the embodiment of the present invention.

FIG. 17 is a flow chart showing an outline of the overall process executed by the vehicle manufacturer server 1 in this embodiment.

The processing modules M1 to M8 executed by the vehicle manufacturer server 1 have a function of displaying various windows (to be described later) on the display 22 of the user terminal 5, and implementing input operations on the displayed windows, and transition of the display windows in these processing modules will be described later with reference to FIGS. 4 to 8.

Steps S11 and S12 in FIG. 17: When the user terminal 5 has been linked to the site of this system via the Internet 3, the initial process (M1) is executed (step S11), and it is checked if launch request data of another process is received from the user terminal 5 during the initial process (M1) (step S12). If YES in step S12, the flow advances to step S16, S21, or S22 depending on the data received; otherwise, the flow advances to step S23.

Steps S13 to S15: The vehicle customize process (M2) is executed (step S13), and it is checked if launch request data of the estimation/evaluation request process (M3) is received from the user terminal 5 during the vehicle customize process (M2) (step S14). If YES in step S14, the estimation/evaluation request process (M3) is executed (step S15).

Steps S16 to S20: The estimation item confirm process (M4) is executed (step S16), and it is checked if launch request data of the credit screening process (M5) or the negotiation application process (M6) is received from the user terminal 5 during the estimation item confirm process (M4) (step S17 or S19). If YES in step S17 or S19, the credit screening process (M5) or the negotiation application process (M6) is executed depending on the received data (step S18 or S20).

Step S22: The instruction process (M8) is executed.

Steps S23 and S24: It is checked if data indicating the end of use of this system is received from the user terminal 5 during execution of the aforementioned processing module (step S23). If YES in step S23, the processing of the processing module, which is running, is canceled (step S24); otherwise, the flow returns to step S12.

(3) Transition of Display Windows in Respective Processing Modules

Transition of the display windows in the eight different processing modules which have been briefly explained above will be described below with reference to FIGS. 4 to 8. The relationship of state transition among the processing modules indicated by broken line blocks in FIGS. 4 to 8 follow the functional system mentioned above with reference to FIG. 3.

<Initial Process (M1), Vehicle Customize Process (M2)>

Figure 4:
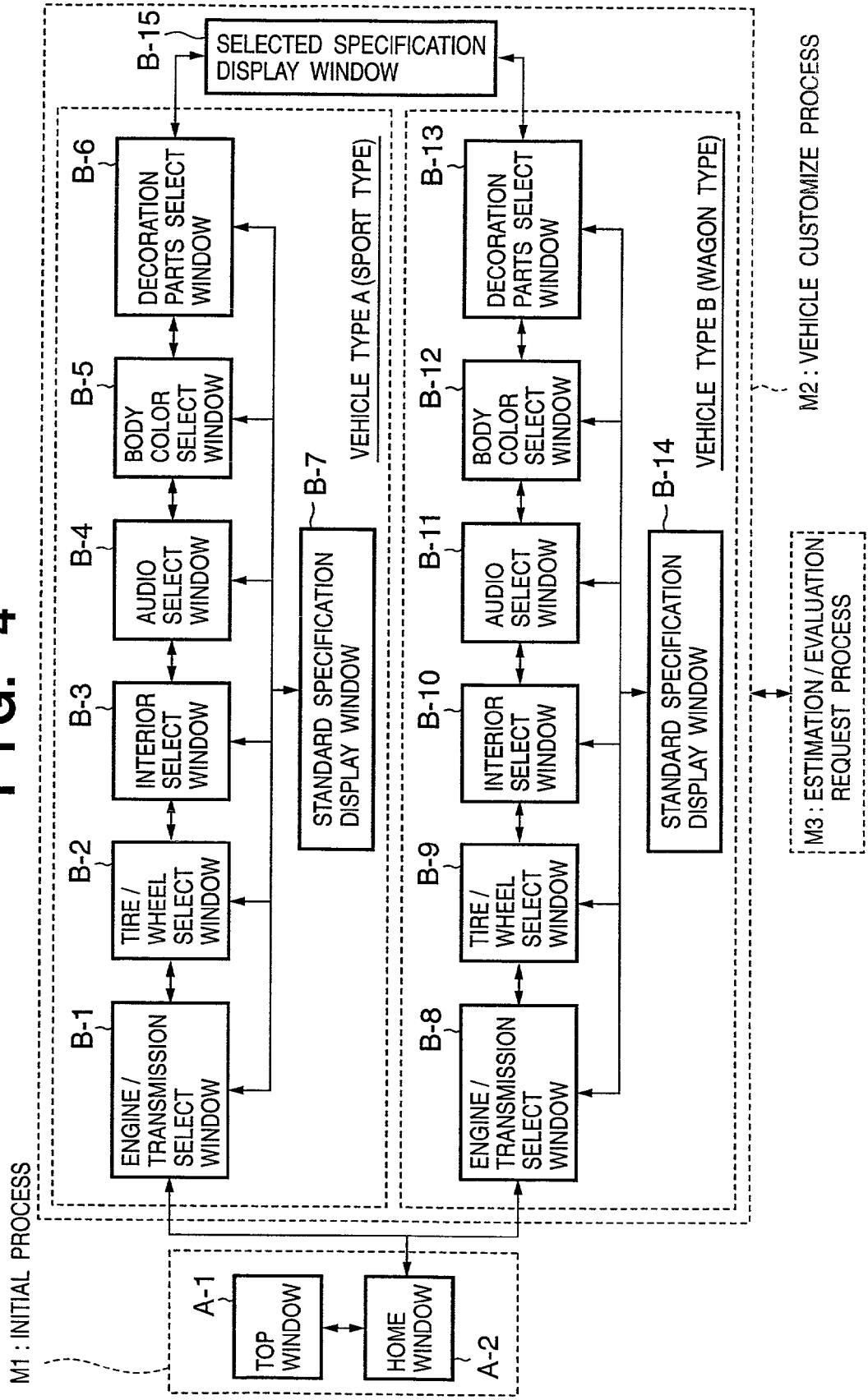
FIG. 4 is a chart showing transition of display windows in an initial process (M1) and vehicle customize process (M2)

FIG. 4 shows transition of the display windows in the initial process (M1) and vehicle customize process (M2).

Referring to FIG. 4, the initial process (M1) displays a top window A-1 (FIG. 23) as a home page window of this system. The top window A-1 exemplified in FIG. 23 includes an "Enter" button to be operated by the user (i.e., the user who has been linked to the vehicle manufacturer server 1 via the Internet 3) who wants to use this system that allows customization, estimation, ordering, and the like of a custom vehicle. If the user has operated this "Enter" button, the initial process (M1) displays a home window A-2 (FIG. 24) of this system on the user terminal 5.

Figure 24:
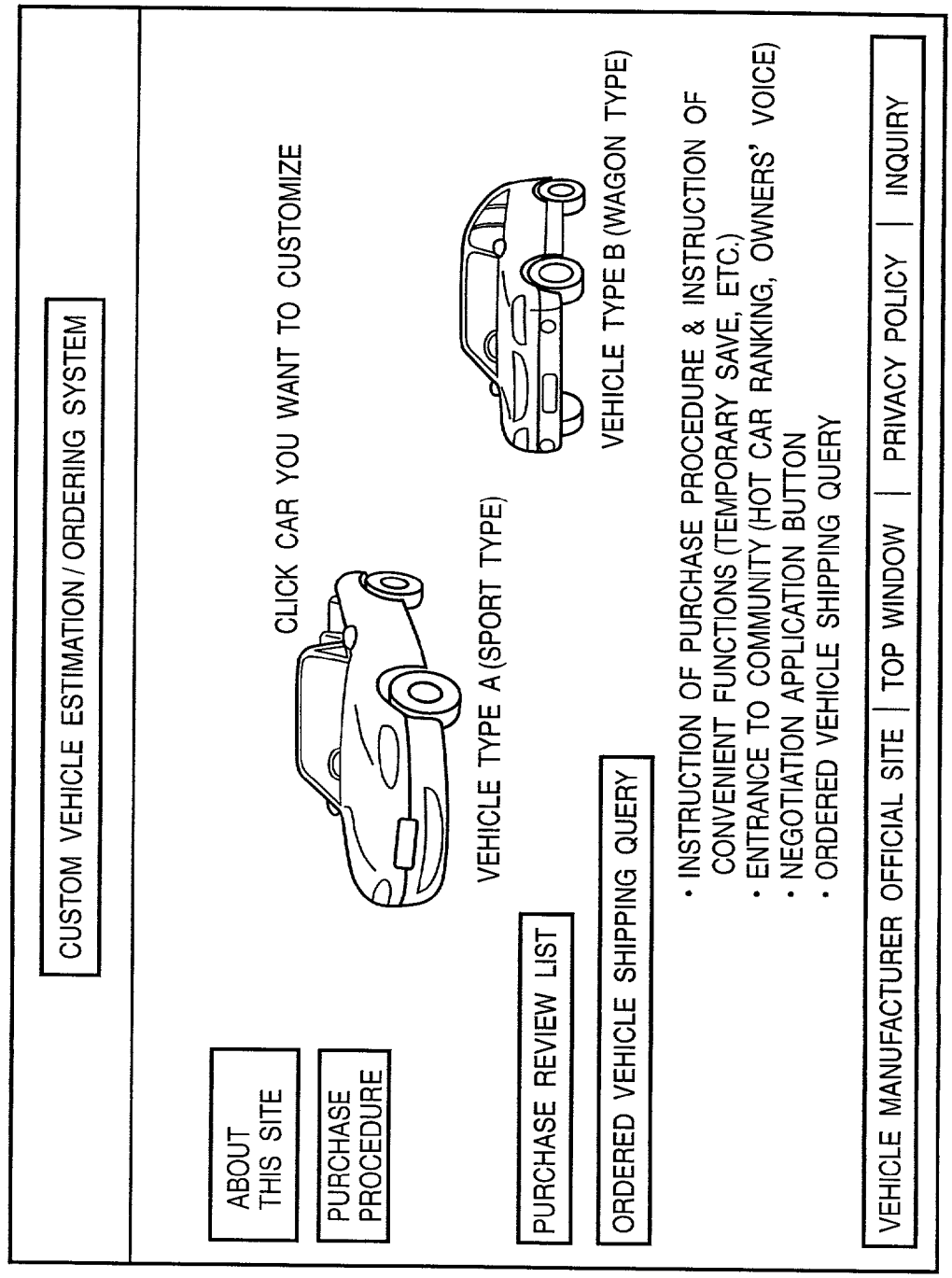
FIG. 24 shows an example of a home window A-2 in the embodiment of the present invention.

FIG. 24 shows an example of the home window A-2 displayed by the initial process (M1).

The display window shown in FIG. 24 includes a plurality of operation buttons. If the user has operated an operation button "about this site" or "purchase procedure", a predetermined instruction window pops up on the user terminal 5 by the function of the instruction process (M8) (to be described later). On the other hand, if the user has operated an operation button "purchase review list", the function of the estimation item confirm process (M4) (to be described later) is provided to the user terminal 5. If the user has operated an operation button "ordered vehicle shipping query", the function of the shipping query process (M7) is provided to the user terminal 5.

If the user has clicked a photo of vehicle type A as sport type or vehicle type B as wagon type on the home window A-2, the function of the vehicle customize process (M2) is provided to the user terminal 5.

In this embodiment, the vehicle customize process (M2) allows the user to customize vehicles of two different vehicle types, i.e., vehicle type A (sport type) and vehicle type B (wagon type) for the sake of simplicity.

When the user has selected the desired vehicle type on the home window A-2, the user himself or herself can perform processes from desired customization of a plurality of predetermined items to settlement of a customized vehicle on the basis of a standard vehicle (base vehicle) of the selected vehicle type. In other words, various specifications (equipment) set in advance in the system as a standard vehicle are replaced by other specifications (equipment) or new equipment (optional equipment) which is not set for the standard vehicle is added by user's customize operations.

Figure 25:
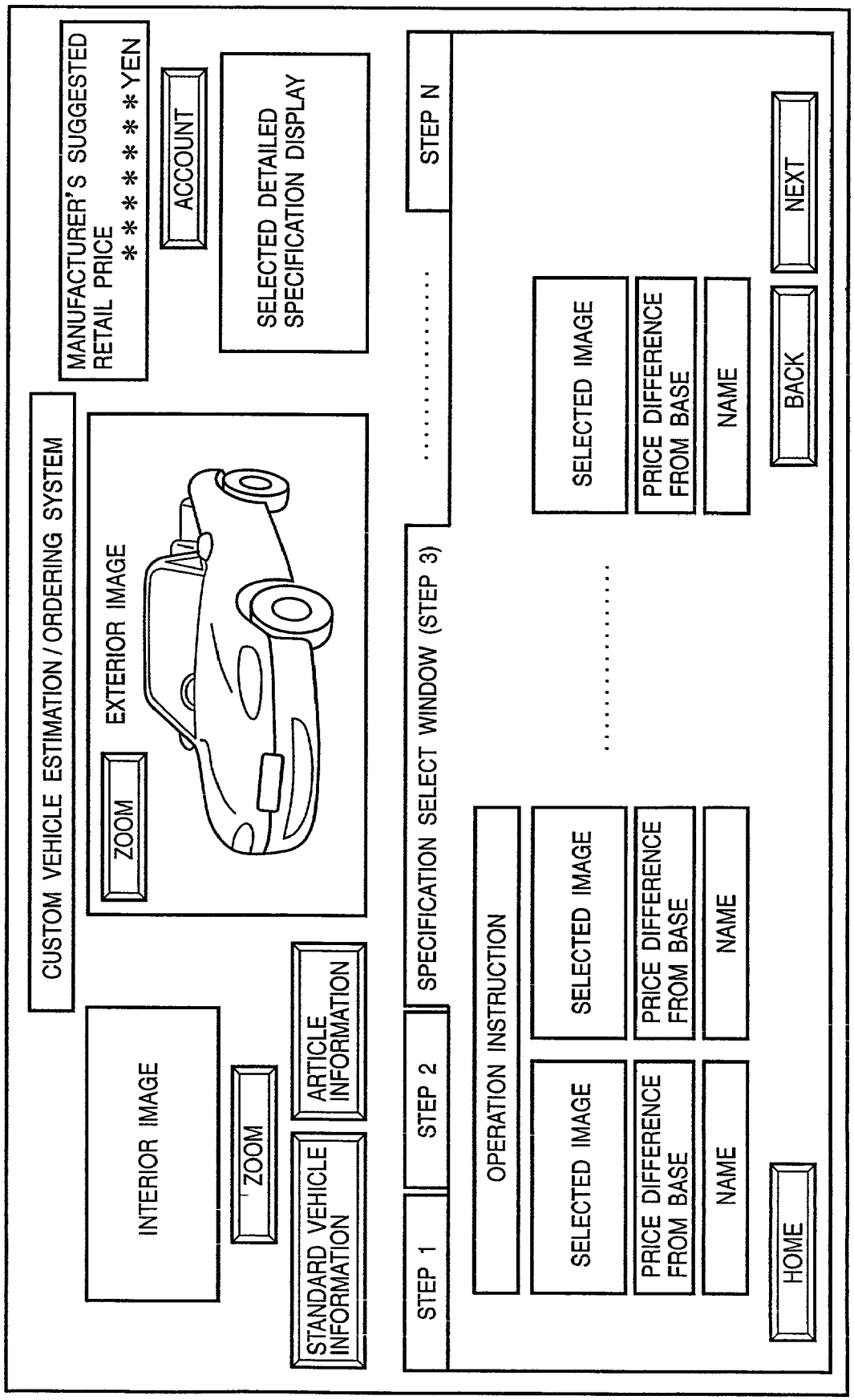
FIG. 25 shows an example of the format of vehicle customize window (B-1 to B-15) displayed in the vehicle customize process (M2)

FIG. 25 shows an example of the format of a vehicle customize window (B-1 to B15) displayed by the vehicle customize process (M2). The basic format of this window is basically common to an engine/transmission select window (B-1 and B-8), tire/wheel select window (B-2 and B-9), interior select window (B-3 and B-10), audio select window (B-4 and B-11), body color select window (B-5 and B-12), and decoration parts select window (B-6 and B-13).

Since details of the arrangements of these vehicle customize windows are not essential to the present specification, a detailed description and illustration thereof will be omitted, but the functions of the respective windows will be briefly explained.

Engine/transmission select window (B-1, B-8): On this window, the user of the user terminal 5 can select a desired combination of engine and transmission from a plurality of different combinations of engines and transmissions that can be mounted for the desired vehicle type previously selected on the home window A-2.

Tire/wheel select window (B-2, B-9): This window is displayed in correspondence with the combination of engine and transmission previously selected on the engine/transmission select window (B-1, B-8). The user of the user terminal 5 can select a desired combination from a plurality of different combinations of tires and wheels presented as choices on this window. Furthermore, the user can also select optional equipment such as an anti-lock brake system (ABS), torque sensing (TORSEN) LSD, and the like depending on the vehicle type of his or her choice.

Interior select window (B-3, B-10): On this window, the user of the user terminal 5 can select a desired interior from a plurality of different interiors for the desired vehicle type selected on the home window A-2.

Audio select window (B-4, B-11): On this window, the user of the user terminal 5 can select a desired one of a plurality of different audio systems available for the desired vehicle type selected on the home window A-2.

Body color select window (B-5, B-12): On this window, the user of the user terminal 5 can select a desired one of a plurality of different body colors available for the desired vehicle type selected on the home window A-2.

Decoration parts select window (B-6, B-13): On this window, the user of the user terminal 5 can select desired ones of a plurality of different decoration parts available for the desired vehicle type selected on the home window A-2.

Note that decoration parts as so-called dealer options generally have physical limitations (e.g., a shape, mounting space, and the like) on an automobile assembled in the vehicle manufacturer. Hence, upon selecting decoration parts as such dealer options in this system, parts to be displayed as choices on the decoration parts select window (B-6, B-13) must be limited in correspondence with the specification items that have already been selected on the previous windows.

Figure 26:
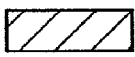
FIG. 26 shows an example of an account window of a manufacturer's suggested retail price displayed upon operation of an "account" button shown in FIG. 25.

On the upper half region of these vehicle customize windows, photos of the vehicle type selected on the home window A-2 and its interior, "ZOOM" buttons which can display these photos in an enlarged scale, an "article information" button that can display various kinds of information associated with the vehicle type, a "standard vehicle information" button that can display a standard specification display window B-7 or B-14 which includes the specifications, data, and the like associated with a standard vehicle of that vehicle type, a manufacturer's suggested retail price of a vehicle unit (per custom vehicle) according to the specifications selected by the user, an "account" button that can display the account of that manufacturer's suggested retail price, as shown in FIG. 26, and details of the specification items that have already selected by the user.

In this embodiment, since the manufacturer's suggested retail price can be displayed for each vehicle or specification item, the guideline of the purchase price upon selecting a custom vehicle with desired specifications can be presented to the user, thus improving the convenience.

FIG. 26 shows an example of the account window displayed upon operation of the "account" button shown in FIG. 25, and this window displays the manufacturer's suggested retail price of a vehicle unit, the selected specification items based on which the former retail price is calculated, and manufacturer's suggested retail prices of those items.

User's customize operations of a custom vehicle are restricted to select specification items in the order of select windows B-1 to B-6 for vehicle type A or B-8 to B-13 for vehicle type B, and the lower half region of the vehicle customize window displays the select processes (steps) corresponding to the windows B-1 to B-6 or B-8 to B-13 in the form of, e.g., a plurality of stacked folders.

FIG. 25 exemplifies a state wherein the folder of the third step is selected, and the selected folder (active state) displays possible user's choices of specification items in that step together with images such as photos and the like, the price differences from items of the standard vehicle, names (model numbers), and the like. When the user selects a desired one from the displayed choices (specifications), the selected specification information is stored in the vehicle manufacturer server 1 together with identification information (ID) that specifies the user.

At this time, the vehicle manufacturer server 1 acquires the manufacturer's suggested retail price of that specification item by referring to the manufacturer's suggested retail price DB 31 using the selected specification item information as a key, and adds the acquired manufacturer's suggested retail price of the specification item to those already selected in the steps executed so far.

In this way, the manufacturer's suggested retail price of a vehicle unit displayed at the upper right position in FIG. 25 is updated, and if the "account" button is selected later, the account display window shown in FIG. 26 displays information added with columns of the specification item selected in the current step and its manufacturer's suggested retail price.

In a preferred embodiment, the image of a custom vehicle, customization of which is underway, may be updated to reflect the selected specification items (e.g., body color, wheel, and the like) as the user selects desired specification items in respective steps.

More preferably, the display color of the folders of the selected steps (steps 1 and 2 in FIG. 25) may be changed to be different from that of the folders of the steps to be selected (steps 3 to N in FIG. 25).

Furthermore, a "HOME" button that allows jump to the home window A-2 (FIG. 24), and "BACK" and "NEXT" buttons that can display the previous and next display windows are displayed on the lower half region of the vehicle customize window.

Choices available for the user in the respective steps of the vehicle customize process (M2) have predetermined limitations. Basically, the first step of customization of a custom vehicle is restricted to select the specification of a backbone that determines the drive performance of that vehicle, and the subsequent steps are restricted to select other items to have the specification selected in the first step as top priority.

That is, in this embodiment, since selection of drive system components (i.e., corresponding to the engine/transmission select window B-1 or B-8) as a backbone of an automobile that can be manufactured by the vehicle manufacturer as the first step, and selection of wheel peripheral components (i.e., corresponding to the tire/wheel select window B-2 or B-9 of the second step) which are registered in advance in correspondence with the selected drive system components are made in turn, the specifications of the mechanism of the automobile, which directly influence the travel performance and drive performance, are determined prior to customization of the interior, audio, exterior, and the like, which do not directly influence the travel performance of the automobile.

In the vehicle customize process (M2), when the user has selected all specification items required for one custom vehicle using these windows, identification information (specification number) that specifies the vehicle specification of the custom vehicle of the user's choice is selected.

Figure 9:
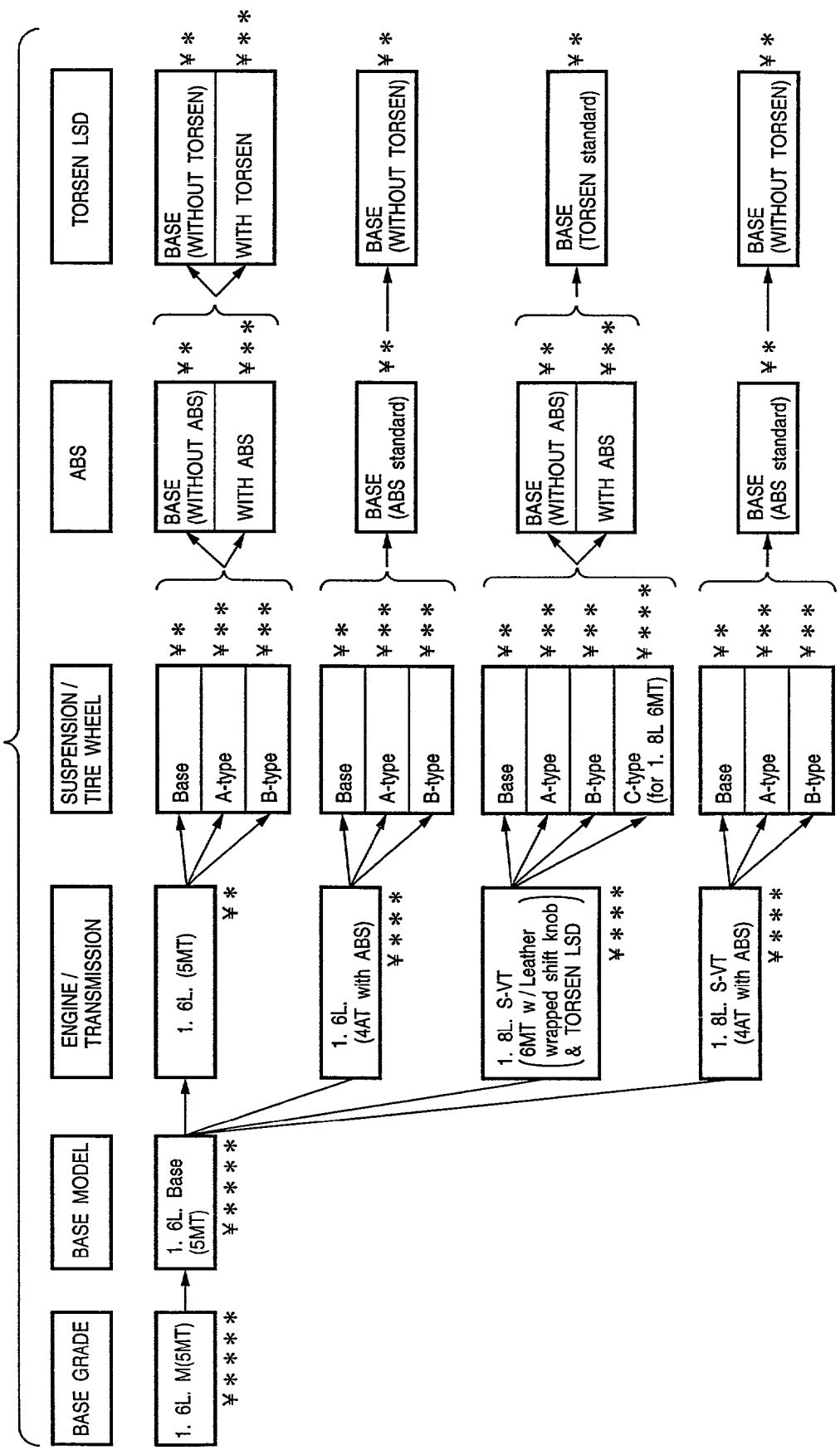
FIG. 9 is a system chart showing limitations on choices which are referred to upon selecting a mechanism of vehicle type A (sport type) in the vehicle customize process (M2)

FIG. 9 is a system chart showing limitations on choices which are referred to upon selecting the mechanism of vehicle type A (sport type) in the vehicle customize process (M2). In order to select desired specifications for the mechanism of vehicle type A, choices of respective specification items, i.e., engine/transmission, suspension/tire•wheel, antilock brake system (ABS), and TORSEN LSD are set in turn to the right on the basis of a standard vehicle as base grade and base model shown on the left side in FIG. 9.

Figure 10:
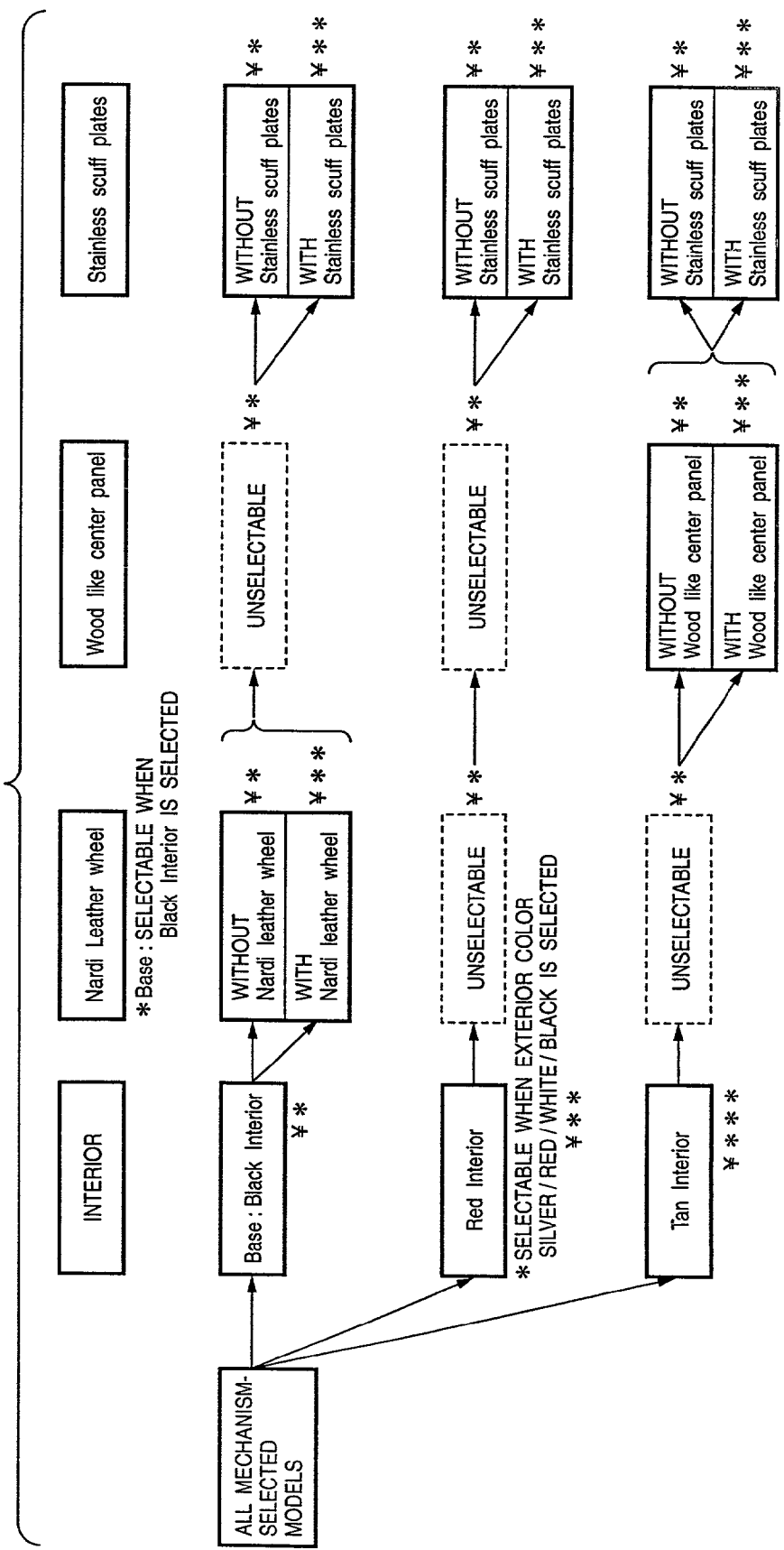
FIG. 10 is a system chart showing limitations on choices which are referred to upon selecting an interior of vehicle type A (sport type) in the vehicle customize process (M2)

FIG. 10 is a system chart showing limitations on choices which are referred to upon selecting the interior of vehicle type A (sport type) in the vehicle customize process (M2), and is adopted for vehicle type A for which one of possible choices of mechanisms has been determined on the basis of the limitations on the choices shown in FIG. 9. In the example shown in FIG. 10, choices of specification items of color, specifications, and the like of the interior are set in turn to the right, but these limitations are set in terms of design and price unlike in the mechanism.

Figure 11:
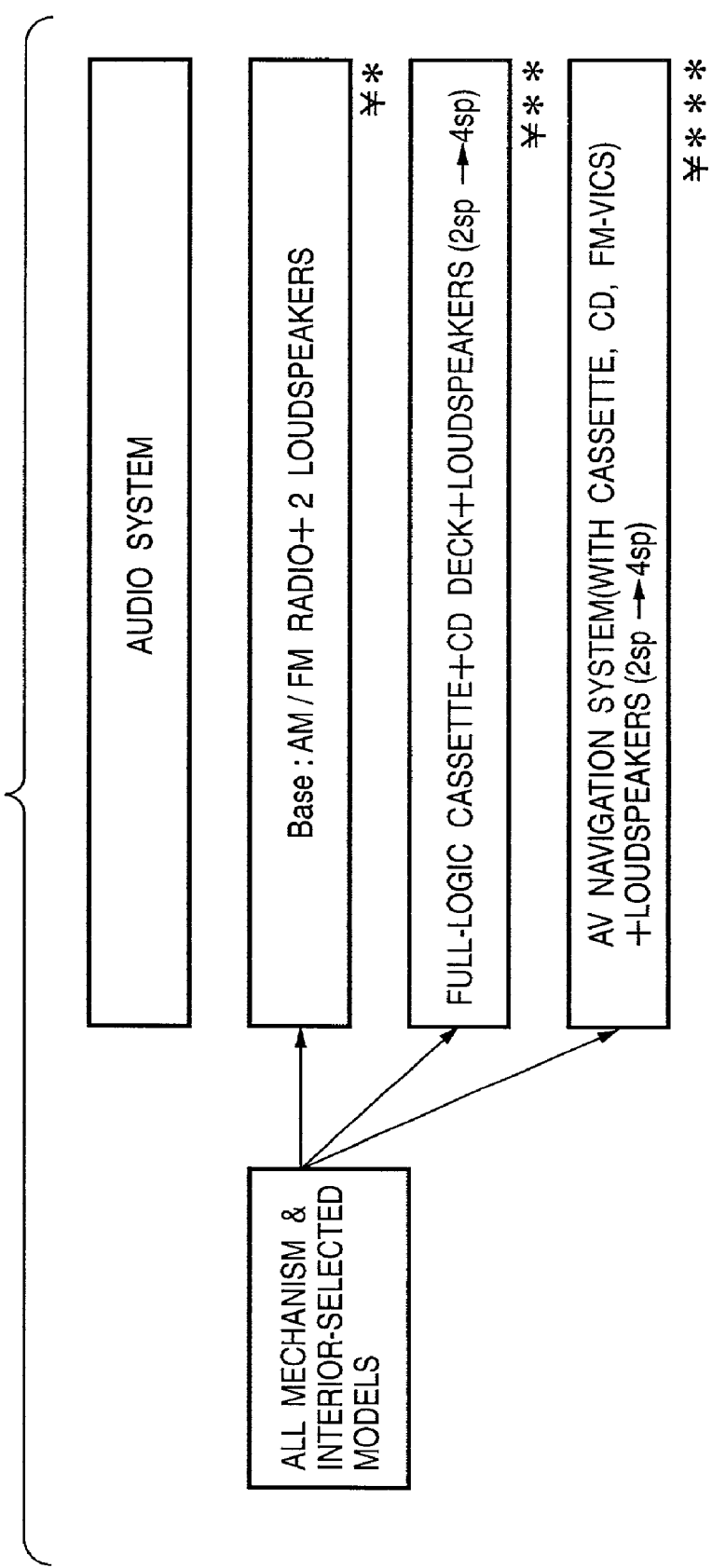
FIG. 11 is a system chart showing limitations on choices which are referred to upon selecting an audio system of vehicle type A (sport type) in the vehicle customize process (M2)

FIG. 11 is a system chart showing limitations on choices which are referred to upon selecting the audio system of vehicle type A (sport type) in the vehicle customize process (M2). In the example shown in FIG. 11, all audio systems are selectable for all vehicles of vehicle type A, the mechanism and interior of which have been determined based on the limitations on choices shown in FIGS. 9 and 10.

The limitation information of choices shown in FIGS. 9 to 11 is pre-set in, e.g., the storage device 26 or the like of the vehicle manufacturer server 1 as information to be referred to as choices which are to be displayed on the window corresponding to the next step when the user has selected give choices in respective steps of the aforementioned vehicle customize windows. Upon selecting all specification items shown in FIGS. 9 to 11, identification information (vehicle type ID) for the custom vehicle of the user is selected. The vehicle type ID selected at that time belongs to the homologation that the vehicle manufacturer has acquired from a public organization for vehicle type A.

Figure 12:
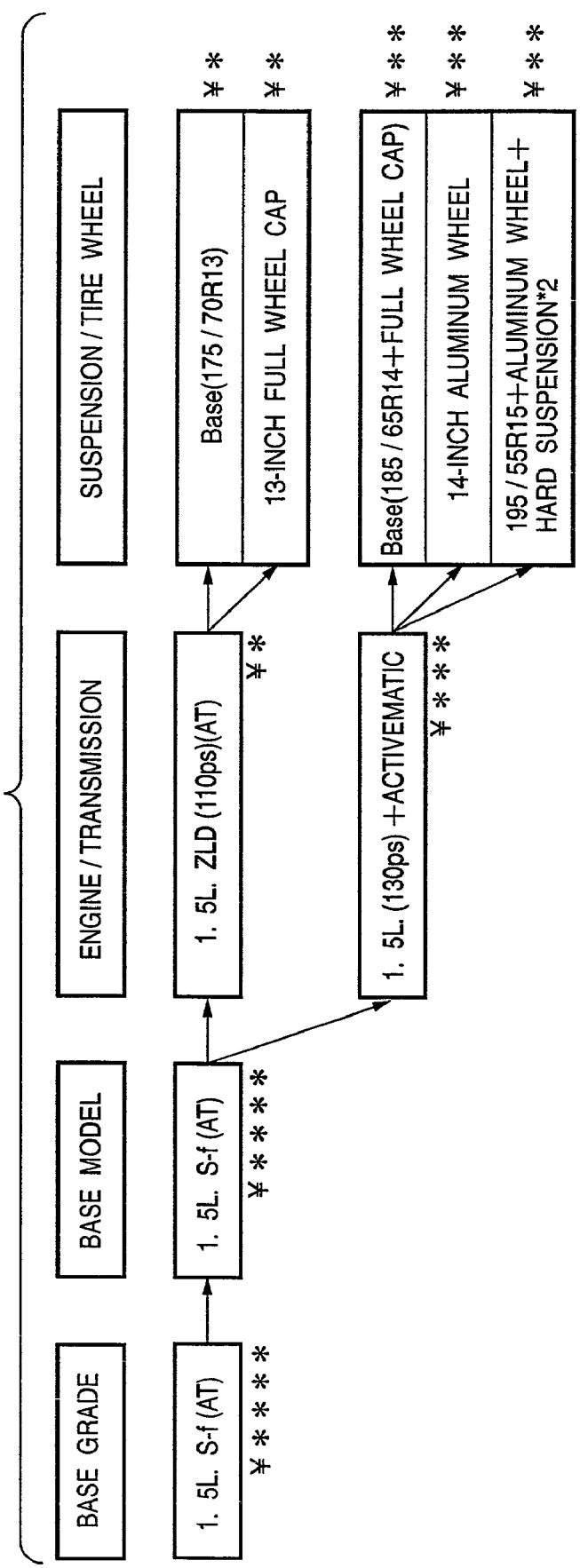
FIG. 12 is a system chart showing limitations on choices which are referred to upon selecting a mechanism of vehicle type B (wagon type) in the vehicle customize process (M2)

FIG. 12 is a system chart showing limitations on choices which are referred to upon selecting the mechanism of vehicle type B (wagon type) in the vehicle customize process (M2). FIG. 12 is basically the same as the system chart of vehicle type A (sport type) described above with reference to FIG. 9, but since vehicle type B is wagon type, specification items simpler than those of vehicle type A (sport type) are set.

Figure 13:
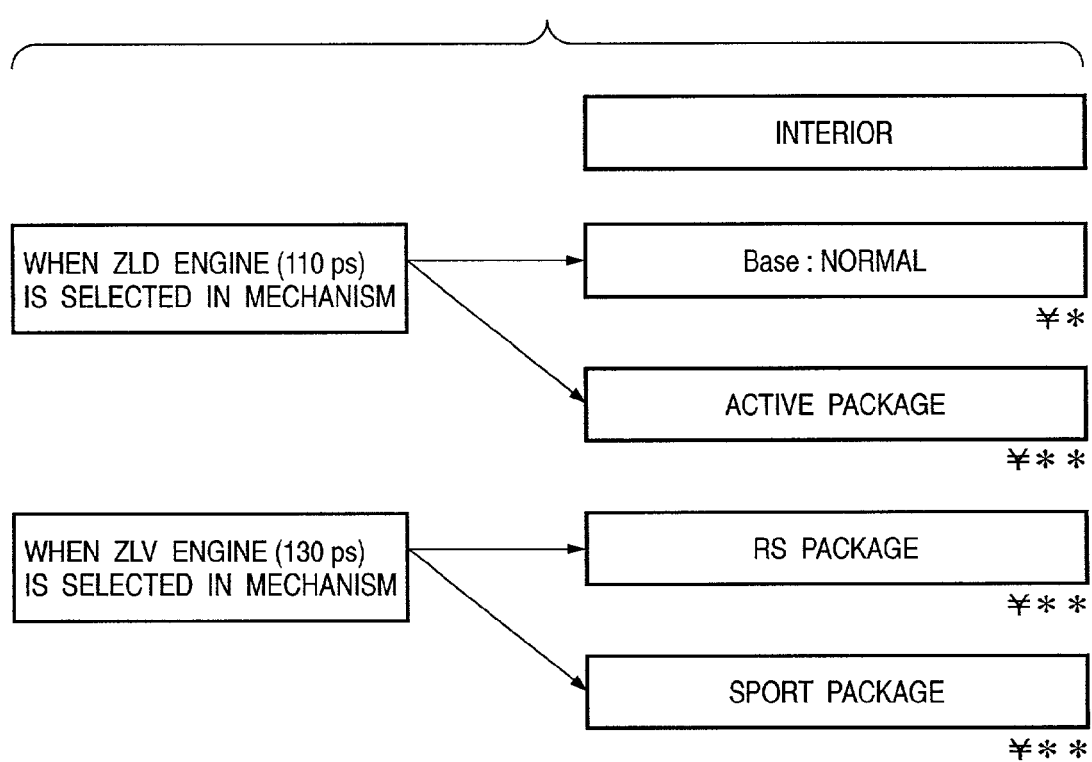
FIG. 13 is a system chart showing limitations on choices which are referred to upon selecting an interior of vehicle type B (wagon type) in the vehicle customize process (M2)

FIG. 13 is a system chart showing limitations on choices which are referred to upon selecting the interior (including an audio system in this case) of vehicle type B (wagon type) in the vehicle customize process (M2). FIG. 13 is basically the same as the system chart of vehicle type A (sport type) described above with reference to FIG. 10. In the example shown in FIG. 13, simpler specification items are set in consideration of price in correspondence with the type of engine previously selected based on the limitations in FIG. 12.

Figure 14:
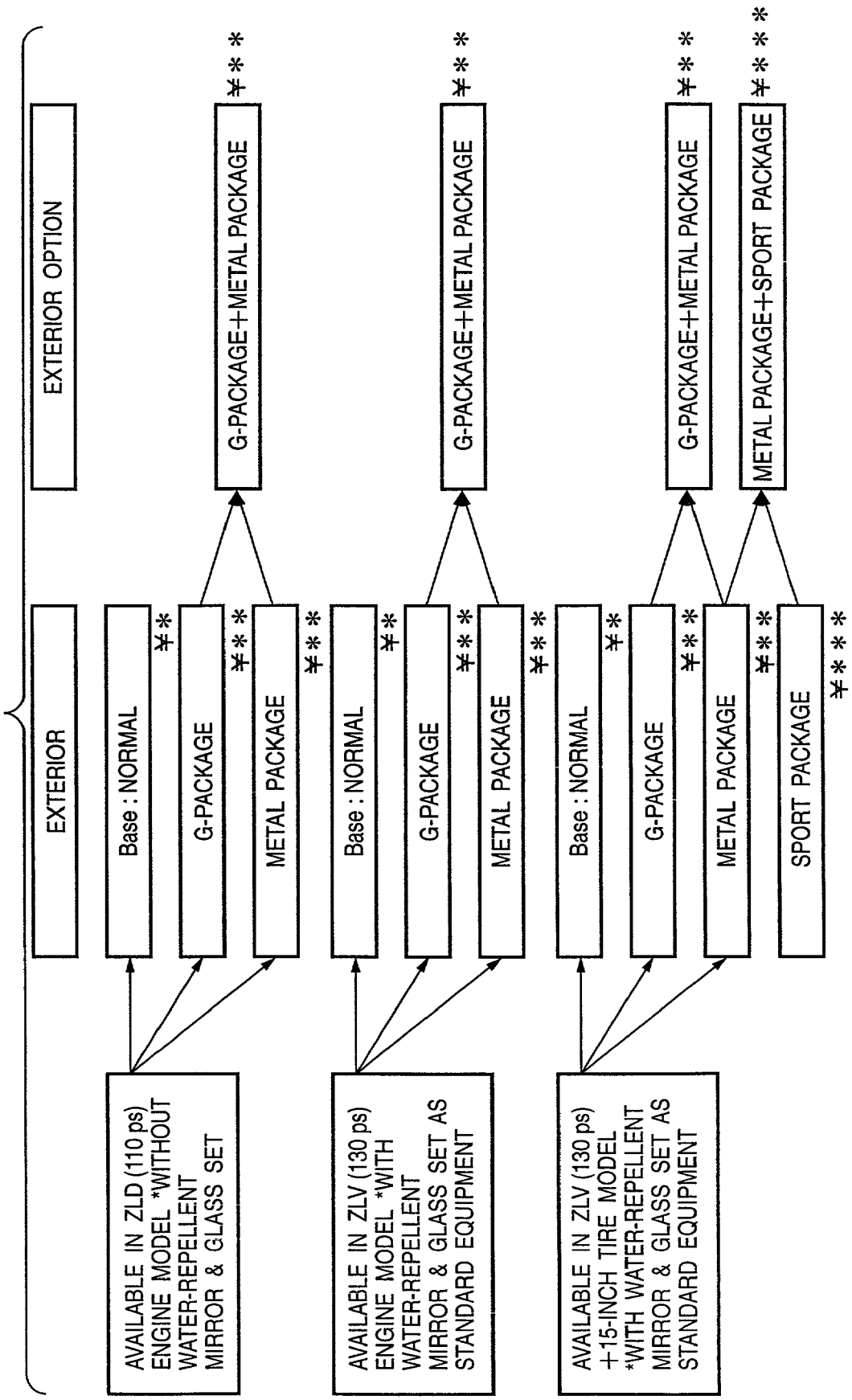
FIG. 14 is a system chart showing limitations on choices which are referred to upon selecting an exterior of vehicle type B (wagon type) in the vehicle customize process (M2)

FIG. 14 is a system chart showing limitations on choices which are referred to upon selecting the exterior of vehicle type B (wagon type) in the vehicle customize process (M2). In the example shown in FIG. 14, simpler specification items are set in consideration of price in correspondence with the type of engine previously selected based on the limitations in FIG. 12.

The limitation information of choices shown in FIGS. 12 to 14 is pre-set in, e.g., the storage device 26 or the like of the vehicle manufacturer server 1 as information to be referred to as choices which are to be displayed on the window corresponding to the next step when the user has selected give choices in respective steps of the aforementioned vehicle customize windows. Upon selecting all specification items shown in FIGS. 12 to 14, identification information (vehicle type ID) for the custom vehicle of the user is selected. The vehicle type ID selected at that time belongs to the homologation that the vehicle manufacturer have acquired from a public organization for vehicle type B.

It is expected that users (customers) who are willing to purchase vehicles desirably customized using the estimation/ordering system described in this embodiment like driving itself compared to normal drivers who drive vehicles simply as transportation means, and it is easy to expect that such users take a greater interest in the drive system, tires/wheels, and the like upon purchasing vehicles. If the aforementioned limitations on choices are adopted, such users' requirements can be efficiently and satisfactorily met.

In general, homologation must be acquired from a public organization in association with the objective vehicle type and specifications of an automobile prior to mass production and sales, and is determined based on the drive performance that greatly pertains to safe travel of an automobile. When the aforementioned limitations are adopted, the finally determined vehicle type ID can efficiently and reliably fall within the range of homologation acquired in advance from the public organization for a plurality of types of custom vehicles which can be selected by this system.

Therefore, upon making selections in turn on the vehicle customize window under the aforementioned limitations, the user (customer) can easily customize a vehicle of the desired vehicle type selected on the home window A-2 (FIG. 24) by his or her own interactive game-like operations, and can experience as if the engineer of an automobile tuning shop tuned an automobile.

Figure 27:
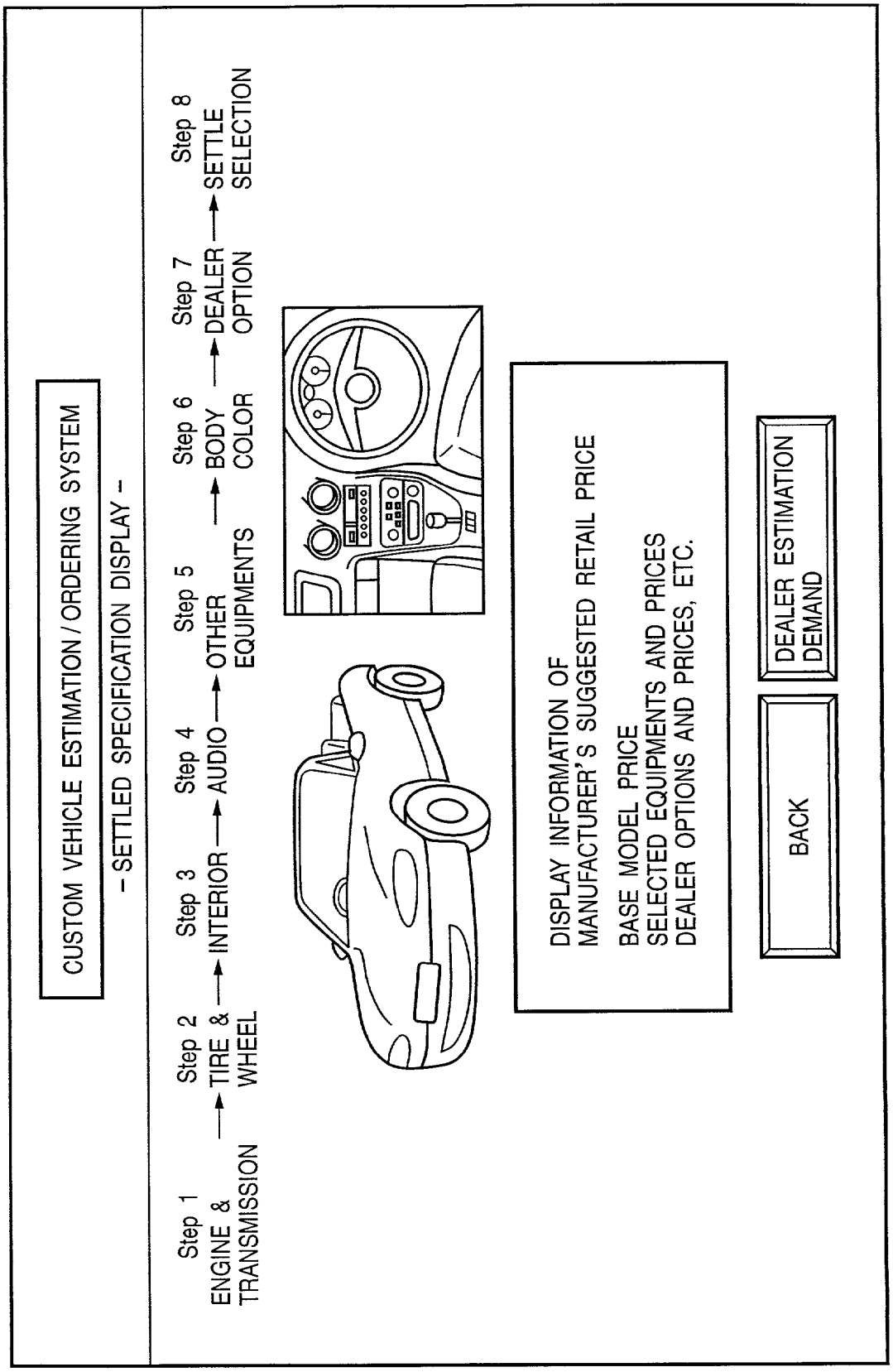
FIG. 27 shows an example of a selected specification display window B-15 displayed in the vehicle customize process (M2)

Upon completion of selection of all specification items required for the specifications of a custom vehicle in the vehicle customize process (M2), a selected specification display window B-15 shown in FIG. 27 is displayed.

FIG. 27 shows an example of the selected specification display window B-15 displayed by the vehicle customize process (M2). The selected specification display window B-15 displays, for example, photo images of the exterior and interior of the customized vehicle, selected specification items and their prices, the price of a standard vehicle, and the like.

Upon operation of a "dealer estimation demand" button on the selected specification display window B-15 to demand an estimation of an actual sales price or to demand the dealer to estimate a sales price, the selected specification items of the custom vehicle are settled, and the control can transit to the estimation/evaluation request process (M3) (to be described later). On the other hand, if the user has operated a "back" button, the control returns in turn to the vehicle customize windows corresponding to the aforementioned steps to change the specification items. That is, alternative choices cannot be made unless the control returns to previous choices.

<Estimation/Evaluation Request Process (M3)>

Figure 5:
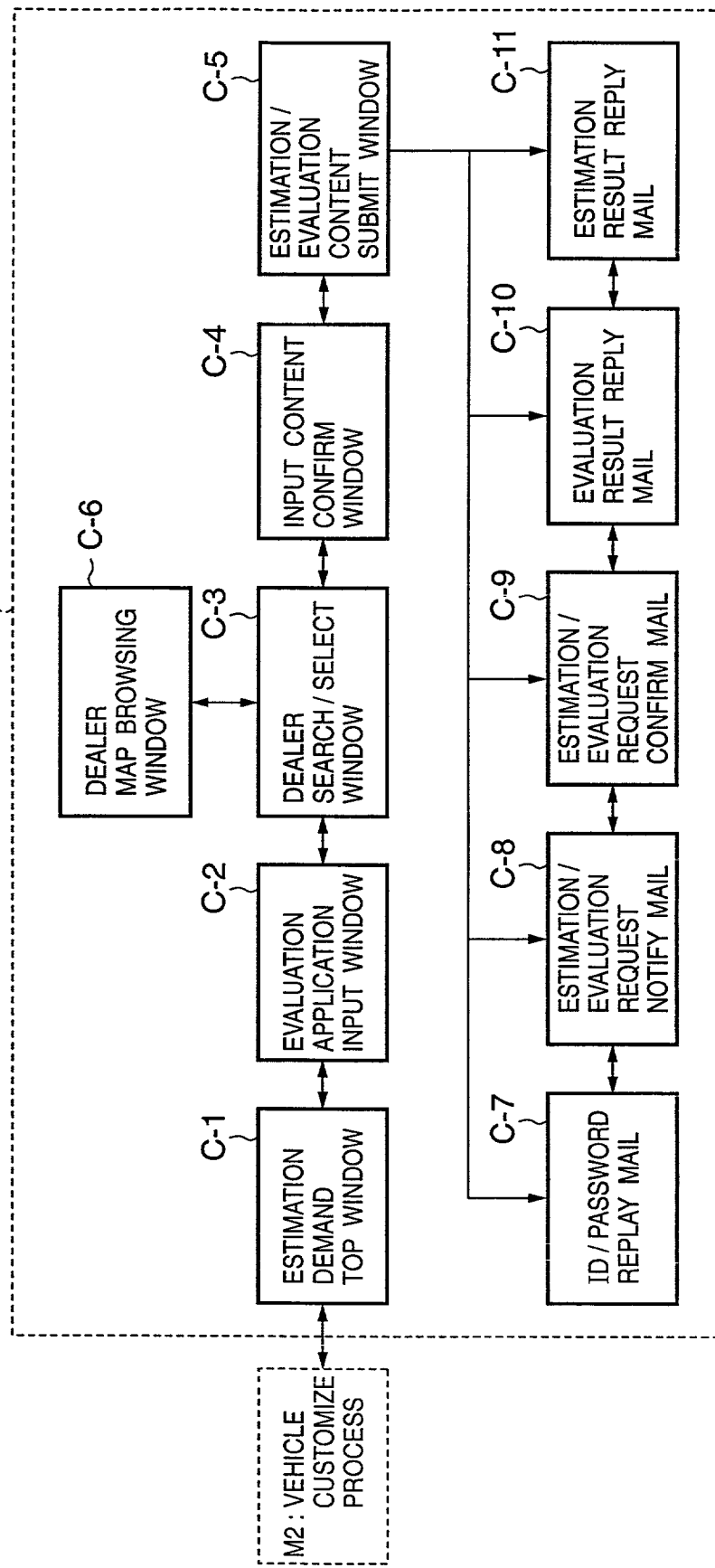
FIG. 5 is a chart showing transition of display windows in an estimation/evaluation request process (M3) and an e-mail sending function upon issuing an estimation/evaluation request.

FIG. 5 shows transition of display windows in the estimation/evaluation request process (M3), and an e-mail sending function upon issuing an estimation/evaluation request. This process is launched in response to operation of the "dealer estimation demand" button after the custom vehicle has been customized in the vehicle customize process (M2). The control can return from the estimation/evaluation request process (M3) to the vehicle customize process (M2) in response to user's operation.

As shown in FIG. 5, as transition of display windows in the estimation/evaluation request process (M3), an estimation demand top window C-1 (FIG. 28), evaluation application input window C-2 (FIG. 29), dealer search/select window C-3, input content confirm window C-4, estimation/evaluation content submit window C-5, and dealer map browsing window C-6 can be displayed on the user terminal 5.

Estimation demand top window C-1 (FIG. 28): On this window, the user of the user terminal 5 inputs items associated with himself or herself (name, and the like, or the user ID and password if they have already been issued), thus applying (requesting) the dealer for an estimation of the price of the custom vehicle previously settled in the vehicle customized process (M2) or an evaluation for a trade-in. That is, after the information associated with the user is input on this display window, if a radio button "YES" that pertains to evaluation application is selected, the evaluation application input window C-2 is displayed; if "NO" is selected, the dealer search/select window C-3 is displayed.

Evaluation application input window C-2 (FIG. 29): On this window, the user of the user terminal 5 inputs predetermined specification items (automobile manufacturer name, vehicle name, displacement, total mileage, and the like) of an automobile to be traded (trade-in), and selects a "next" button to display the dealer search/select window C-3.

Dealer search/select window C-3 (not shown): On this window, the user of the user terminal 5 can select a dealer that he or she wants to request to estimate the custom vehicle or to evaluate a trade-in by himself or herself. As a select method, a method of automatically presenting a nearby dealer on the basis of the user's address previously input on the estimation demand top window C-1 or the like, a method of making the user select a desired dealer from those displayed in a list, and the like may be used. In any case, it is convenient for the user if the dealer map browsing window C-6 pops up from the dealer search/select window C-3.

When the dealer that the user requests to estimate the custom vehicle or to evaluate a trade-in is selected on the dealer search/select window C-3, the input content confirm window C-4 is displayed on the user terminal 5 of the user.

Input content confirm window C-4 (not shown): This window displays in a list the contents of the respective specification items (including manufacturer's suggested retail prices) of the custom vehicle previously settled in the vehicle customize process (M2), the contents of items input by the user himself or herself in the evaluation application input window C-2 if the user selected evaluation of a trade-in, information associated with the dealer selected on the dealer search/select window C-3 to request such estimation/evaluation, and the like. The user of the user terminal 5 confirms the contents of the information displayed on the input window content confirm window C-4, and then actually submits an estimation/evaluation request by predetermined operation, thus displaying the estimation/evaluation content submit window C-5 on the user terminal 5.

Estimation/evaluation content submit window C-5 (not shown): This window displays information indicating that the estimation/evaluation request was submitted and accepted by the vehicle manufacturer server 1, and the user will receive an e-mail message that pertains to the request contents from the dealer selected by himself or herself.

The estimation/evaluation request process (M3) includes a function of sending/receiving e-mail messages in response to the estimation/evaluation request submitted from the user terminal 5 on the estimation/evaluation content submit window C-5.

ID/password reply mail C-7: If the user submitted the first estimation request, an e-mail message that contains the ID/password is sent to the mail address previously input by the user.

Estimation/evaluation request notify mail C-8: The vehicle manufacturer server 1 sends an e-mail message that informs the dealer server 2 of an objective dealer that the user requested to estimate the custom vehicle and/or to evaluate a trade-in. This e-mail message contains information (address, name, mail address, and the like) which is input on, e.g., the estimation demand top window C-1 and can specify the user, identification information (specification number) of the vehicle specifications set in the vehicle customize process (M2), the specification items of the trade-in input on the evaluation application input window C-2, and the like.

Estimation/evaluation request confirmation mail C-9: The dealer that received the estimation request of the custom vehicle and/or the evaluation request of the trade-in from the user sends an e-mail message to the mail address previously input by the user so as to confirm if the user sent the estimation/evaluation request.

Evaluation result reply mail C-10: The dealer that received the evaluation request of the trade-in from the user sends an e-mail message which replies the evaluation result to the mail address previously input by the user.

Estimation result reply mail C-11: The dealer that received the estimation request of the trade-in from the user sends an e-mail message which replies the estimation result to the mail address previously input by the user.

Figure 18:
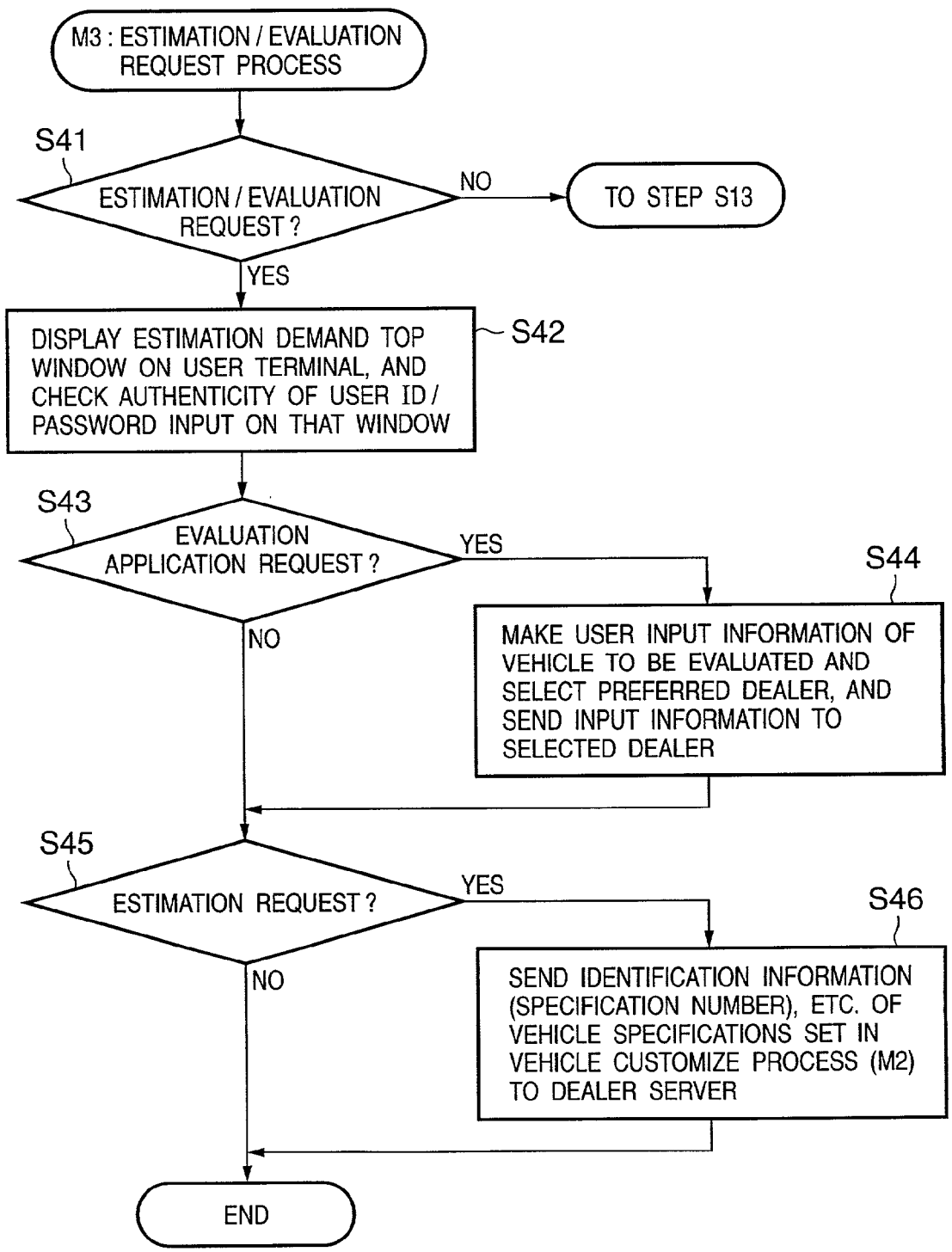
FIG. 18 is a flow chart showing the estimation/evaluation request process (M3) executed by the vehicle manufacturer server 1.

FIG. 18 is a flow chart showing the estimation/evaluation request process (M1) executed by the vehicle manufacturer server 1.

Steps S41 and S42 in FIG. 18: It is checked if the estimation/evaluation request is issued during the vehicle customize process (M2) (step S41: corresponding to step S17 (FIG. 17)). If NO in step S41, the flow returns to step S13 (FIG. 17); otherwise, the estimation demand top window C-1 (FIG. 28) is displayed on the user terminal 5, and authenticity of the user ID and password input to that window is checked (step S42).

Steps S43 and S44: It is checked if the evaluation request is issued (step S43). If NO in step S43, the flow advances to step S45; otherwise, the evaluation application input window C-2 (FIG. 29) is displayed on the user terminal 5 to prompt the user to input information of a vehicle as a trade-in to be evaluated, the dealer search/select window C-3 is then displayed on the user terminal 5 to make the user select a dealer, and the input information is sent to the selected dealer via the estimation/evaluation request notify mail C-8 (step S44).

Steps S45 and S46: It is checked if the estimation request of the custom vehicle is issued (step S45). If NO in step S45, the processing ends; otherwise, the identification information (specification number) of the vehicle specifications set in the vehicle customize process (M2) is sent to the dealer sever (S46).

<Estimation Item Confirm Process (M4)>

Figure 6:
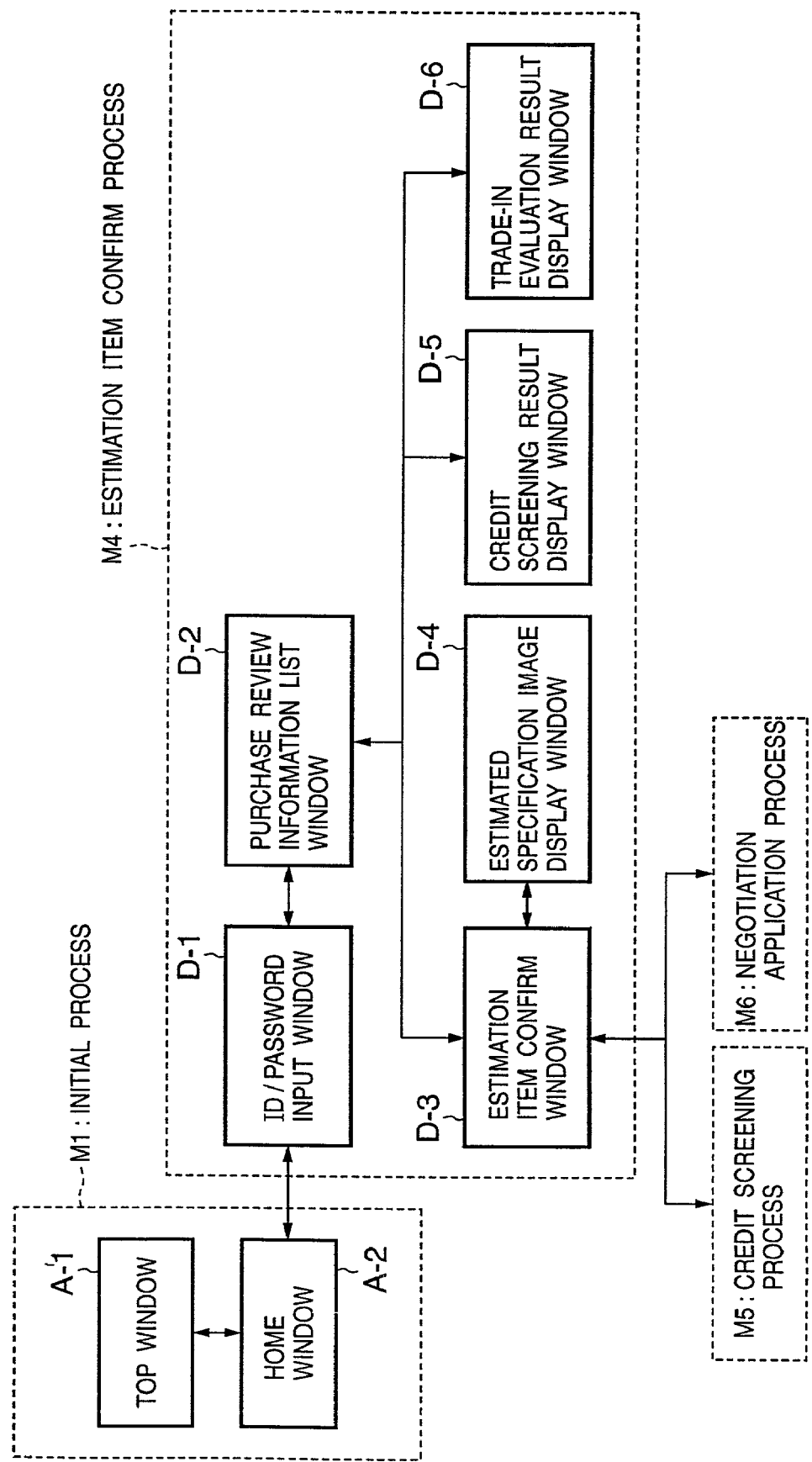
FIG. 6 is a chart showing transition of display windows in an estimation item confirm process (M4)

FIG. 6 shows transition of display windows in the estimation item confirm process (M4). This process is launched upon operation of the "purchase review list" operation button on the home window A-2 displayed by the initial process (M1). The control can transit from the estimation item confirm process (M4) to the initial process (M1), credit screening process (M5), or negotiation application process (M6) in response to user's operation.

As shown in FIG. 6, as transition of display windows in the estimation item confirm process (M4), an ID/password input window D-1 (FIG. 30), purchase review information list window D-2 (FIG. 31), estimation item confirm window D-3 (FIG. 32), estimated specification image display window D-4, credit screening result display window D-5, and trade-in evaluation result display window D-6 can be displayed on the user terminal 5.

ID/password input window D-1 (FIG. 30): On this window, the user of the user terminal 5 inputs the user ID (member ID) and password previously issued to that user, and operates "submit" button to log into this system (vehicle manufacturer server 1). Upon completion of the login process, the purchase review information list window D-2 (FIG. 31) is displayed on the user terminal.

Purchase review information list window D-2 (FIG. 31): On this window, lists of estimation, evaluation, and credit screening done for the user are displayed, and the user can, e.g., click a desired display item to display a window that indicates the detailed contents of the selected item on his or her user terminal 5.

Estimation item confirm window D-3 (FIG. 32): On this window, the user of the user terminal 5 can confirm the detailed contents of estimation previously done for the user. When the user has operated a "negotiation application" button, the control can transit to the negotiation application process (M6); when the user has operated an "examine credit" button, the control can transit to the credit screening process (M5); and when the user has operated "estimated specification image confirm" button, the user can confirm the image of an automobile corresponding to the currently displayed estimated specification of the custom vehicle on the estimated specification image display window D-4 (not shown). When the user has operated an operation button "return to purchase review list", the control can transit to the purchase review information list window D-2 (FIG. 31).

Figure 19:
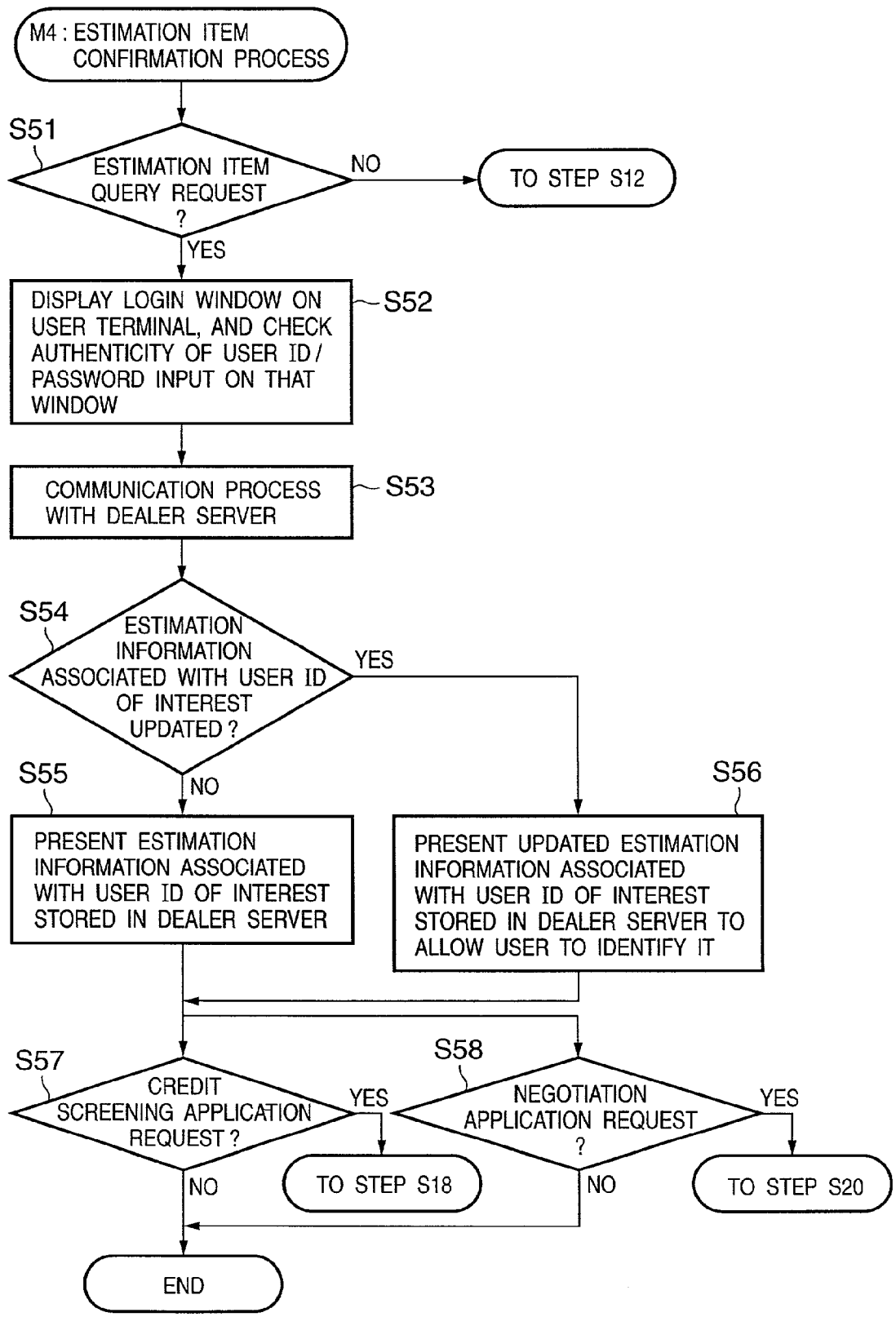
FIG. 19 is a flow chart showing the estimation item confirm process (M4) executed by the vehicle manufacturer server 1.

FIG. 19 is a flow chart showing the estimation item confirm process (M4) executed by the vehicle manufacturer server 1.

Steps S51 and S52 in FIG. 19: It is checked if an estimation item query request is issued during the initial process (M1) (step S51: corresponding to step S12 (FIG. 17)). If NO in step S51, the flow returns to step S12 (FIG. 17); otherwise, the ID/password input window D-1 (FIG. 30) is displayed on the user terminal, and authenticity of the user ID and password input to that window is checked (step S52).

Steps S53 and S54: A communication process with the dealer server 2 is executed (step S53), and it is inquired if the dealer server 2 has updated estimation information associated with that user ID (step S54). Note that the communication process in step S53 is linked with step S211 of the control process (FIG. 20) of the dealer server 2 (to be described later).

Step S55: Estimation information which is stored in the dealer server 2 and associated with the user ID is acquired, and the acquired estimation information is displayed on the user terminal 5 of that user using purchase review information list window D-2 (FIG. 31) or the estimation item confirm window D-3 (FIG. 32) in response to operation on that window.

Step S56: The updated estimation information which is stored in the dealer server 2 and associated with the user ID is displayed on the user terminal 5 of that user to allow the user to identify that the information has been updated, using purchase review information list window D-2 (FIG. 31) or the estimation item confirm window D-3 (FIG. 32) in response to operation on that window.

Steps S57 and S58: It is checked if the credit screening application request of the custom vehicle, the specifications of which have been settled, is issued (step S57: corresponding to step S17 (FIG. 17)). If YES in step S57, the flow advances to step S18 (FIG. 17); otherwise, the processing ends.

Furthermore, it is checked if a negotiation application request of the custom vehicle, the specifications of which have been settled, is issued (step S58: corresponding to step S19 (FIG. 17)). If YES in step S58, the flow advances to step S20 (FIG. 17); otherwise, the processing ends.

<Credit Screening Process (M5), Negotiation Application Process (M6)>

Figure 7:
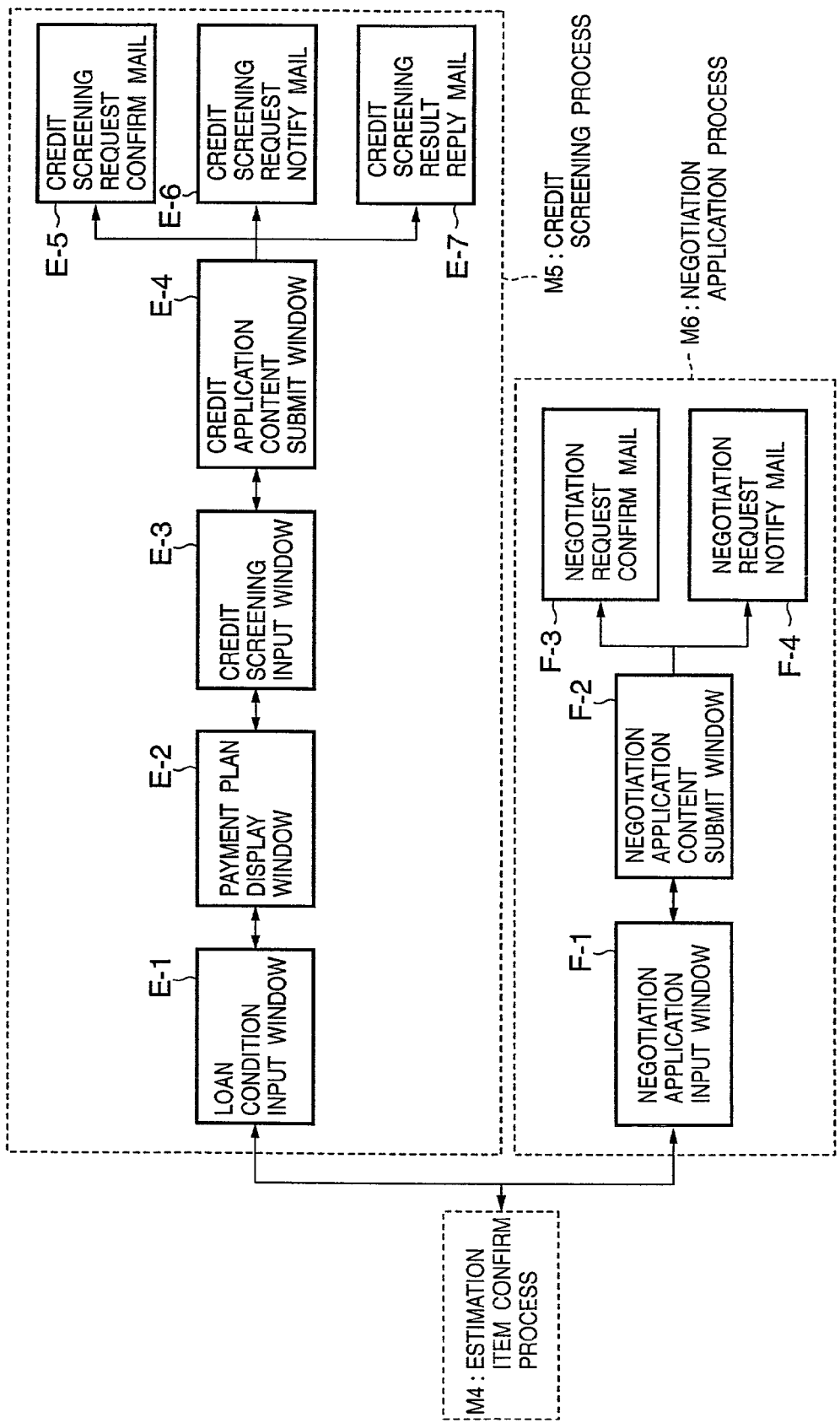
FIG. 7 is a chart showing transition of display windows in a credit screening process (M5) and a negotiation application process (M6), and an e-mail sending function upon credit screening and negotiation application.

FIG. 7 shows transition of display windows in the credit screening process (M5) and negotiation application process (M6), and an e-mail sending function upon credit screening and negotiation application. The credit screening process (M5) is launched upon operation of the "examine credit" button on the estimation item confirm window D-3 (FIG. 32)

displayed by the estimation item confirm process (M4), and the negotiation application process (M6) is launched upon operation of the "negotiation application" button on the estimation item confirm window D-3 (FIG. 32). The control can transit from the credit screening process (M5) and negotiation application process (M6) to the estimation item confirm process (M4).

As shown in FIG. 7, as transition of display windows in the credit screening process (M5), a loan condition input window E-1 (FIG. 33), payment plan display window E-2 (FIG. 34), credit screening input window E-3, and credit application content submit window E-4 can be displayed on the user terminal 5.

Loan condition input window E-1 (FIG. 33): On this window, the user of the user terminal 5 can input various items that pertain to credit to be used when he or she purchases the custom vehicle, which is presented by the estimation item selected in the estimation item confirmation process, on installment, and the payment plan display window E-2 (FIG. 34) is displayed on the user terminal 5 upon operation of a "calculate" button after the user inputs the predetermined items.

Payment plan display window E-2 (FIG. 34): This window displays a list of credit calculation results (payment plan) on the basis of the items set on the loan condition input window E-1. Upon operation of a "credit screening application" button on this window, the credit screening application window E-3 is displayed on the user terminal 5.

Credit screening application window E-3 (not shown): On this window, the user of the user terminal 5 can apply to a credit company for credit screening based on the payment plan displayed on the payment plan display window E-2.

Credit application content submit window E-4 (not shown): This window displays information indicating that the credit screening application request was submitted and accepted by the vehicle manufacturer server 1, and the user will receive an e-mail message associated with the screening result.

The estimation item confirm process (M4) includes a function of sending/receiving an e-mail message in response to credit screening application information submitted from the user terminal 5 on the credit application content submit window E-4.

Credit screening request confirm mail E-5: The vehicle manufacturer server 1 that received the credit screening request from the user sends an e-mail message to the mail address previously input by the user to confirm if the user actually submitted the credit screening request.

Credit screening request notify mail E-6: The vehicle manufacturer server 1 sends an e-mail message to the credit company to inform it that the credit screening request was issued from the user. This e-mail message contains the contents of the payment plan displayed on the payment plan display window E-2, information associated with the user, and the like.

Credit screening result reply mail E-7: The credit company that made credit screening sends a reply e-mail message of the screening result to the mail address previously input by the user, and the vehicle manufacturer server 1.

As transition of display windows in the negotiation application process (M6) shown in FIG. 7, a negotiation application input window F-1 (FIG. 35) and negotiation application content submit window F-2 can be displayed on the user terminal 5.

Negotiation application input window F-1 (FIG. 35): On this window, the user of the user terminal 5 can input various items (the presence/absence of a trade-in, the presence/ absence of credit use, desired date of negotiation, and the like) associated with negotiation application to the dealer, which presented the estimated price of the custom vehicle presented by estimation items selected in the estimation item confirmation process (M4), and the negotiation application content submit window F-2 is displayed on the user terminal 5 upon operation of a "negotiation application" button after input of the predetermined items.

Negotiation application content submit window F-2 (not shown): This window displays information indicating that the application contents on the negotiation application input window F-1 were submitted and accepted by the vehicle manufacturer server 1, and an e-mail or phone contact associated with negotiation will be made from the corresponding dealer.

The negotiation application process (M6) includes a function of sending/receiving e-mail messages in response to negotiation application information submitted from the negotiation application content submit window F-2 on the user terminal 5.

Negotiation request confirm mail F-3: The vehicle manufacturer server 1 that received the negotiation request from the user sends an e-mail message to the mail address previously input by the user to confirm if the user actually issued the negotiation request.

Negotiation request notify mail F-4: The vehicle manufacturer server 1 sends an e-mail message to the objective dealer to inform it that the negotiation request was received from the user. This e-mail message contains the contents displayed on the negotiation application input window F-1, information associated with the user, and the like.

In this embodiment, as a method of actually placing an order of the custom vehicle to the vehicle manufacturer after the negotiation at the dealer, a method of placing an order from the dealer server 2 to the vehicle manufacturer server 1, a method of placing an order using a dedicated line, or the like may be used.

<Shipping Query Process (M7), Instruction Process (M8)>

Figure 8:
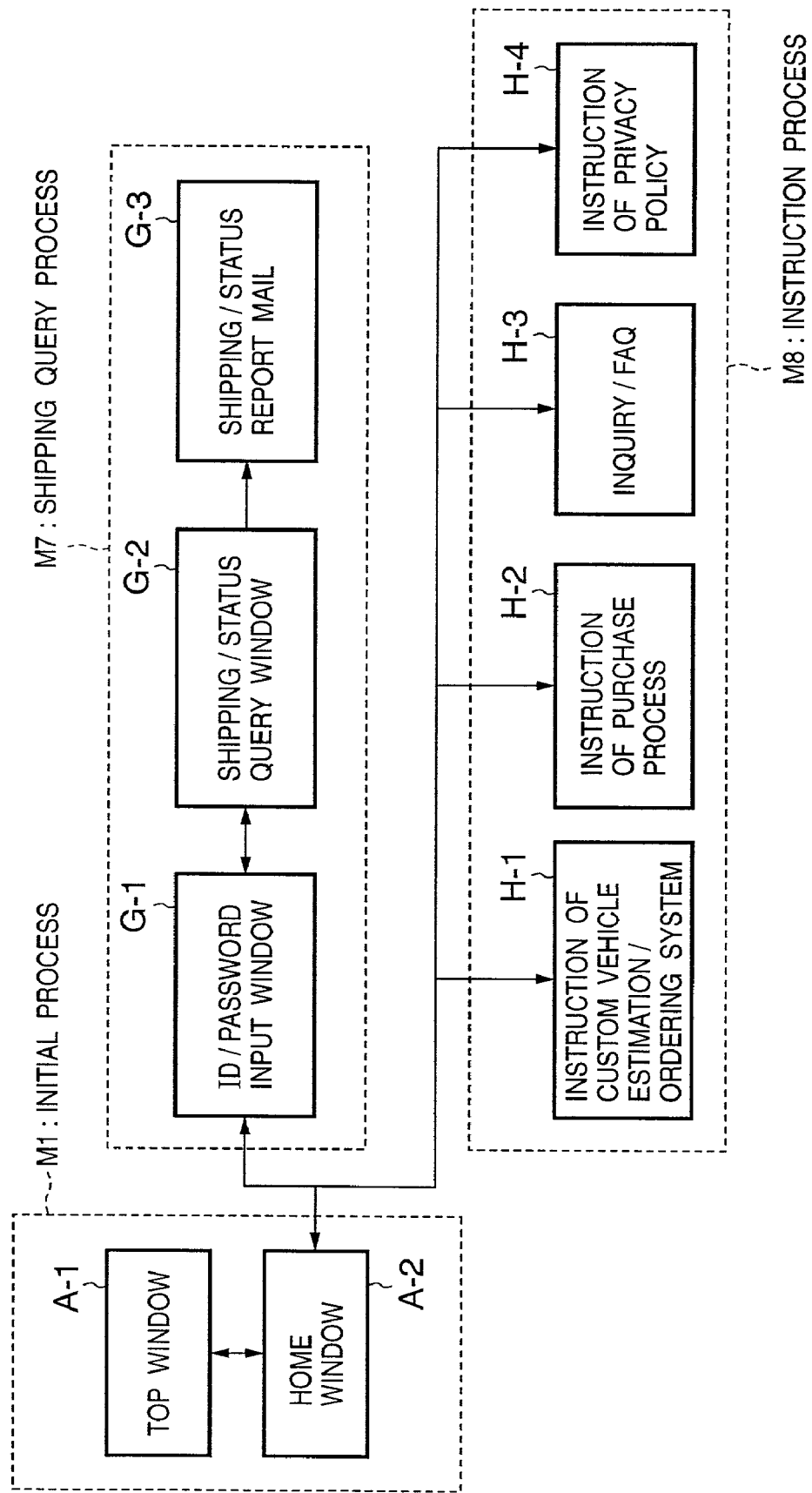
FIG. 8 is a chart showing transition of display windows in a shipping query process (M7) and instruction process (M8) and an e-mail sending function upon issuing a shipping query.

FIG. 8 shows transition of display windows in the shipping query process (M7) and instruction process (M8), and an e-mail sending function upon receiving a shipping query.

Figure 21:
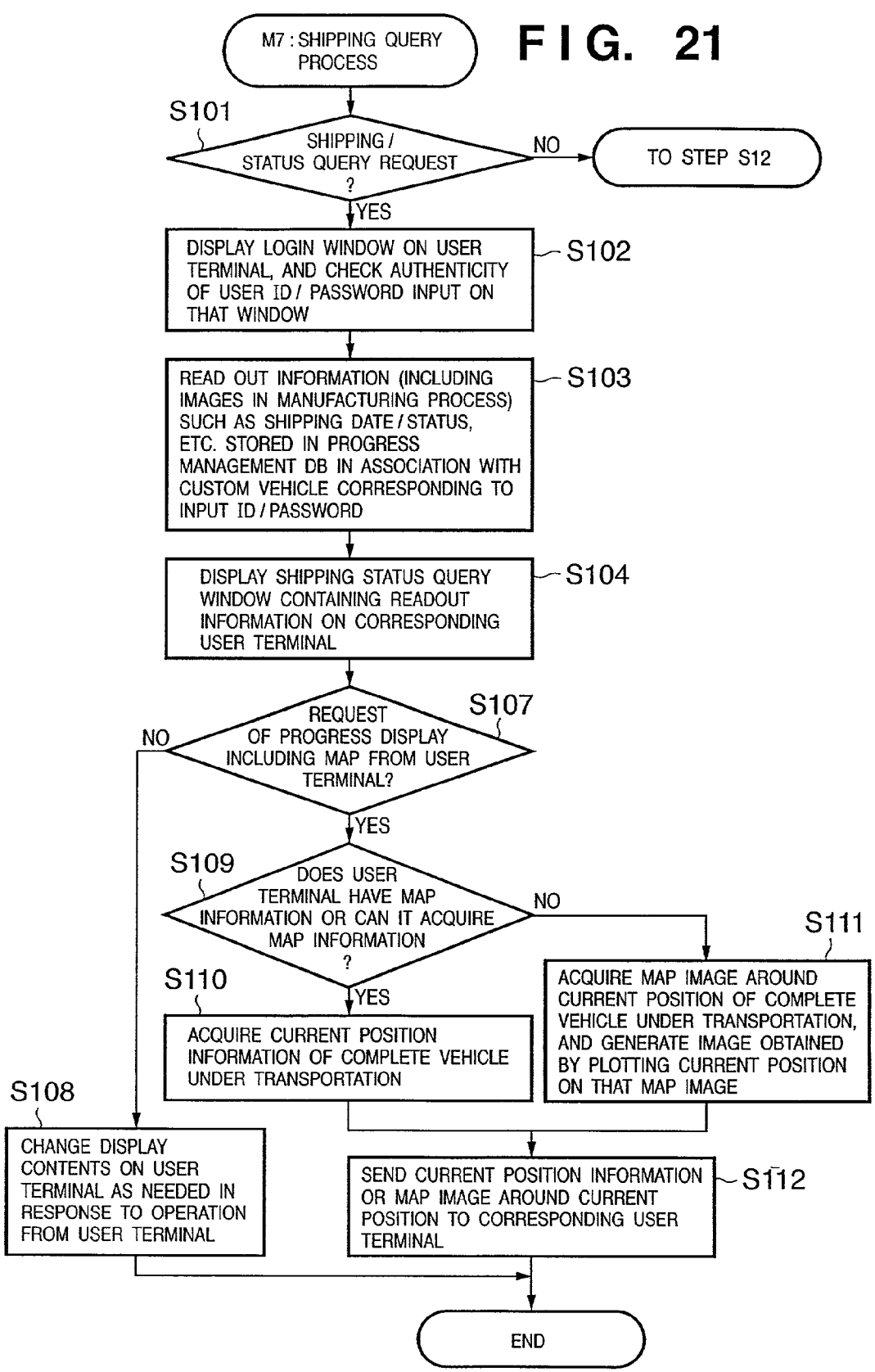
FIG. 21 is a flow chart showing the shipping query process (M7) executed by the vehicle manufacturer server 1.

The shipping query process (M7) is launched in response to an operation button "ordered vehicle shipping query" on the home window A-2 displayed by the initial process (M1). The vehicle manufacturer server 1 executes a progress status management process (FIGS. 36 to 38; to be described later) at predetermined cycles irrespective of the access state of the user terminal 5 to this system so as to implement the shipping query process (M7: FIG. 21).

The instruction process (M8) is launched upon operation of an operation button "about this site", "purchase procedure", "privacy policy", or the like on the home window A-2. The control can transit from the shipping query process (M7) and instruction process (M8) to the initial process (M1) in response to user's operation.

The shipping query process (M7) in FIG. 21 can display an ID/password input window G-1 (the same as in FIG. 30) and shipping status query window G-2 (FIG. 22) on the user terminal 5.

ID/password input window D-1 (FIG. 30): On this window, the user of the user terminal 5 inputs the user ID (member ID) and password previously issued to that user, and operates "submit" button to log into this system (vehicle manufacturer server 1). Upon completion of the login process, the shipping status query window G-2 (FIG. 22) is displayed on the user terminal.

Figure 22:
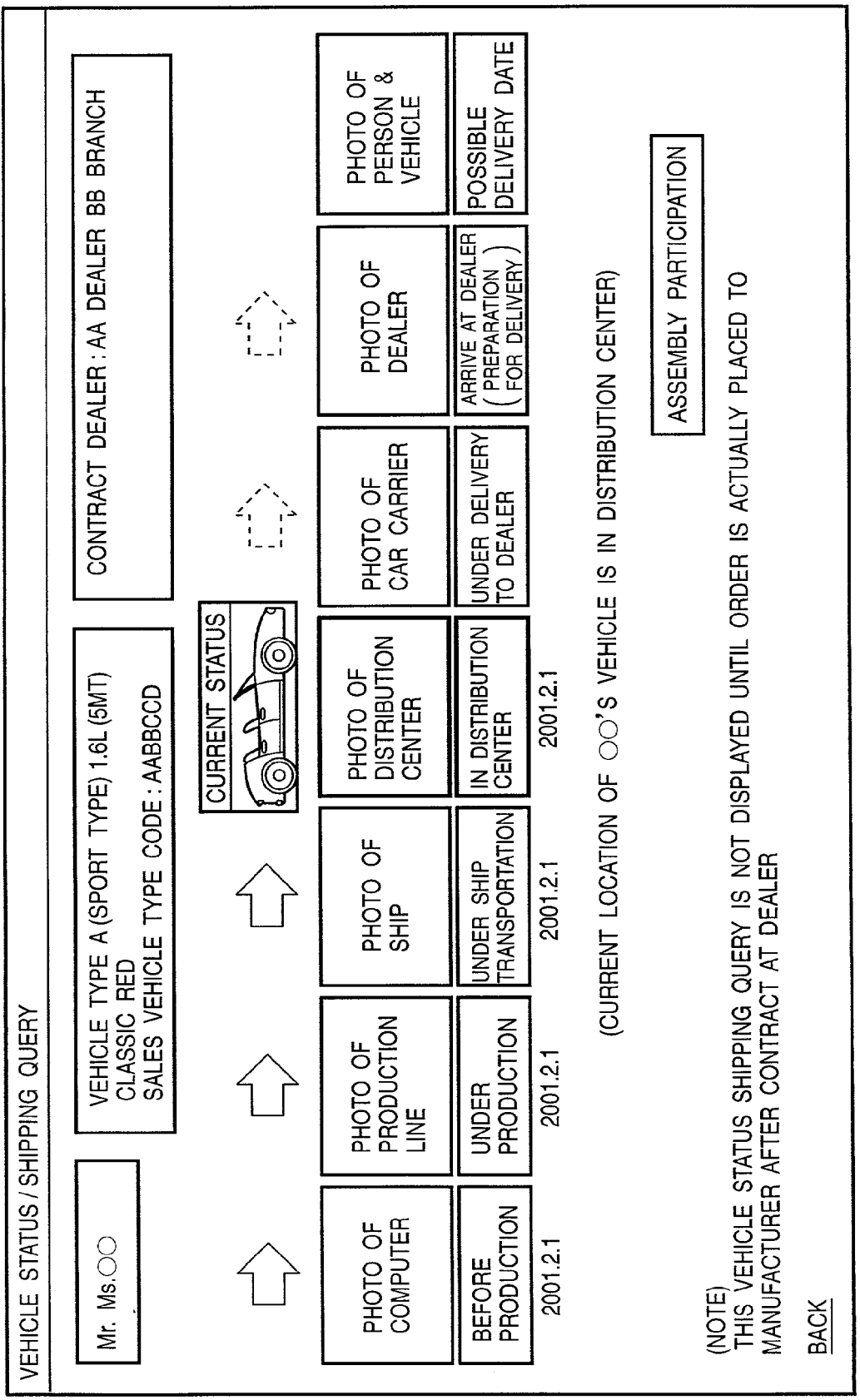
FIG. 22 shows an example of a shipping status query window G-2 in the embodiment of the present invention.
Figure 23:
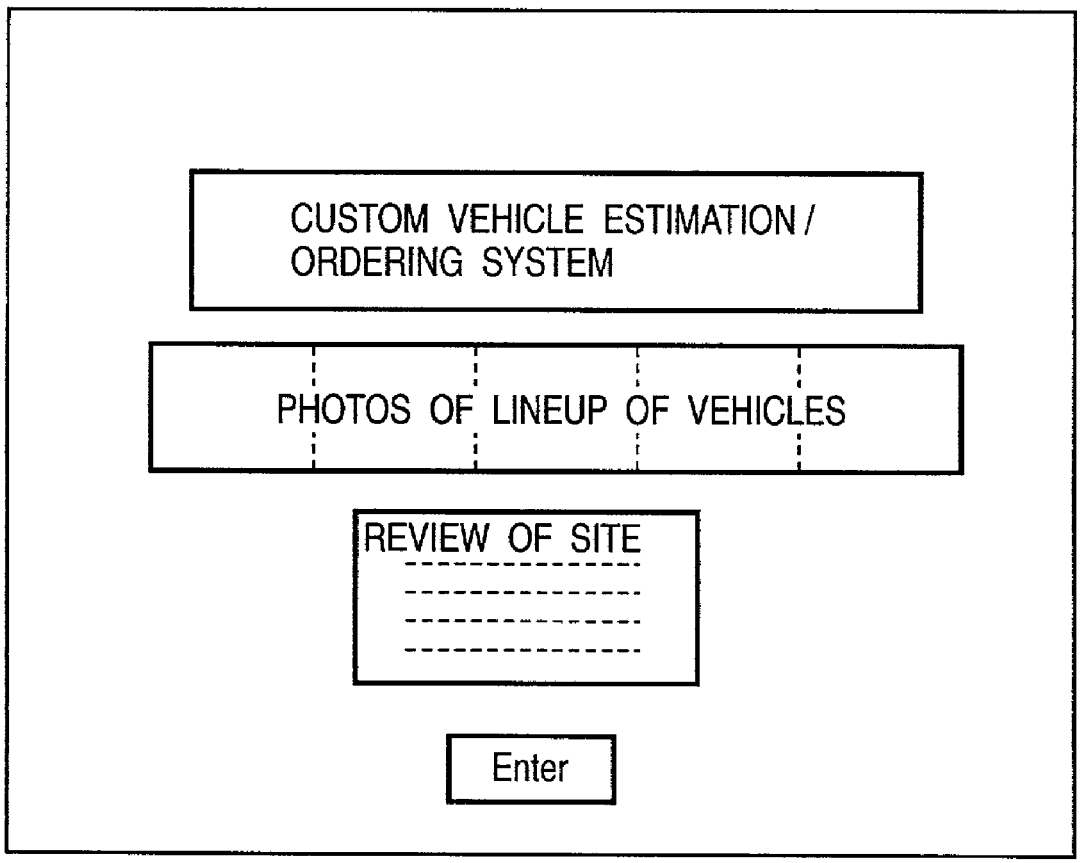
FIG. 23 shows an example of a top window A-1 as a home page window in the embodiment of the present invention.

FIG. 22 shows an example of the shipping status query window displayed by the shipping query process (M7). On this display window, the user can recognize the progress status in a plurality of stages from production until shipping of the custom vehicle that he or she is looking forward to delivery.

More specifically, the shipping status query window G-2 displays information that specifies the user, custom vehicle, and dealer, and presents the progress status in a plurality of stages from production until shipping of that custom vehicle by means of graphics indicating the current status, and images (photographed images) indicating respective stages. Also, a finished date is displayed for a stage that has been already finished.

When the user has clicked the second leftmost photo image of the production line in the respective stages shown in FIG. 22, photographed images during assembly (e.g., video or still images in a plurality of processes such as a backbone component assembly process, painting process, test process, and the like) are displayed on the user terminal 5.

When the user has clicked the third or fifth leftmost photo in the respective stages shown in FIG. 22, a map image indicating the transportation route and/or the current location upon transportation by a carrier ship or carrier vehicle (car carrier) of the custom vehicle is displayed on the user terminal 5.

Information to be displayed on the shipping status query window G-2 in FIG. 22 is collected as needed in the progress management DB 32 by the progress status management process (FIGS. 36 to 38; to be described later), and the vehicle manufacturer server 1 can acquire such information by referring to the progress management DB 32.

More specifically, when the vehicle type ID of the custom vehicle is determined by the aforementioned processes, and an on-line or off-line order of the custom vehicle with that vehicle type ID is placed, since the order number (order ID) of that custom vehicle is issued, the custom vehicle, which is under assembly in progress in the assembly line, can be easily and automatically specified and tracked using the order number upon producing the custom vehicle in the assembly line (production line) 13.

For this purpose, a plurality of photographing devices 14 may be provided to the assembly process, painting process, test process, and the like in the assembly line 13 of the vehicle manufacturer, as shown in FIG. 1, and images photographed when the custom vehicle reached the corresponding processes may be stored in the progress management DB 32 together with information of photographing dates using the order number (order ID) of the custom vehicle as a key.

As for the transportation route and/or the current position upon transportation, since the coordinate position information of the carrier vehicle 11 can be easily acquired using the GPS communication module 12 or the like mounted on the carrier vehicle 11, as shown in FIG. 1, the acquired coordinate position information may be stored in the progress management DB 32 using the order number (order ID) of the custom vehicle as a key.

FIG. 42 shows an example of a transportation status display window of a custom vehicle, which window is displayed when an icon emphasized as "current status" is selected from a plurality of icons shown in FIG. 22 (in this case, assume that "under ship transportation" is "current status"). The display window shown in FIG. 42 is displayed on the basis of the current position information, which is read out from the carrier vehicle 11 and is stored in the progress management DB 32, as described above. This display window displays a symbol that indicates the carrier vehicle, a symbol of a carrier ship and its transportation route, and symbols indicating the locations of the purchaser and dealer based on the registered addresses together with a map image of a region including these symbols.

Furthermore, after the order of the custom vehicle is placed to the vehicle manufacturer, and an actual production plan is determined in a management computer or the like, the scheduled dates (and times) the custom vehicle will reach the respective processes can be automatically and easily calculated on the basis of the production plane, the production performance (tact) of the assembly line (production line) used, and the like. Hence, an e-mail message that describes the calculated scheduled dates (and times) is sent to the user, and when the user accesses the shipping status query window G-2 (FIG. 22), the current status of the custom vehicle, assembly of which is in progress, may be presented to that user in real time. Such progress status until shipping of the custom vehicle can be provided as a pay option service by the progress status management process (FIGS. 36 to 38; to be described later) in this embodiment.

Figure 43:
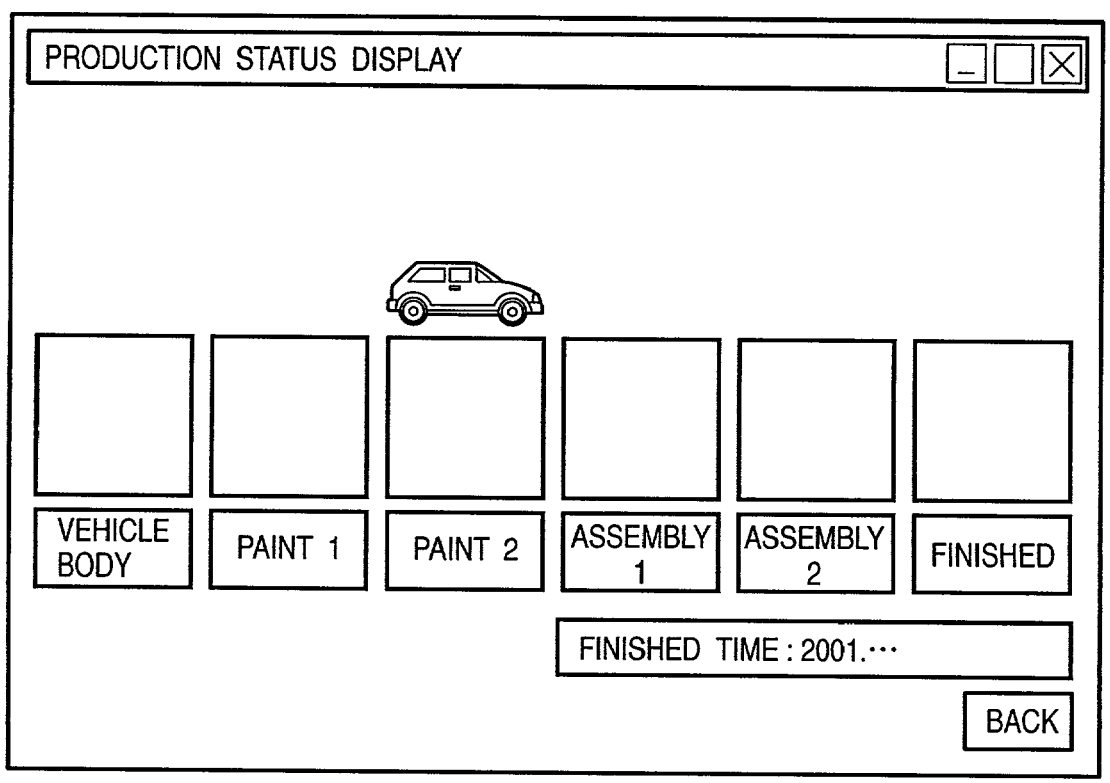
FIG. 43 shows an example of a production status display window.

When the purchaser subscribes to such pay option, and when the user of the user terminal 5 as the purchaser accesses this system on the scheduled date informed via the e-mail message, and clicks the second leftmost icon "under production" on the shipping status query window G-2 (FIG. 22), a production status display window shown in, e.g., FIG. 43 is displayed. This production status display window displays icons indicating a plurality of processes (the assembly process of a vehicle body, painting process, inspection process upon completion, and the like) in the assembly line. When the user selects one of these icons, an image of the process corresponding to the selected icon is displayed. As shown in FIG. 43, this production status display window displays the finishing time when assembly of the custom vehicle has finished, thus enhancing expectation to shipping of the purchaser.

Figure 44:
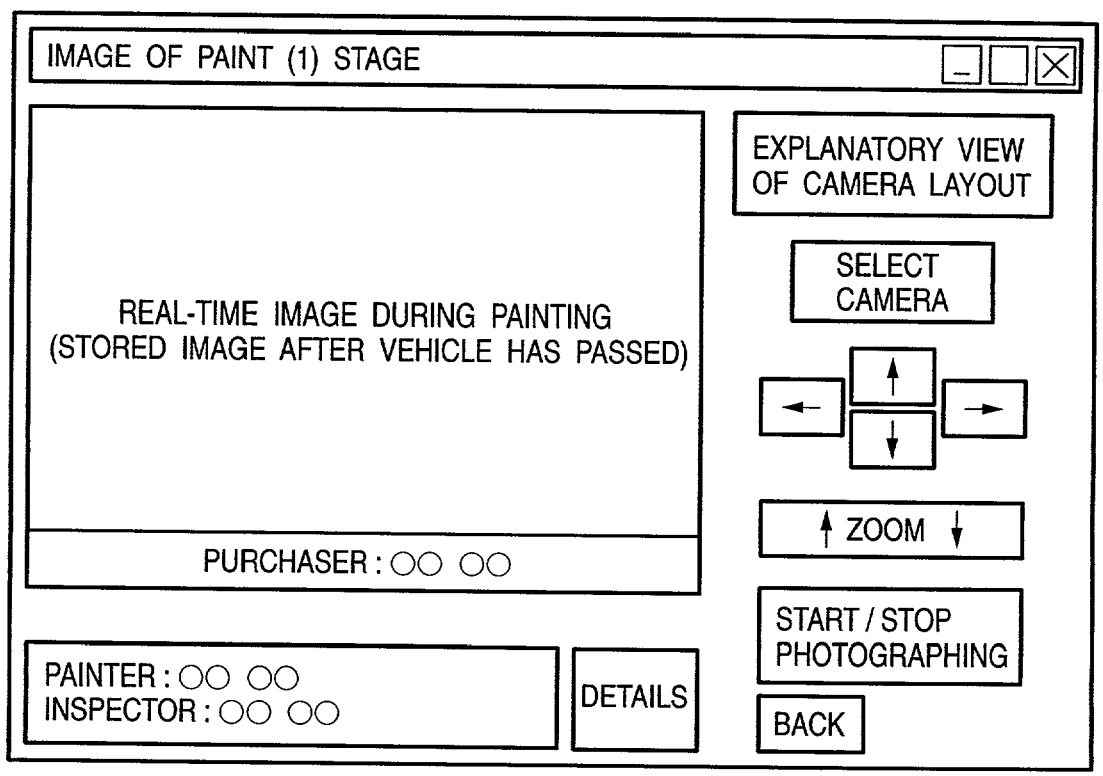
FIG. 44 shows an example of a display window which includes a photographed image of one process and an operation window of a photographing device 14.

FIG. 44 shows an example of a display window which includes a photographed image of one process and an operation window of the photographing devices 14, and exemplifies a case wherein the icon of "paint (1)" process is selected on the production status display window shown in FIG. 43. This display window displays, as a man-machine interface, buttons for selecting one of the plurality of photographing devices 14 equipped at the "paint (1)" process, and adjusting the photographing states (zoom, tilt, pan, and in-focus states) of the selected photographing device 14, and also a display area of an image photographed by the selected photographing device 14. Also, the display window displays the name and the like of the purchaser of the custom vehicle. When the user of the user terminal 5 accesses this system after an elapse of the scheduled date that he or she was informed of on the display window shown in FIG. 44, no buttons for remote-controlling the photographing device 14 from the user terminal 5 are displayed.

As described above, according to the displayed image (FIG. 44) for each process, the user (purchaser) of the user terminal 5 can confirm photographed images (video image or still image) during assembly of the ordered custom vehicle in respective processes in real time. In this manner, the user can enjoy the processes themselves until shipping, and can enhance expectation to shipping. Since this display window includes the names of operators who are concerned in objective processes, the sense of responsibility on jobs can be improved on the part of these operators, and expectation to shipping, and confidence and attachment to the delivered specific vehicle can be enhanced on the part of the purchaser.

In this embodiment, the purchaser (customer) of the custom vehicle can subscribe to an option service, in which he or she can participate in assembly of the custom vehicle by remote control, upon making a purchase contract.

Figure 39:
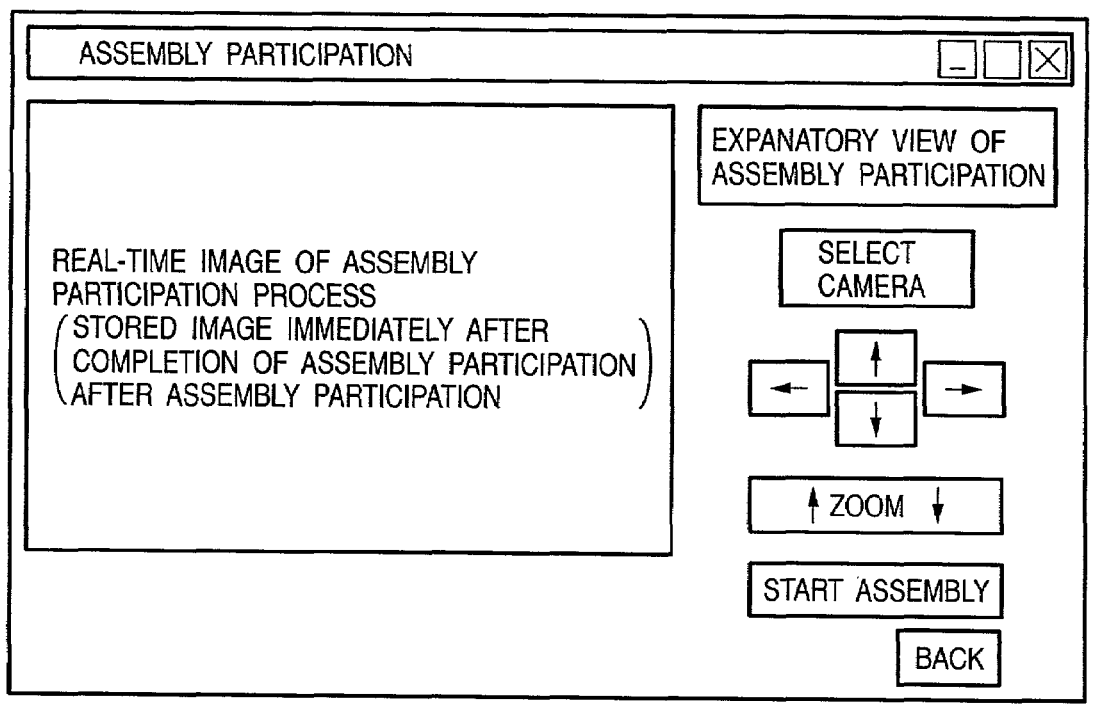
FIG. 39 shows an example of an operation window used to remote-control assembly operation in a predetermined assembly participation process in an assembly line 13.

In FIG. 22, an "assembly participate" button is a software button additionally displayed for only the user terminal 5 of the purchaser who has subscribed to an option service upon making a purchase contract. When the purchaser who has subscribed to the option service accesses this system using the user terminal 5 in accordance with the settled schedule informed via an e-mail message, and clicks the "assembly participate" button on the shipping status query window G-2 (FIG. 22), an operation window shown in FIG. 39 is additionally displayed as a man-machine interface for remote control.

In this embodiment, the user participates in assembly by remote control from the user terminal. Alternatively, the user may visit the assembly line of the vehicle manufacturer according to the settled schedule to actually make an easy assembly operation.

FIG. 21 is a flow chart showing the shipping query process (M7) executed by the vehicle manufacturer server 1.

Steps S101 and S102 in FIG. 21: It is checked if a shipping status query request is issued during the initial process (M1) (step S101: corresponding to step S12 (FIG. 17)). If NO in step S101, the flow returns to step S12 (FIG. 17); otherwise, the ID/password input window D-1 (the same as in FIG. 30) is displayed on the user terminal 5 and the authenticity of the user ID and password input to that window is checked (step S102).

Steps S103 and S104: Information (including images in the manufacture processes) such as a shipping date/status, and the like of the custom vehicle corresponding to the input ID/password, which information is stored in the progress management DB 32, is read out (step S103), and the shipping status query window G-2 (FIG. 22) containing the readout information is displayed on the user terminal 5 (step S104).

Steps S107 and S108: It is checked if the request of progress display including a map is received from the user terminal 5 (step S107). If YES in step S107, the flow advances to step S109; otherwise, a window corresponding to the input operation made at the user terminal 5 is displayed (step S108).

Steps S109 to S111: It is checked if the user terminal 5 has map information or can acquire it externally (step S109). If YES in step S109, the current position information of the complete vehicle under transportation, which is stored in the progress management DB 32, is acquired (step S110); otherwise, the current position information of the complete vehicle under transportation and a map image around there are acquired, and an image performed plotting corresponding to the current position information on that map image is generated (step S111).

Step S112: The current position information or the map image around the current position generated in step S111 is sent to the user terminal 5.

Figure 37:
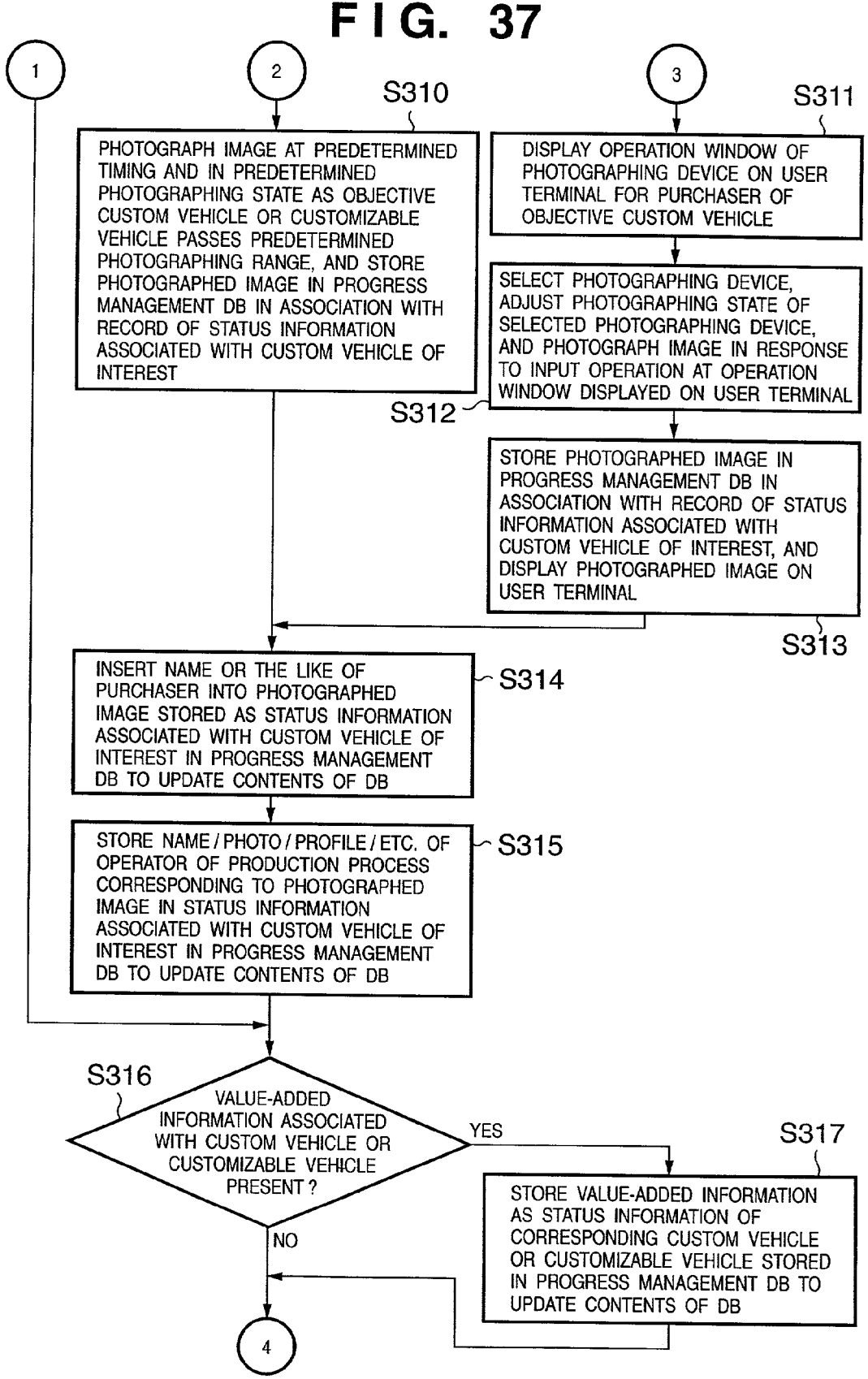
FIG. 37 is a flow chart showing the progress status management process executed by the vehicle manufacturer server 1.
Figure 38:
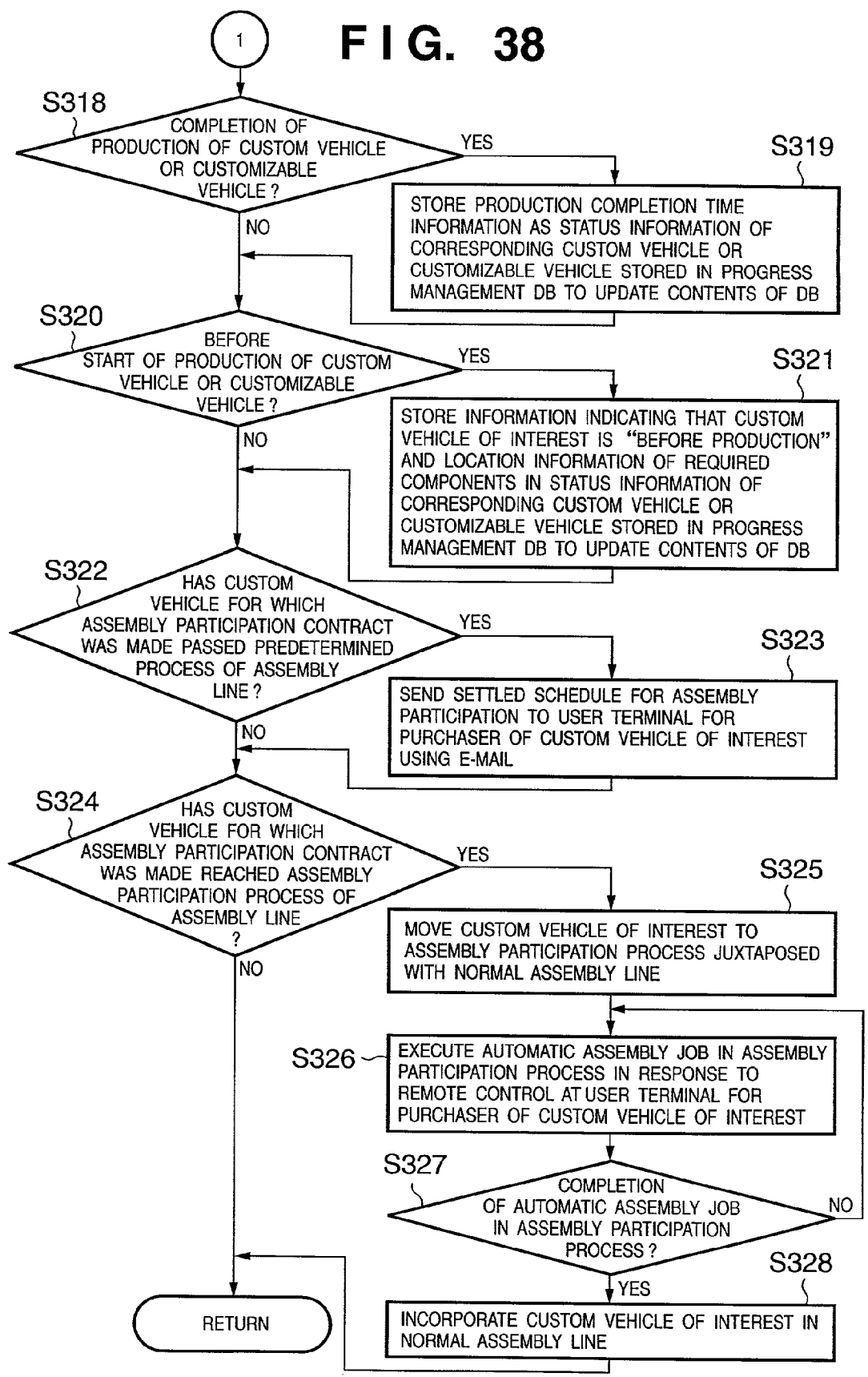
FIG. 38 is a flow chart showing the progress status management process executed by the vehicle manufacturer server 1.

FIGS. 36 to 38 are flow charts showing the progress status management process executed by the vehicle manufacturer server 1.

Step S301 in FIGS. 36 to 38: Status information indicating progress status until shipping of each vehicle is acquired from a host computer (not shown) for production management or the like, and the acquired status information is stored in the progress management DB 32. This status information contains, for each vehicle, contract status, gathering status of components required for assembly to the vehicle manufacturer, production status in the assembly line 13, transportation status until shipping to the purchaser, shipping date information, and the like.

Note that each vehicle is the ordered custom vehicle or a vehicle which can be assigned (reserved) as the custom vehicle in the middle of assembly (to be referred to as a customizable vehicle hereinafter).

Steps S302 and S303: It is checked by referring to the progress management DB 32 if shipping date information of the custom vehicle before delivery to the purchaser is settled or changed (step S302). If NO in step S302, the flow advances to step S304; otherwise, a shipping status report mail message G-3 which contains information that pertains to the settled shipping date or a change in shipping date and is set with the dealer in charge of the corresponding vehicle as a source is sent to the user terminal 5 of the corresponding purchaser (step S303).

Step S304: It is checked by referring to the progress management DB 32 if scheduled times at which the custom vehicle will pass the production processes of the assembly line 13 have been determined. If YES in step S304, the flow advances to step S305; otherwise, the flow advances to step S307. If it is determined in this step that the scheduled passage times have been determined, this means that scheduled times at which the custom vehicle of interest will pass the predetermined ranges of the plurality of photographing devices 14 set in the production processes of the assembly line 13 (i.e., times at which photographed images are to be recorded) have been clarified.

Steps S305 and S306: It is checked by referring to the progress management DB 32 if the purchaser of the custom vehicle of interest is a subscriber of a pay option (step S305). If NO in step S305, the flow advances to step S307.

On the other hand, if YES in step S305, an e-mail message that informs the purchaser of the custom vehicle of interest of scheduled times at which that custom vehicle will pass the predetermined photographing ranges of the individual photographing devices 14 during assembly in turn in the respective production processes of the assembly line 13 is sent to the user terminal 5 of the corresponding purchaser (step S306). The source of this e-mail message is automatically set to be the dealer in charge of the custom vehicle of interest (purchaser).

Note that the pay option is a service for informing the purchaser of the scheduled times at which the custom vehicle will pass the predetermined photographing ranges of assembly operations in respective stages and providing images of production (assembly) in the respective stages in real time using the display windows as shown in FIGS. 43 and 44 above, so as to provide photographed images of the respective stages (production processes) from the initial stage of assembly of that custom vehicle (e.g., an unpainted stage before principal components which form a body are assembled) to finishing (e.g., shipping) in real time to the purchaser who has ordered that custom vehicle. With this service, the purchaser can enjoy the processes themselves until shipping, and his or her expectation to shipping can be enhanced. In this case, for the vehicle manufacturer, an additional job for adjusting the production plan of the assembly line 13 is needed so as to, for example, be able to provide photographed images in respective stages of production in nearly real time, since the custom vehicle of interest must be manufactured in a semi-full-order system. However, the value for that job is provided by additional cost received from the purchaser as a pay service, thereby a reasonable business option is realized.

Steps S307 and S308: It is checked by referring to the progress management DB 32 if the objective custom vehicle or customizable vehicle passes (or is about to pass) the predetermined photographing range of each photographing device 14 (step S307). If NO in step S307, the flow jumps to step S316. On the other hand, if YES in step S307, it is checked if the purchaser of the custom vehicle is a subscriber of the pay option (step S308). If NO In step S308, the flow jumps to step S316; otherwise, the flow advances to step S309.

Step S309: It is checked if the user terminal 5 for the purchaser of the objective custom vehicle has established connection to this system. If NO in step S309, the flow advances to step S310; otherwise, the flow advances to step S311.

Step S310: An image of the objective custom vehicle or customizable vehicle is photographed at a predetermined timing and in a predetermined photographing state as that vehicle passes the predetermined photographing range of each photographing device 14 upon assembly in turn in respective production processes of the assembly line, and the photographed image is stored in the progress management DB 32 in association with the record of status information associated with that custom vehicle. The flow then advances to step S314. The photographed image stored in this step is read out from the progress management DB 32 in response to display of the display window shown in FIG. 44 on the user terminal 5, and is displayed on the photographed image display area included in that display window.

More specifically, images of not only the custom vehicle but also the customizable vehicle during assembly must be photographed and recorded in step S310. The reason for this will be explained below. When progress status in each stage until shipping of the custom vehicle is provided to the purchaser (user of the user terminal 5) by means of photographed images, the respective assembly states of that custom vehicle in the assembly line 13 must be photographed in turn, and this embodiment provides photographed images in nearly real time as the pay option.

However, a customizable vehicle during assembly in the assembly line 13 must often be assigned (reserved) as the custom vehicle according to the order to assure a short shipping term. In such case, photographed images of that vehicle before it was ordered as the custom vehicle are often not available. Hence, in this embodiment, images of the customizable vehicle during assembly are photographed and recorded in step S310, and photographed images before assignment corresponding to the ordered custom vehicle are acquired from the photographed images. In this way, photographed images of respective stages from the beginning of assembly to finishing can be provided to the purchaser of the ordered specific vehicle, although they are provided not in real time, and the purchaser can enjoy the processes themselves until shipping.

Step S311: Since the user terminal 5 for the purchaser of the objective custom vehicle has established connection to this system, the display window which includes the photographed image of a predetermined one process where the objective custom vehicle is scheduled to pass at the current timing, and the operation window of the photographing device 14 is displayed on the user terminal 5.

Step S312: A desired one of the plurality of photographing devices 14 equipped at the objective process is selected, the photographing states (zoom, tilt, pan, and in-focus states) of the selected photographing device 14 are adjusted, and an image is photographed in response to operations of software buttons for various operations included in the display window (FIG. 44) displayed on the user terminal 5.

Step S313: The image photographed in step S312 is stored in the progress management DB 32 in association with the record of status information associated with the custom vehicle, and is displayed in nearly real time on the display window shown in FIG. 44, which is displayed on the user terminal 5.

Step S314: The name and the like of the purchaser are stored in the record that stores the photographed images as status information associated with the custom vehicle in the progress management DB 32 to update the old record. The information items stored in this step are read out from the progress management DB 32 together with the photographed image in response to display of the display window shown in FIG. 44 on the user terminal 5, and are displayed at predetermined positions in that display window.

Note that the customizable vehicle, the purchaser of which was determined in the middle of assembly, has already undergone predetermined assembly processes in the assembly line 13 before it was ordered as a custom vehicle of purchaser's choice, and its assembling states have already photographed and stored in the progress management DB 32 in step S310. When the purchaser is determined in the middle of assembly, the names and the like of the determined purchaser may be inserted in images which have already been stored in the progress management DB 32 in association with the customizable vehicle assigned as a custom vehicle to be delivered to that purchaser, and such information can be stored in the progress management DB 32 to update the old record. The information items such as the name and the like of the purchaser, which are newly stored in the progress management DB 32 are read out from the progress management DB 32 together with the photographed image in response to display of the display window shown in FIG. 44 on the user terminal 5, and are then displayed at predetermined positions in that display window.

Step S315: Furthermore, information associated with the name, photo, profile, and the like of an operator in charge of each process (assembly, inspection, or the like) corresponding to the photographed image is acquired from a database (not shown), and the acquired information is stored in association with the record that stores the photographed image as status information associated with the corresponding custom vehicle in the progress management DB 32 to update the old record. The information items newly stored in this step are read out from the progress management DB 32 together with the photographed image in response to display of the display window shown in FIG. 44 on the user terminal 5, and are displayed at predetermined positions in that display window.

Steps S316 and S317: It is checked if special value-added information is present in association with the custom vehicle or customizable vehicle (step S316). If NO in step S316, the flow advances to step S318; otherwise, the value-added information is stored as status information of the corresponding custom vehicle or customizable vehicle stored in the progress management DB 32 to update the old information (step S317).

Figure 41:
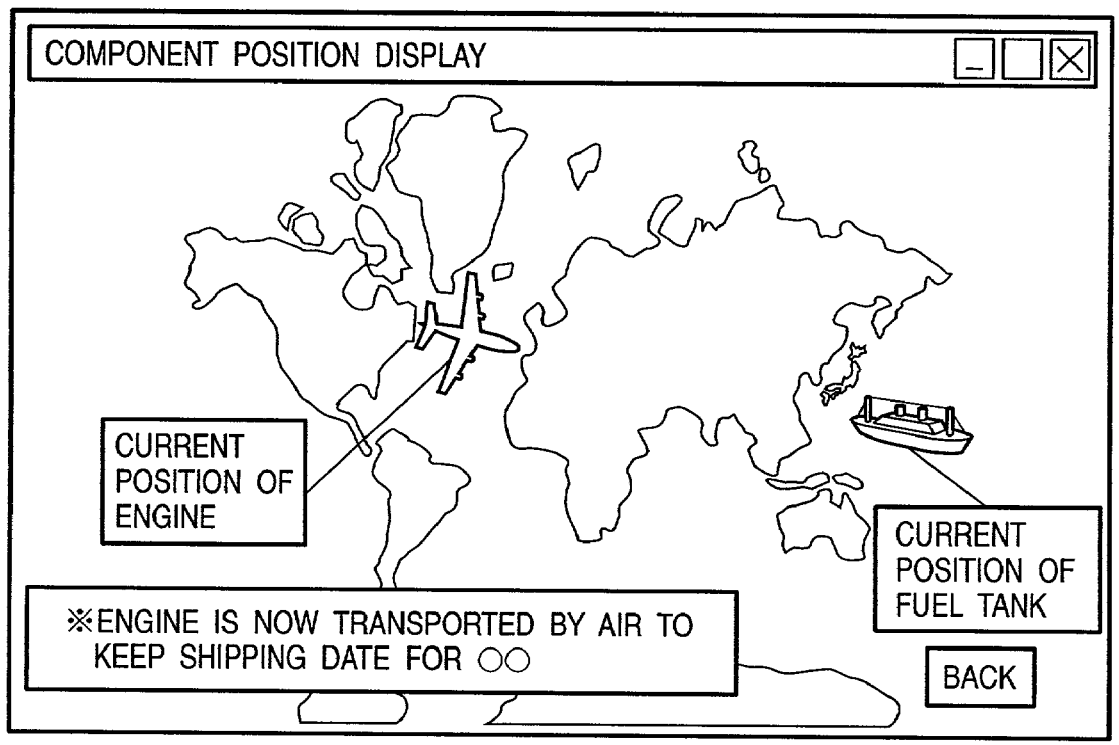
FIG. 41 shows an example of window for informing the purchaser of the locations of components required to assemble a custom vehicle.

Note that the value-added information is information which is associated with a special situation (e.g., air transportation of a principal component such as an engine or the like) falling outside a plurality of predetermined processes until shipping of the custom vehicle upon assembling the custom vehicle in the assembly line 13. In this embodiment, since the purchaser of the custom vehicle can be informed of such special situation using the display window shown in, e.g., FIG. 41, he or she can enjoy the processes themselves until shipping, and can enhance expectation to shipping and attachment to the delivered custom vehicle. However, upon displaying, for example, the component position display window (FIG. 41), it is practically difficult to calculate the current location of each component. In such case, the current location of a deficient component may be estimated by a reverse operation from the already determined production plan. With such display window, since the purchaser can recognize the gathering status of components required to build the ordered custom vehicle to the vehicle manufacturer, he or she can enjoy processes themselves until shipping, and can enhance expectation to shipping.

Steps S318 and S319: It is checked if production of the custom vehicle or customizable vehicle is complete, and is removed from the assembly line 13 (step S318). If NO in step S318, the flow advances to step S320; otherwise, the time information upon completion of production is stored in association with status information associated with the corresponding custom vehicle or customizable vehicle in the progress management DB 32 to update the old information (step S319). The information items newly stored in step S319 are read out from the progress management DB 32 in response to display of the display window shown in FIG. 43 on the user terminal 5, and are displayed at predetermined positions in that display window.

Steps S320 and S321: It is checked if production of the custom vehicle or customizable vehicle is not started in the assembly line 13 (step S320). If NO in step S320, the flow advances to step S322; otherwise, information indicating that the custom vehicle is "before production" and location information of required components are stored in association with status information associated with the corresponding custom vehicle or customizable vehicle in the progress management DB 32 to update the old information (step S321). The information items newly stored in step S321 are read out from the progress management DB 32 in response to display of the display window shown in FIG. 41 on the user terminal 5, and are used to calculate the display positions of components to be displayed on that display window.

Note that the location information of each component associated with status information is cleared at the beginning of production of the corresponding custom vehicle or customizable vehicle in the assembly line 13.

Steps S322 and S323: It is checked if the custom vehicle for which the assembly participation contract was made has passed a predetermined process in the assembly line 13 (step S322). If NO in step S322, the flow advances to step S324; otherwise, an e-mail message that describes the settled schedule for assembly participation is sent to the user terminal 5 for the purchaser of the custom vehicle (step S323).

Step S324: It is checked if the custom vehicle for which the assembly participation contract was made has reached a predetermined assembly participation process in the assembly line 13. If NO in step S324, the flow returns to step S301; otherwise, the flow advances to step S325.

Step S325: The custom vehicle for which the assembly participation contract was made is moved to a predetermined assembly participation process.

Figure 40:
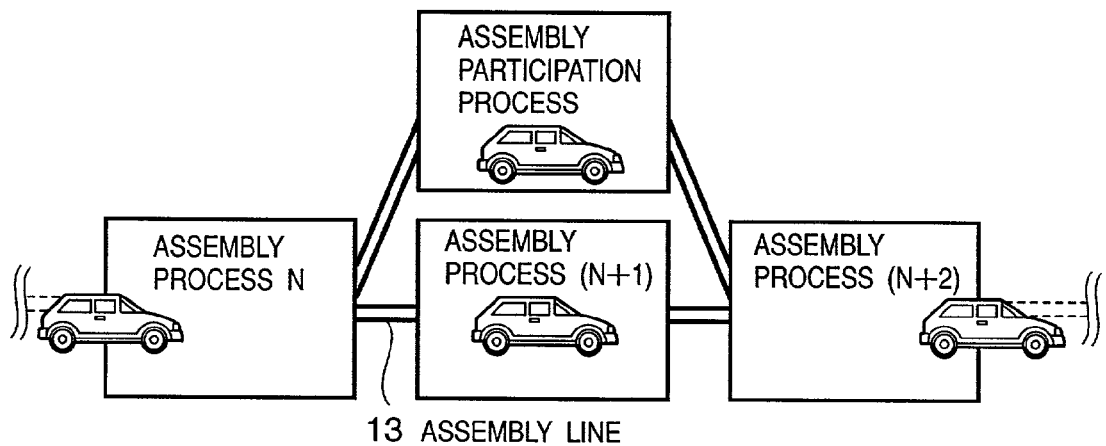
FIG. 40 is a view for explaining the predetermined assembly participation process juxtaposed in the assembly line 13.

Note that the predetermined assembly participation process in the assembly line 13 is a dedicated process juxtaposed with a normal assembly line (processes N, N+1, N+2, . . . ) in the assembly line, as shown in FIG. 40, and comprises an automatic machine which makes a predetermined job (e.g., fastens bolts) in response to remote control from the user terminal 5 via the vehicle manufacturer server 1.

Steps S326 and S327: The remote-control operation window shown in FIG. 39 is displayed on the user terminal 5 for the purchaser of the custom vehicle for which the assembly participation contract was made, and the automatic machine equipped in the assembly participation process is controlled in response to remote control by the purchaser using that display window to execute a predetermined automatic assembly job (step S326). Upon detection of completion of the automatic assembly job in the automatic assembly process in step S327, the flow advances to step S328.

The operation window shown in, e.g., FIG. 39 displays an image obtained by photographing the state of the assembly participation process, and also software buttons and the like for selecting the photographing device 14 used to photograph the assembly participation process, adjusting the photographing state of the selected photographing device, and instructing start of assembly by remote control. With this operation window, the purchaser can enjoy the processes themselves until shipping, and can enhance expectation to shipping and attachment to the delivered custom vehicle.

Step S328: The custom vehicle that has undergone the automatic assembly job in the assembly participation process is incorporated in the normal assembly line, and the flow returns to step S301.

According to the aforementioned shipping query process (M7) and progress status management process (FIGS. 36 to 38), the user can easily recognize respective stages until shipping of the custom vehicle (specific vehicle) he or she ordered on his or her user terminal 5 such as a computer or the like, and expectation of the user who is looking forward to delivery can be satisfied.

In the instruction process (M8) shown in FIG. 8, an instruction H-1 of the custom vehicle estimation/ordering system, an instruction H-2 of the purchase process, an instruction H-3 of inquiry/FAQ, and an instruction H-4 of privacy policy are displayed on the user terminal 5. These instructions (instruction windows: none of them are shown) can be registered in advance in, e.g., the storage device 26 of the vehicle manufacturer server 1.

[Software Executed by Dealer Server 2]

Software executed by the CPU 21 of the dealer server 2 will be explained below.

Figure 20:
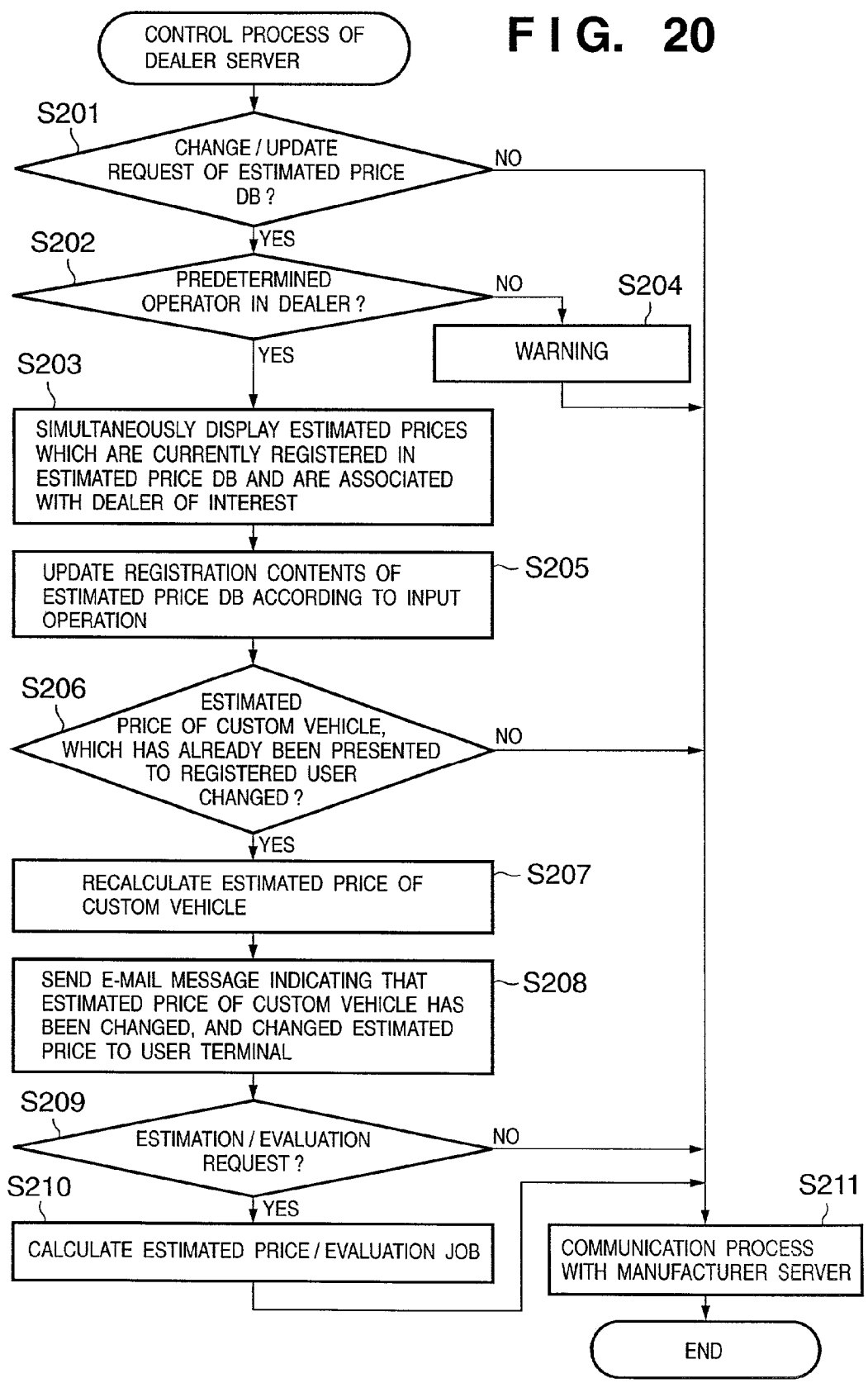
FIG. 20 is a flow chart showing the control process executed by the dealer server 2 in the embodiment of the present invention.

FIG. 20 is a flow chart showing the control process executed by the dealer server 2 in this embodiment.

Steps S201, S202, and S204 in FIG. 20: It is checked if a change or update request of the estimated price stored in the estimated price DB 35 is received (step S201). If NO in step S201, the flow jumps to step S209; otherwise, it is checked using the ID and password if the operator is a predetermined user of the dealer (step S202). If it is determined in step S202 that the operator is the predetermined user, login to the dealer server 2 is permitted, and the flow advances to step S203; otherwise, a warning is generated (step S204), and login to the dealer server 2 is denied.

Steps S203 and S205: The estimated prices associated with the dealer, which are currently registered in the estimated price DB 35, are simultaneously displayed (step S203), and the registration contents of the estimated price DB 35 are updated in accordance with input operations on the displayed window (step S205).

Steps S206 and S207: It is checked by referring to the update history of the estimated price DB 35 if the estimated price is to be changed in association with the user from whom the estimation request of the custom vehicle has already been received, and to whom the estimated price of that custom vehicle has already been presented (step S206). If NO in step S206, the flow jumps to step S209; otherwise, the estimated amount per custom vehicle is recalculated (step S207).

Step S208: An e-mail message (estimation result reply mail C-11) indicating that the estimated amount of the custom vehicle has been changed, and the changed amount is sent to the corresponding user terminal. In this manner, the estimated price of an article with desirably selected specifications can be automatically and efficiently provided to the user, and such process can contribute to a price reduction of the article.

Steps S209 and S210: It is checked if the dealer receives the estimation request and/or the evaluation request from the vehicle manufacturer server 1 via estimation/evaluation request confirm mail C-9 (step S209). If NO in step S209, the flow advances to step S211; otherwise, the estimated amount per custom vehicle is calculated with reference to the estimated price DB 35 in accordance with the identification information (specification number) which is acquired via the mail and indicates the custom specifications (step S210). If the estimation/evaluation request confirm mail C-9 contains the evaluation request in step S209, a trade-in is evaluated in accordance with the specification items of the trade-in acquired via that mail. Note that the evaluation may be made by actually confirming the trade-in by a service person of that dealer in a conventional way, or may be automatically made by referring to a database or the like in which the market prices of pre-owed vehicles are set.

Step S211: A communication process with the vehicle manufacturer server 1 is executed. In this process, the estimated price DB 35 undergoes update (equalization) of specification items which are stored in the manufacturer's suggested retail price DB 31 and can be selected by this system from the vehicle manufacturer server 1. Also, the dealer server 2 sends the estimated price for the objective customer (the user of the user terminal 5) to the vehicle manufacturer server 1 when the estimated price has been updated in step S205 or when the request is received, in accordance with the above described process in step S55 of FIG. 19, from the vehicle manufacturer server 1 to display the order review information list window D-2 (FIG. 31) or estimation item confirm window D-3 (FIG. 32) on the user terminal.

According to the above embodiment, the user himself or herself can easily, pleasantly, and interactively select desired specifications from specification items of a custom vehicle that the automobile manufacturer can supply as if he or she were playing a game, and can find himself or herself entertained upon purchasing a vehicle.

The estimated price of the custom vehicle with selected desired specifications can be efficiently provided to the user. Custom vehicles (specific vehicles) even in relatively small production quantity can be provided to the users with relatively low prices, and business operation efficiencies of the dealers and automobile manufacturer can be improved.

In the embodiment mentioned above, an automobile has been exemplified as an article which is to be customized and ordered. However, the present invention is not limited to vehicles such as an automobile, and can be widely applied to industrial products (e.g., electric appliances, prefabricated houses, and the like) which allow mass production, and for which a plurality of different specifications or options can be set.

As many apparently widely different embodiments of the present invention can be made without departing from the spirit and scope thereof, it is to be understood that the invention is not limited to the specific embodiments thereof except as defined in the claims.

What is claimed is:

1. A vehicle information providing apparatus comprising:
information acquisition function for accessing a storage device and acquiring information associated with progress status of a plurality of vehicles before shipping, which information is stored in the storage device; and
information providing function for, via said information acquisition function to refer to the storage device by using an identification information as a key, acquiring information associated with progress status of a specific vehicle corresponding to the identification information, the identification information which is acquired from an information terminal that is connected via a communication line to allow two-way communications and specifies a user of the information terminal or a vehicle, and for providing the acquired information to the information terminal from which the identification information was output,
wherein the information associated with progress status of the vehicle contains a photographed image of the specific vehicle under assembly in an assembly line of a vehicle manufacturer, and
wherein the information associated with progress status of the vehicle, which is acquired by said information acquisition function contains photographed images of at least all vehicles which are under assembly in the assembly line of the vehicle manufacturer and are customizable as the specific vehicle,
wherein said information acquisition function composites a name of a purchaser of the specific vehicle to the photographed image.

2. A vehicle information providing apparatus comprising:
information acquisition function for accessing a storage device and acquiring information associated with progress status of a plurality of vehicles before shipping, which information is stored in the storage device; and
information providing function for, via said information acquisition function to refer to the storage device by using an identification information as a key, acquiring information associated with progress status of a specific vehicle corresponding to the identification information, the identification information which is acquired from an information terminal that is connected via a communication line to allow two-way communications and specifies a user of the information terminal or a vehicle, and for providing the acquired information to the information terminal from which the identification information was output,
wherein the information associated with progress status of the vehicle contains a photographed image of the specific vehicle under assembly in an assembly line of a vehicle manufacturer, and
wherein when the information which contains an image of the specific vehicle and is associated with progress status of the vehicle is provided as a pay service to a purchaser of the specific vehicle, production of the specific vehicle starts after a purchaser has subscribed to the pay service.

3. A vehicle information providing apparatus comprising:
a capturing function for capturing assembly states of vehicles near an assembly line in which the vehicles are manufactured;
an authentication function for authenticating access from a user terminal by a key assigned to a purchaser of a vehicle; and
an image providing function for providing the user terminal with captured image data, based on the captured assembly states, representing the vehicle which is under manufacturing, if the authentication by said authentication function succeeds,
wherein the captured image data allow the user to check on the progress of manufacturing the vehicle.

4. The apparatus according to claim 3, wherein the image providing function provides the user terminal of a video or still image data representing the vehicle in a backbone component assembly process, painting process, or test process.

5. The apparatus according to claim 3, further comprising a storage device for storing the image data representing the vehicle in association with processes of manufacturing,
wherein if the authentication function receives the access specifying the process of manufacturing and the authentication of the access succeeds, the image providing function reads out the image data from the storage device based on the received process of manufacturing.

6. A vehicle information providing apparatus comprising:
a capturing function for capturing assembly states of vehicles near an assembly line in which the vehicles are manufactured;
an authentication function for authenticating access from a user terminal by a key assigned to a purchaser of a vehicle; and
an image providing function for informing the user terminal of a scheduled manufacturing time and for providing a real-time image data representing the vehicle that is being manufactured if the authentication by said authentication function succeeds in the scheduled manufacturing time.

7. A vehicle information providing apparatus comprising:
a capturing function for capturing assembly states of the vehicles near an assembly line in which the vehicles are manufactured;
an authentication function for authenticating access from a user terminal by a key assigned to a purchaser of a vehicle;
an information providing function for providing the user terminal with a schedule information of when the authentication by said authentication function succeeds and the user terminal is allowed to remotely control a manufacturing machine for a vehicle;
a receiving function for receiving an instruction to control the manufacturing machine from the user terminal;
a transmission function for transmitting the instruction to the manufacturing machine; and
an image providing function for providing the user terminal with captured image data, based on the captured assembly states, representing the vehicle which is under manufacturing by the manufacturing machine based on the instruction.

8. A vehicle information providing apparatus comprising:
means for capturing assembly states of vehicles near an assembly line in which the vehicles are manufactured;
means for authenticating access to vehicle information from a user terminal; and
means for providing the user terminal with captured image data, based on the captured assembly states, representing the vehicle being manufactured if access to the vehicle information is authenticated, wherein the captured image data allows a user to monitor the vehicle being manufactured.

9. The apparatus according to claim 8, wherein the means for providing the user terminal with the image data provides the user terminal with image data of the vehicle in a backbone component assembly process, painting process, or test process.

10. The apparatus according to claim 8, further comprising:
means for storing the image data representing the vehicle in association with processes of manufacturing,
wherein if the means for authenticating access to vehicle information receives the access specifying the process of manufacturing and the authentication of the access succeeds, the means for providing the user terminal with the image data reads out the image data from the means for storing the image data based on the received process of manufacturing.

11. A method of providing vehicle information to a user to monitor conditions of a selected vehicle, the method comprising:
capturing assembly states of vehicles near an assembly line in which the vehicles are manufactured;
authenticating user access to vehicle information from a user terminal; and
providing the user terminal with captured image data, based on the captured assembly states, of the vehicle being manufactured if user access to the vehicle information is authenticated.

12. The method of claim 11, further comprising providing the user terminal with image data of the vehicle in a backbone component assembly process, a painting process, or a testing process.

13. The method according to claim 11, further comprising:
storing the image data representing the vehicle in association with processes of manufacturing; and
providing the user terminal with the stored image data representing the vehicle in association with a specified process of manufacturing if an authenticated user specifies the process of manufacturing.

14. A computer program instructing a user terminal to operate as a vehicle information providing apparatus, the computer program comprising:
a capturing function for capturing assembly states of vehicles near an assembly line in which the vehicles are manufactured;
an authentication function for authenticating access from a user terminal by a key assigned to a purchaser of a vehicle; and
an image providing function for providing the user terminal with captured image data, based on the captured assembly states, representing the vehicle which is under manufacturing, if the authentication by said authentication function succeeds,
wherein the captured image data allow the user to check on the progress of manufacturing the vehicle.

15. The computer program of claim 14, wherein the image providing function provides the user terminal of a video or still image data representing the vehicle in a backbone component assembly process, painting process, or test process.

16. The computer program of claim 14, further comprising a storing function for storing the image data representing the vehicle in association with processes of manufacturing,
wherein if the authentication function receives the access specifying the process of manufacturing and the authentication of the access succeeds, the image providing function reads out the image data from the storage device based on the received process of manufacturing.

* * * * *

UNITED STATES PATENT AND TRADEMARK OFFICE
CERTIFICATE OF CORRECTION

PATENT NO. : 7,020,584 B2 Page 1 of 1
APPLICATION NO. : 10/045664
DATED : March 28, 2006
INVENTOR(S) : Hiroki Takaoka et al.

It is certified that error appears in the above-identified patent and that said Letters Patent is hereby corrected as shown below:

In the drawings:

Fig. 5, Box C-7, change "REPLAY" to --REPLY--

Fig. 6, Box M1, change "A-'1" to --A-1--

Fig. 26, line 3, change "MODELL" to --MODEL--

Col. 11, line 28, after "(M3)", insert --.--

Col. 13, line 41, change "S357" to --S37--

Col. 17, line 46, change "suspension/tire•wheel" to --suspension/tire/wheel--

Signed and Sealed this

Third Day of April, 2007

JON W. DUDAS
*Director of the United States Patent and Trademark Office*